United States Patent
Yamaguchi et al.

(10) Patent No.: US 6,364,450 B1
(45) Date of Patent: Apr. 2, 2002

(54) COLOR FILTER MANUFACTURING METHOD AND APPARATUS, DISPLAY DEVICE MANUFACTURING METHOD, METHOD OF MANUFACTURING APPARATUS HAVING DISPLAY DEVICE, AND DISPLAY DEVICE PANEL MANUFACTURING METHOD AND APPARATUS

(75) Inventors: Hiromitsu Yamaguchi, Yokohama; Makoto Akahira, Kawasaki, both of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/629,453

(22) Filed: Jul. 31, 2000

(30) Foreign Application Priority Data

Aug. 3, 1999 (JP) .............................. 11-220497
Jul. 5, 2000 (JP) .............................. 2000-204316

(51) Int. Cl.⁷ ................................ B41J 2/165
(52) U.S. Cl. ................................... 347/33
(58) Field of Search ................... 347/24, 33, 45, 347/23, 2, 101, 105; 430/7; 427/511, 140, 162

(56) References Cited

U.S. PATENT DOCUMENTS

| | | | |
|---|---|---|---|
| 4,313,124 A | 1/1982 | Hara | 347/57 |
| 4,345,262 A | 8/1982 | Shirato et al. | 347/10 |
| 4,459,600 A | 7/1984 | Sato et al. | 347/47 |
| 4,463,359 A | 7/1984 | Ayata et al. | 347/56 |
| 4,558,333 A | 12/1985 | Sugitani | 347/65 |
| 4,723,129 A | 2/1988 | Endo et al. | 347/56 |
| 4,740,796 A | 4/1988 | Endo et al. | 347/56 |
| 4,959,673 A * | 9/1990 | Noda | 347/33 |
| 5,552,192 A * | 9/1996 | Kashiwazaki et al. | 427/492 |
| 5,559,539 A * | 9/1996 | Vo et al. | 347/33 |
| 5,917,517 A | 6/1999 | Kida et al. | 347/33 |
| 5,948,576 A | 9/1999 | Shirota et al. | 430/7 |
| 5,949,454 A * | 9/1999 | Nozawa et al. | 347/45 |
| 6,082,846 A | 7/2000 | Terasawa et al. | 347/19 |
| 6,134,059 A | 10/2000 | Shirota et al. | 359/891 |
| 6,227,647 B1 * | 5/2001 | Akahira et al. | 347/24 |

FOREIGN PATENT DOCUMENTS

| | | |
|---|---|---|
| EP | 0 754 553 | 1/1997 |
| JP | 54-56847 | 5/1979 |
| JP | 59-75205 | 4/1984 |
| JP | 59-123670 | 7/1984 |
| JP | 59-138461 | 8/1984 |
| JP | 60-71260 | 4/1985 |
| JP | 63-235901 | 9/1988 |
| JP | 1-217320 | 8/1989 |
| JP | 4-123005 | 4/1992 |
| JP | 9-138306 | 4/1997 |

OTHER PUBLICATIONS

U.S. Application No. 09/391,497, filed Sep. 8, 1999.

* cited by examiner

*Primary Examiner*—John Barlow
*Assistant Examiner*—Blaise Mouttet
(74) *Attorney, Agent, or Firm*—Fitzpatrick, Cella, Harper & Scinto

(57) ABSTRACT

It is an object of this invention to provide a color filter manufacturing method which can manufacture a color filter without decreasing the yield even if the nozzle surfaces of ink-jet heads are repeatedly wiped. In order to achieve this object, there is provided a color filter manufacturing method of manufacturing a color filter by discharging ink from an ink-jet head onto a color filter substrate to form colored areas in units of colors, which extend in a predetermined direction. The ink-jet head has an orifice surface in which orifices for discharging ink are formed and a water-repellent member covering at least peripheral portions of the orifices. This method includes the step of preparing a wiping member for wiping the orifice surface, and the step of wiping the orifice surface with the wiping member. The wiping direction of the wiping member coincides with the predetermined direction.

76 Claims, 38 Drawing Sheets

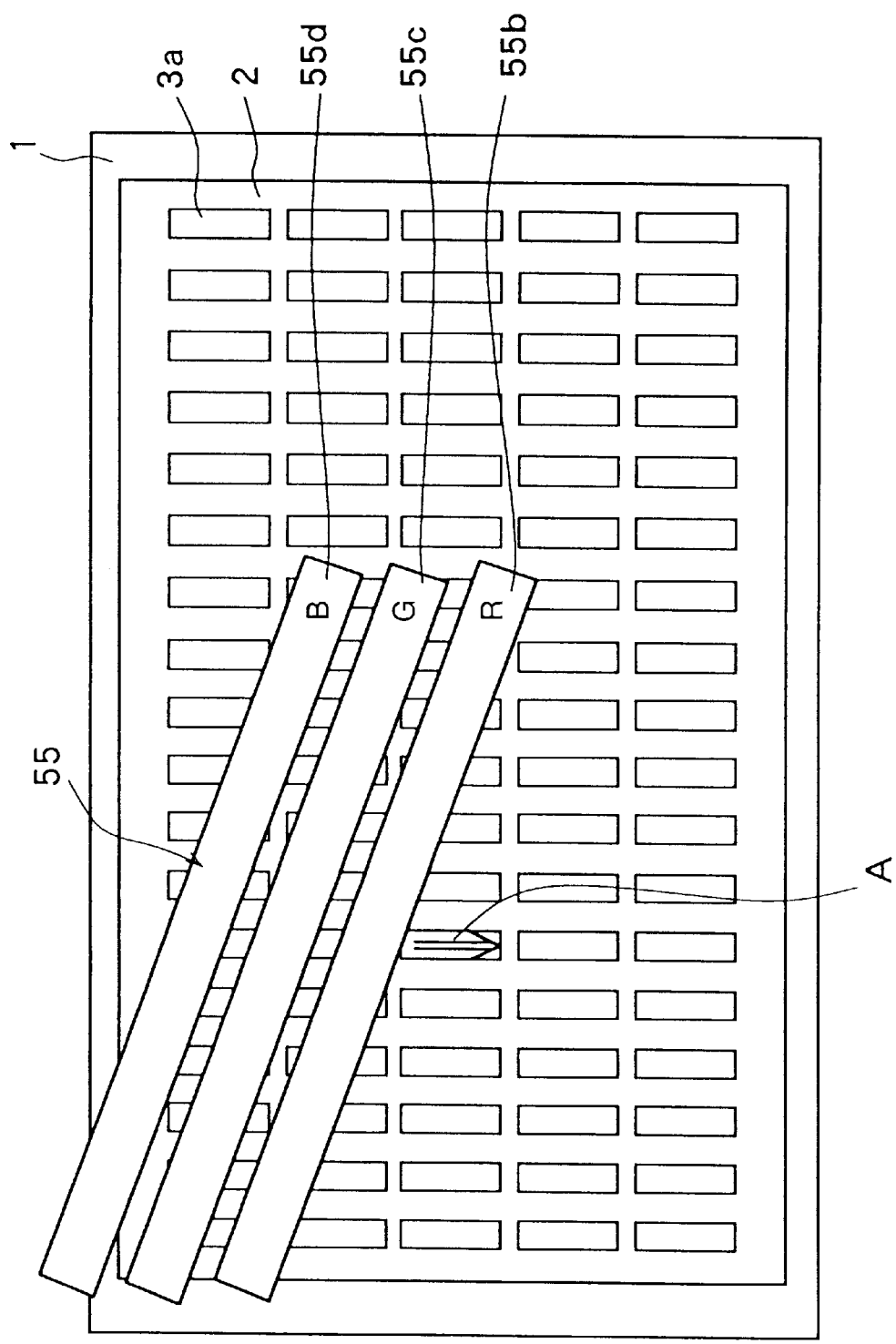

108 ORIFICE    600 WATER-REPELLENT PORTION (WATER-REPELLENT FILM)

300 FLAW AND PEELING PORTIONS    108 ORIFICE    600 WATER-REPELLENT PORTION (WATER-REPELLENT FILM)

300 FLAW AND PEELING PORTIONS    108 ORIFICE    600 WATER-REPELLENT PORTION (WATER-REPELLENT FILM)

108 ORIFICE    600 WATER-REPELLENT PORTION (WATER-REPELLENT FILM)

X DIRECTION

NO RESIDUAL INK

108 ORIFICE    600 WATER-REPELLENT PORTION (WATER-REPELLENT FILM)

X DIRECTION

300 FLAW AND PEELING PORTIONS  108 ORIFICE  600 WATER-REPELLENT PORTION (WATER-REPELLENT FILM)

108 ORIFICE  500 RESIDUAL INK

COLORED AREA EXTENDING IN PREDETERMINED DIRECTION

LONG PIXELS

COLORED AREA EXTENDING IN PREDETERMINED DIRECTION

INK-RECEIVING LAYER TYPE

COLORED AREA EXTENDING IN PREDETERMINED DIRECTION

DIRECT DRAWING TYPE

COLORED AREA EXTENDING IN PREDETERMINED DIRECTION

COLOR FILTER MANUFACTURING METHOD AND APPARATUS, DISPLAY DEVICE MANUFACTURING METHOD, METHOD OF MANUFACTURING APPARATUS HAVING DISPLAY DEVICE, AND DISPLAY DEVICE PANEL MANUFACTURING METHOD AND APPARATUS

FIELD OF THE INVENTION

The present invention relates to a display device panel manufacturing method and apparatus for manufacturing a display device panel (display element) by coloring pixels on a substrate using heads and, for example, to a method and apparatus for manufacturing color filters used in a color TV, personal computer, and the like, a display device manufacturing method, a method of manufacturing an apparatus having the display device, and the like.

BACKGROUND OF THE INVENTION

With recent advances in portable personal computers, demand for liquid crystal displays, especially color liquid crystal displays has arisen. At the same time, demand has arisen for a reduction in the cost of apparatuses. It is required to reduce the cost of a color filter, in particular, which occupies a relatively large proportion of the total cost. Various methods have been tried to satisfy the required characteristics of color filters while meeting the above requirements. However, no method has yielded satisfactory results so far. The respective methods will be described below.

The first method is pigment dispersion, which is the most popular method. In this method, a pigment-dispersed photosensitive resin layer is formed on a substrate and patterned into a single-color pattern. This process is repeated three times to obtain R, G, and B color filter layers.

The second method is dyeing. In this method, a water-soluble polymer material as a dyeable material is formed on a glass substrate and patterned into a given shape by a photolithography process. The obtained pattern is dipped in a dye bath to obtain a colored pattern. This process is repeated three times to form R, G, and B color filter layers.

The third method is electrodeposition. In this method, a transparent electrode is patterned on a substrate, and the resultant structure is dipped in an electrodeposition coating fluid containing a pigment, resin, electrolyte, and the like to be colored in the first color by electrodeposition. This process is repeated three times to form R, G, and B color filter layers. Finally, these layers are calcined.

The fourth method is printing. In this method, a pigment is dispersed in a thermosetting resin, printing is repeated three times to form R, G, and B coatings separately, and the resins are cured, thereby forming colored layers. In any of the above methods, a protective layer is generally formed on the colored layers.

These methods have as their common feature that the same process must be repeated three times to obtain layers colored in three colors, i.e., R, G, and B. This causes an increase in cost. In addition, as the number of processes increases, the yield decreases. In the electrodeposition method, limitations are imposed on pattern shapes which can be formed. For this reason, with the existing techniques, this method cannot be applied to TFTs. In the print method, a pattern with a fine pitch cannot be formed because of poor resolution.

In order to eliminate these drawbacks, methods of manufacturing color filters by ink-jets are disclosed in Japanese Patent Laid-Open Nos. 59-75205, 63-235901, 1-217320, 4-123005 and 9-138306. Unlike in the above conventional methods, in these methods, R (red), G (green), and B (blue) inks are sprayed from ink-jet heads onto predetermined positions on a transparent substrate, and the respective inks are dried on the substrate to form colored layers. According to these methods, R, G, and B layers can be formed at once, and ink can be efficiently used. This makes it possible to attain a great increase in productivity, a reduction in cost, and the like.

When color filters are manufactured by using such an ink-jet system, the nozzle surfaces of the ink-jet heads are smudged with ink after repeatedly discharging ink. For this reason, the nozzle surfaces must be periodically cleaned.

Conventionally, the nozzle surfaces have been cleaned by wiping the nozzle surfaces of the ink-jet heads with elastic, spongy wiping members.

In this case, the nozzle surfaces are generally cleaned by moving the wiping members in the direction in which the nozzles of each ink-jet head are arrayed or a direction perpendicular to the nozzle array.

In general, when the nozzle surfaces (orifice surfaces) of the ink-jet heads are repeatedly wiped, small flaws gradually form in those portions of the nozzle surfaces which are located near the orifices of the nozzles, and the water repellency of the water-repellent portions deteriorates. As a consequence, the flying directions of ink droplets discharged from the ink-jet head slightly change, and their landing positions are offset.

In general ink-jet printers, such landing position offsets are at a negligible level. In coloring high-resolution patterns such as color filters, however, these offsets cause color mixing among adjacent colored areas, resulting in a reduction in yield.

SUMMARY OF THE INVENTION

The present invention has been made in consideration of the above problems, and has as its object to provide a color filter manufacturing method and apparatus which can manufacture a color filter without decreasing the yield even if the nozzle surfaces (orifice surfaces) of ink-jet heads are repeatedly wiped, a color filter manufactured by the manufacturing method, a method of manufacturing a display device having the color filter, a method of manufacturing an apparatus having the display device, and a display device panel manufacturing method and apparatus.

In order to solve the above problems and achieve the above object, according to the present invention, there is provided a color filter manufacturing method of manufacturing a color filter by discharging ink from an ink-jet head onto a color filter substrate to form colored areas in units of colors, which extend in a predetermined direction, the ink-jet head having an orifice surface in which orifices for discharging ink are formed and a water-repellent member covering at least peripheral portions of the orifices, comprising the steps of preparing a wiping member for wiping the orifice surface, and wiping the orifice surface with the wiping member, wherein a defective portion is produced in the water-repellent member as the orifice surface is wiped, and the defective portion is produced in the wiping direction, and wherein a wiping direction of the wiping member coincides with a direction along with the predetermined direction.

According to the present invention, there is provided a color filter manufacturing apparatus for manufacturing a color filter by discharging ink from an ink-jet head onto a color filter substrate to form colored areas in units of colors, which extend in a predetermined direction, the ink-jet head having an orifice surface in which orifices for discharging ink are formed and a water-repellent member covering at least peripheral portions of the orifices, comprising the steps of a wiping member for wiping the orifice surface, and wiping means for controlling wiping operation of said wiping member, wherein a defective portion is produced in the water-repellent member as the orifice surface is wiped, and the defective portion is produced in the wiping direction, and wherein a wiping direction of said wiping member controlled by said wiping means coincides with a direction along with the predetermined direction.

According to the present invention, there is provided a display device manufacturing method of manufacturing a display device using a color filter manufactured by discharging ink from an ink-jet head onto a color filter substrate to form colored areas in units of colors, which extend in a predetermined direction, the ink-jet head having an orifice surface in which orifices for discharging ink are formed and a water-repellent member covering at least peripheral portions of the orifices, comprising the steps of manufacturing a color filter by the manufacturing method described above, and integrating the color filter with light amount changing means for changing a light amount.

According to the present invention, there is provided a manufacturing method of manufacturing an apparatus having a display device using a color filter manufactured by discharging ink from an ink-jet head onto a color filter substrate to form colored areas in units of colors, which extend in a predetermined direction, the ink-jet head having an orifice surface in which orifices for discharging ink are formed and a water-repellent member covering at least peripheral portions of the orifices, comprising the steps of manufacturing a color filter by the manufacturing method described above, integrating the color filter with light amount changing means for changing a light amount, and providing image signal supply means for supplying an image signal to the display device.

According to the present invention, there is provided a display device panel manufacturing method of manufacturing a display device panel by discharging a liquid from a liquid supply head onto a substrate to form display portions which extend in a predetermined direction and are used for display, the liquid supply head having an orifice surface in which orifices for discharging liquid are formed and a water-repellent member covering at least peripheral portions of the orifices, comprising the steps of preparing a wiping member for wiping the orifice surface, and wiping the orifice surface with the wiping member, wherein a defective portion is produced in the water-repellent member as the orifice surface is wiped, and the defective portion is produced in the wiping direction, and wherein a wiping direction of the wiping member coincides with a direction along with the predetermined direction.

According to the present invention, there is provided a display device panel manufacturing apparatus for manufacturing a display device panel by discharging a liquid from a liquid supply head onto a substrate to form display portions which extend in a predetermined direction and are used for display, the liquid supply head having an orifice surface in which orifices for discharging liquid are formed and a water-repellent member covering at least peripheral portions of the orifices, comprising a wiping member for wiping the orifice surface, and wiping means for controlling wiping operation of said wiping member, wherein a defective portion is produced in the water-repellent member as the orifice surface is wiped, and the defective portion is produced in the wiping direction, and wherein a wiping direction of said wiping member controlled by said wiping means coincides with a direction along with the predetermined direction.

According to the present invention, there is provided a color filter manufacturing method of manufacturing a color filter by discharging ink from an ink-jet head onto a color filter substrate to form colored areas in units of colors, which extend in a predetermined direction, the ink-jet head having an orifice surface in which orifices for discharging ink are formed and a protective member covering at least peripheral portions of the orifices, comprising the steps of preparing a wiping member for wiping the orifice surface, and wiping the orifice surface with the wiping member, wherein a defective portion is produced in the protective member as the orifice surface is wiped, and the defective portion is produced in the wiping direction, and wherein a wiping direction of the wiping member coincides with a direction along with the predetermined direction.

According to the present invention, there is provided a color filter manufacturing apparatus for manufacturing a color filter by discharging ink from an ink-jet head onto a color filter substrate to form colored areas in units of colors, which extend in a predetermined direction, the ink-jet head having an orifice surface in which orifices for discharging ink are formed and a protective member covering at least peripheral portions of the orifices, comprising a wiping member for wiping the orifice surface, and wiping means for controlling wiping operation of said wiping member, wherein a defective portion is produced in the protective member as the orifice surface is wiped, and the defective portion is produced in the wiping direction, and wherein a wiping direction of said wiping member controlled by said wiping means coincides with a direction along with the predetermined direction. According to the present invention, there is provided a display device panel manufacturing method of manufacturing a display device panel by discharging a liquid from a liquid supply head onto a substrate to form display portions which extend in a predetermined direction and are used for display, the liquid supply head having an orifice surface in which orifices for discharging liquid are formed and a predetermined material covering at least peripheral portions of the orifices, comprising the steps of preparing a wiping member for wiping the orifice surface, and wiping the orifice surface with the wiping member, wherein a wiping direction of the wiping member coincides with a direction along with the predetermined direction.

According to the present invention, there is provided a display device panel manufacturing apparatus for manufacturing a display device panel by discharging a liquid from a liquid supply head onto a substrate to form display portions which extend in a predetermined direction and are used for display, the liquid supply head having an orifice surface in which orifices for discharging liquid are formed and a predetermined material covering at least peripheral portions of the orifices, comprising a wiping member for wiping the orifice surface, and wiping means for controlling wiping operation of said wiping member, wherein a wiping direction of said wiping member controlled by said wiping means coincides with a direction along with the predetermined direction.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 is a view showing a color filter manufacturing method;

DETAILED DESCRIPTION OF THE PREFERRED EMBODIMENTS

Preferred embodiments of the present invention will be described in detail in accordance with the accompanying drawings.

Figure 38A:
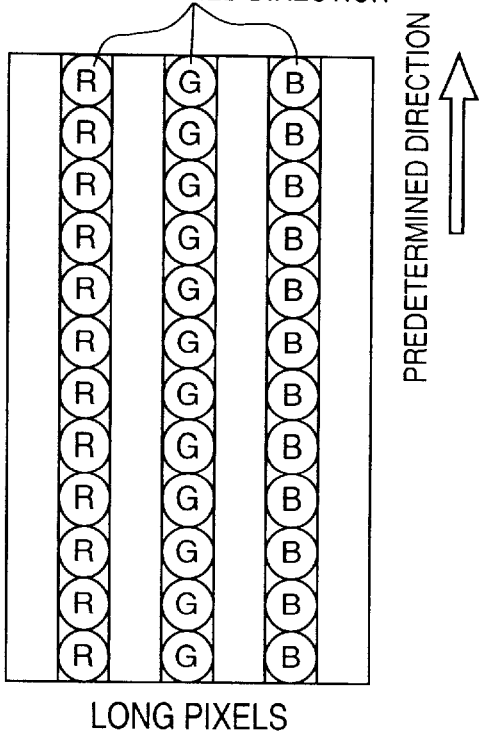
FIGS. 38A to 38D are views for explaining colored areas extending in a predetermined direction.
Figure 38B:
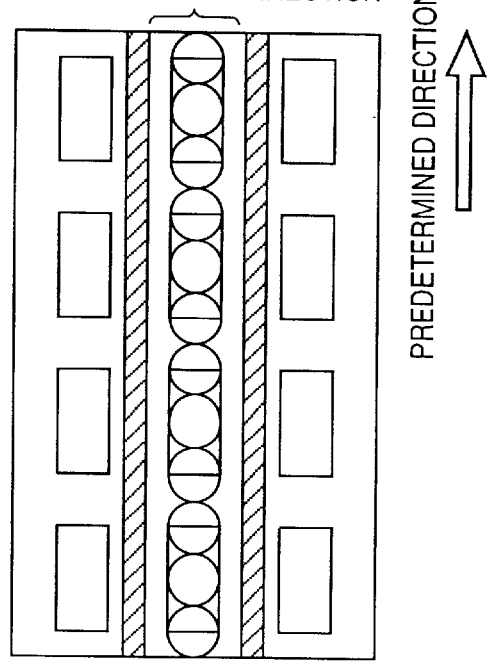
Figure 38C:
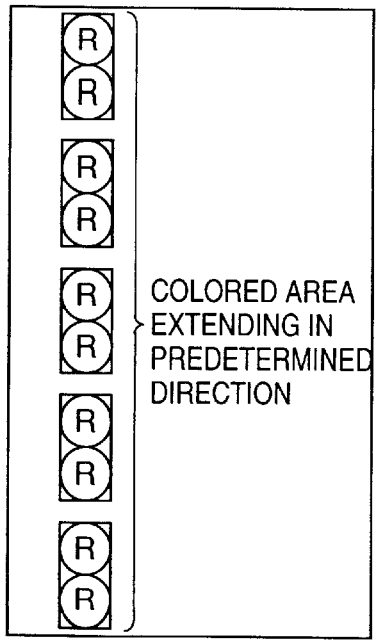
Figure 38D:
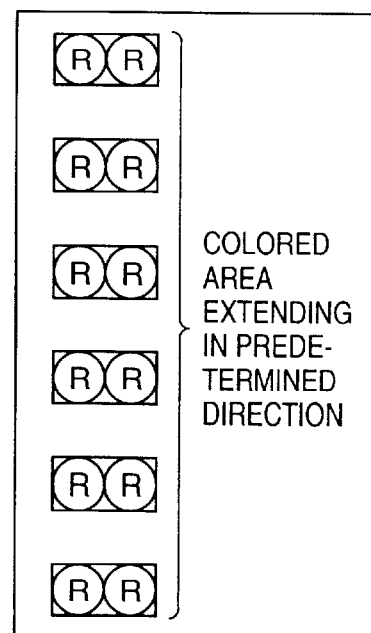

A display device panel (display element) defined in the present invention has display portions used for display. More specifically, the display device panel is a panel which includes, for example, a color filter having colored portions or an EL element having a luminescent portion made of a luminescent material, and is used for a display device. The colored portions of the color filter correspond to the display portions, whereas the luminescent portion of the EL element corresponds to the display portions. A color filter defined in the present invention is comprised of colored portions and base members and capable of obtaining output light upon changing the characteristics of input light. The base members include a substrate formed by glass material or plastic material or the like, and also include the other shape than the plate like shape. Note that the expression "a colored area extending in a predetermined direction" in a color filter includes a case wherein a pixel array continuously extends as shown in FIG. 38A, a case wherein a pixel array is divided into a plurality of pixel groups as shown in FIGS. 38B, 38C, and 38D, and the like. In addition, colored areas of a color filter may be expressed as areas for allowing viewers to visually recognize colors. Furthermore, each ink-jet head used in the embodiments has orifice surfaces in which orifices are formed, and at least portions around these orifices are covered with a predetermined material. Furthermore, the ink-jet head supplies ink as a colored liquid to a color filter substrate, and hence can be called a liquid supply head.

Figure 1:
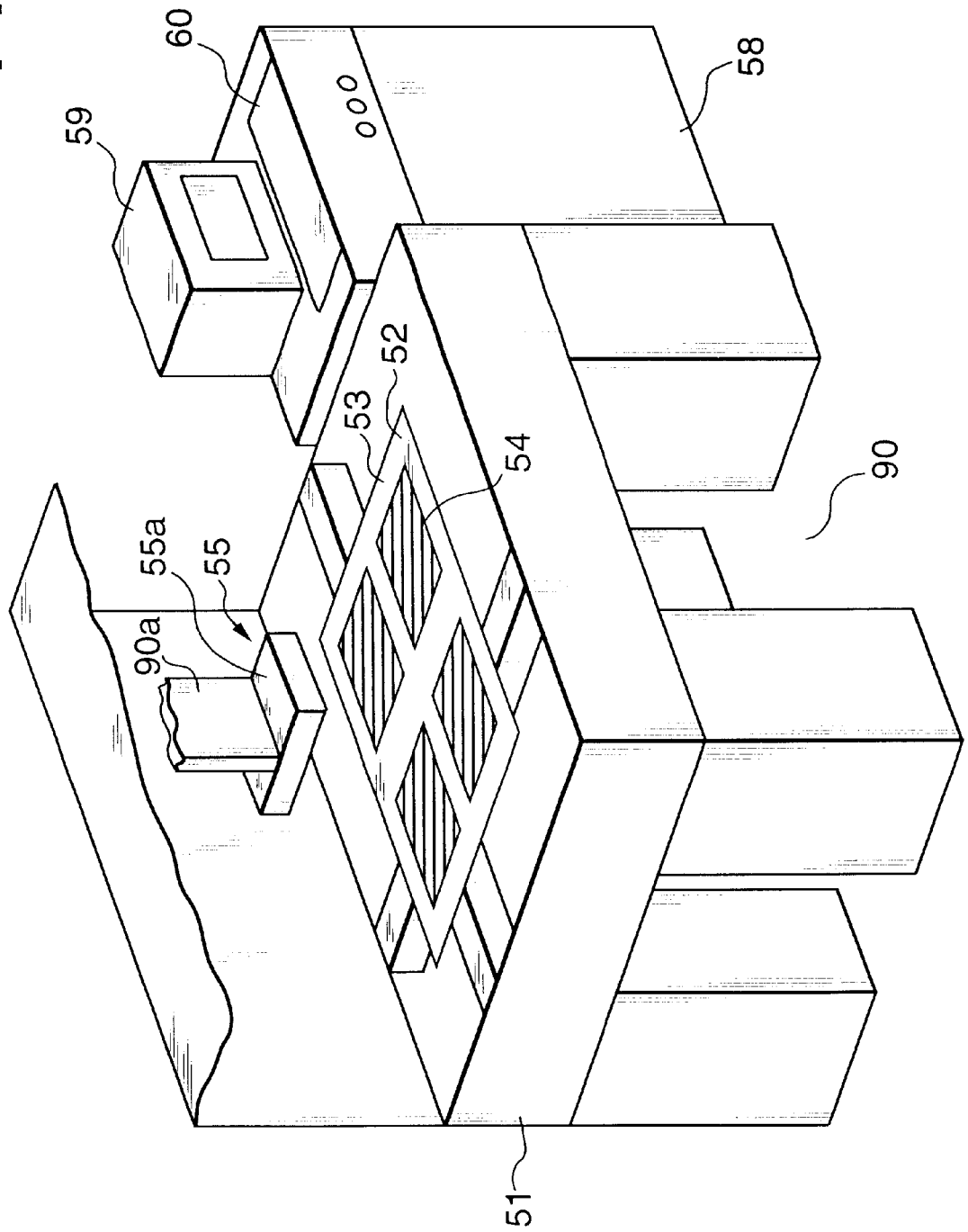
FIG. 1 is a perspective view showing the arrangement of a color filter manufacturing apparatus according to an embodiment.

FIG. 1 is a schematic view showing the arrangement of a color filter manufacturing apparatus based on the ink-jet method during operation in a coloring process.

Referring to FIG. 1, reference numeral 51 denotes an apparatus base; 52, an X-Y-Z-θ stage disposed on the apparatus base 51; 53, a color filter substrate set on the X-Y-Z-θ stage 52; 54, color filters formed on the color filter substrate 53; 55, a head unit constituted by red, green, and blue ink-jet heads for coloring the color filters 54 and a head mount 55a for supporting them; 58, a controller for controlling the overall operation of a color filter manufacturing apparatus 90; 59, a display unit of the controller; and 60, a keyboard as the operation unit of the controller.

The head unit 55 is detachably mounted on a support portion 90a of the color filter manufacturing apparatus such that the pivot angle of the head unit 55 can be adjusted within a horizontal plane.

Figure 2:
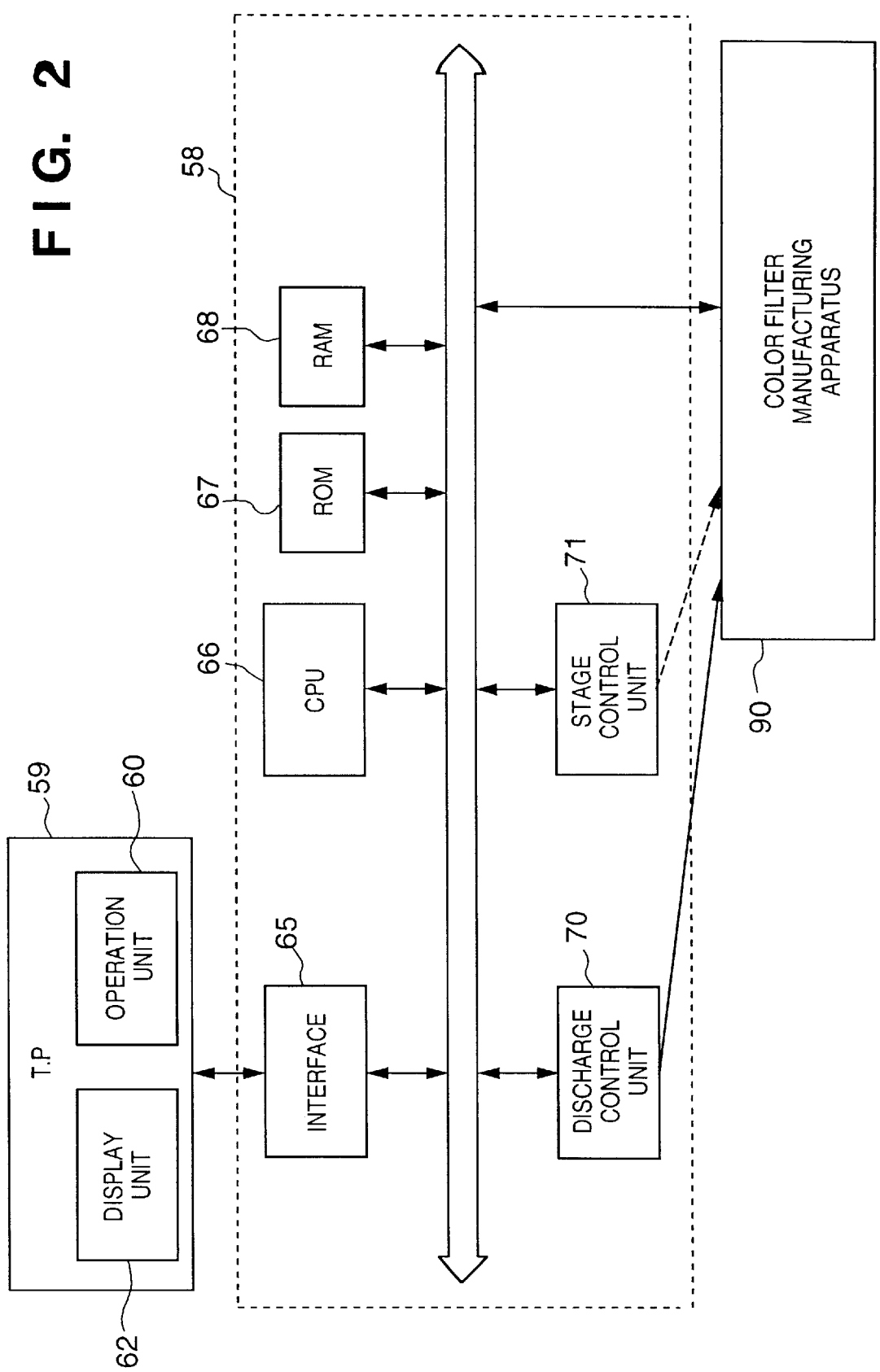
FIG. 2 is a block diagram showing the arrangement of a control unit for controlling the operation of the color filter manufacturing apparatus.

FIG. 2 is a block diagram showing the arrangement of the controller of the color filter manufacturing apparatus 90. Reference numeral 59 denotes a teaching pendant serving as the input/output means of the controller 58; and 62, a display unit for displaying how a manufacturing process progresses, information indicating the presence/absence of a head abnormality, and the like. The operation unit (keyboard) 60 provides an instruction for operation of the color filter manufacturing apparatus 90 and the like.

The controller 58 controls the overall operation of the color filter manufacturing apparatus 90. Reference numeral 65 denotes an interface for exchanging data with the teaching pendant 59; 66, a CPU for controlling the color filter manufacturing apparatus 90; 67, a ROM storing control programs for operating the CPU 66; 68, a RAM for storing abnormality information and the like; and 71, a stage control unit for controlling the operation of the X-Y-Z-θ stage 52 of the color filter manufacturing apparatus 90. The color filter manufacturing apparatus 90 is connected to the controller 58 and operates in accordance with instructions therefrom.

Figure 3:
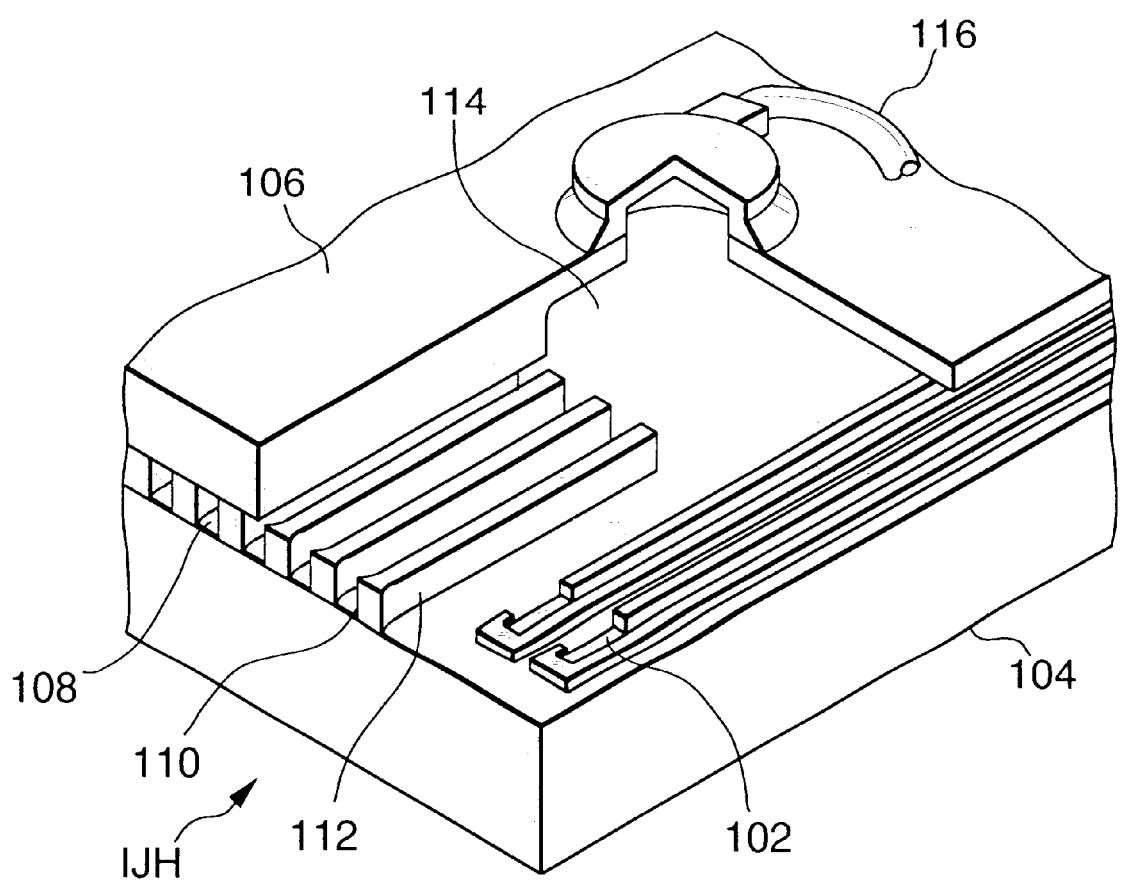
FIG. 3 is a perspective view showing the structure of an ink-jet head used in the color filter manufacturing apparatus.

FIG. 3 is a view showing the structure of an ink-jet head IJH used in the color filter manufacturing apparatus 90. In the apparatus shown in FIG. 1, three ink-jet heads are arranged in correspondence with three colors, i.e., R, G, and B. Since these three heads have the same structure, FIG. 3 shows the structure of one of the three heads as a representative.

Referring to FIG. 3, the ink-jet head IJH mainly comprises a heater board 104 as a board on which a plurality of heaters 102 for heating ink are formed, and a ceiling plate 106 mounted on the heater board 104. A plurality of orifices 108 are formed in the ceiling plate 106. Tunnel-like fluid passages 110 communicating with the orifices 108 are formed therebehind. The respective fluid passages 110 are isolated from the adjacent fluid passages via partition walls 112. The respective fluid passages 110 are commonly connected to one ink chamber 114 at the rear side of the fluid passages. Ink is supplied to the ink chamber 114 via an ink inlet 116. This ink is supplied from the ink chamber 114 to each fluid passage 110.

The heater board 104 and the ceiling plate 106 are positioned such that the position of each heater 102 coincides with that of a corresponding fluid passage 110, and are assembled into the state shown in FIG. 3. Although FIG. 3 shows only two heaters 102, one heater 102 is arranged in correspondence with each fluid passage 110. When a predetermined driving signal is supplied to the heater 102 in the assembled state shown in FIG. 3, ink above the heater 102 boils to produce a bubble, and the ink is pushed and discharged from the orifice 108 upon volume expansion of the ink. Therefore, the size of a bubble can be adjusted by controlling a driving pulse applied to the heater 102, e.g., controlling the magnitude of power. That is, the volume of the ink discharged from each orifice can be arbitrarily controlled. In manufacturing a color filter, it is preferable the volumes of ink (the amount of ink) discharged from the respective orifices be substantially matched to each other. This is because equalizing the amounts of ink discharged will reduce irregularity among pixels as compared with a case wherein the amounts of ink discharged vary.

FIG. 4 is a view showing the process of manufacturing a color filter by using ink-jet heads.

A light-transmitting substrate is preferably used as a substrate 1 for a color filter of the present invention. In general, a glass substrate is used. However, a substrate other than a glass substrate can be used as long as it has characteristics, e.g., transparency and mechanical strength, required for a liquid crystal color filter.

On the substrate 1, a partitioning member (e.g., a black matrix) 2 for partitioning pixels 3 constituting a color filter is formed. Color ink colored in red (R), green (G), or blue (B) is discharged from a corresponding one of ink-jet heads 55b, 55c, and 55d onto a pixel 3a which is an opening portion partitioned by the black matrix 2, thereby coloring the pixel 3a. Note that the ink-jet heads 55b, 55c, and 55d discharge inks onto the substrate 1 to color the respective pixels 3a while being scanned in the direction indicated by an arrow A in FIG. 4 with respect to the substrate 1.

As an ink-jet system used in the present invention, a bubble-jet type using an electrothermal transducer as an energy generating element, a piezoelectric jet type using a piezoelectric element, or the like can be used. A coloring area and coloring pattern can be arbitrarily set.

(First Method)

FIGS. 5A to 5F are views showing the process of manufacturing a color filter.

The black matrix 2 serving as a light-shielding portion is formed on the light-transmitting substrate 1 as a color filter formation surface (step (a)).

As the substrate 1, a glass substrate is generally used. However, a resin substrate, e.g., a plastic substrate, can be used as long as it does not impair the transparency of a color filter, and has characteristics, e.g., mechanical strength, required in accordance with the application purpose of the color filter.

In forming the black matrix 2, a metal film consisting of chromium or the like is formed on the substrate by a film formation method such as sputtering or vacuum deposition, and the film is patterned by photolithography to form opening portions and the like. In addition, as the black matrix 2, a member formed by patterning a photosensitive black resin coating by photolithography, a member formed by the print method, or the like can be used.

Subsequently, an ink-receiving layer 3 is formed on the substrate (step (b)).

The ink-receiving layer 3 is formed by coating the color filter formation surface with a resin composition which is one of a positive type that has no ink receptivity by itself but exhibits it under a certain condition, a negative type that has ink receptivity by itself but loses it under a certain condition, and a type that has the properties of either type and cures under a certain condition, and pre-baking the coating as needed. For example, the certain condition includes irradiation with light or irradiation with light and heat. The resin composition coating can be formed by a coating method such as spin coating, roller coating, bar coating, spraying, or dipping. In the present invention, a negative type photosensitive resin composition is preferably used, which cures upon irradiation of light, and does not absorb ink in the cured portion.

The thickness of the ink-receiving layer 3 is about 0.3 to 3.0 $\mu$m when the color filter of this embodiment is used for a liquid crystal device.

Pattern exposure is performed on the ink-receiving layer 3 by using a photomask 4 to partly cure the ink-receiving layer 3, thereby forming an ink-repellent portion 5 that has lost ink receptivity (step (c)).

Figure 5A:
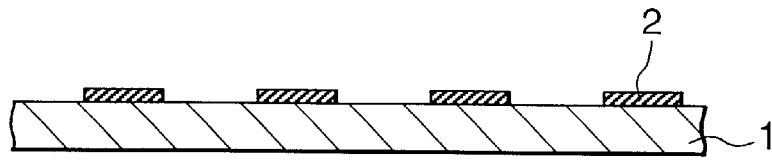
FIGS. 5A to 5F are sectional views showing the steps in manufacturing a color filter.
Figure 5B:
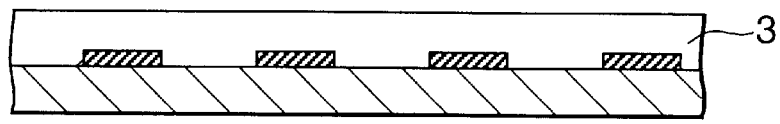
Figure 5C:
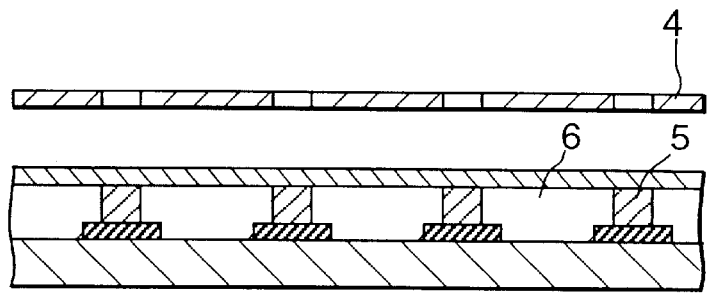
Figure 5D:
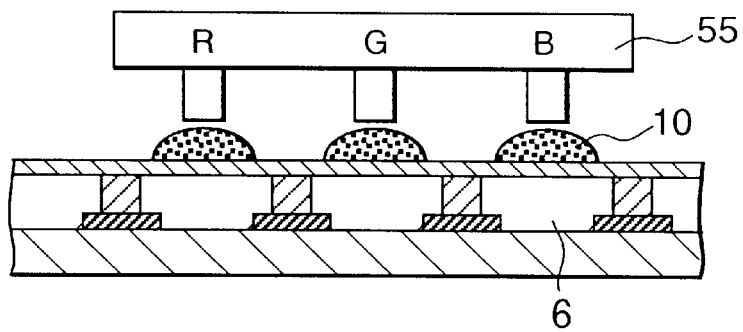
Figure 5E:
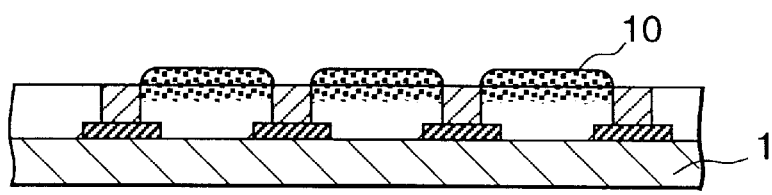
Figure 5F:
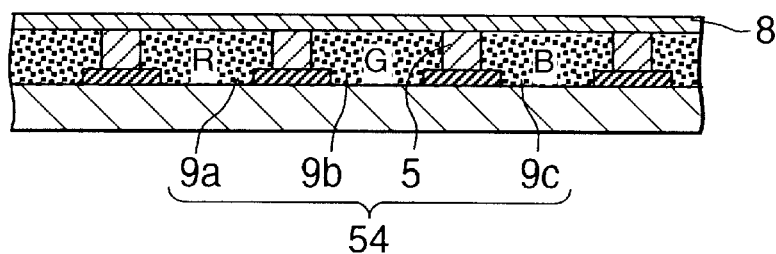

The photomask 4 shown in FIG. 5C is used when the ink-receiving layer 3 is formed by using a negative type photosensitive resin composition. When the ink-receiving layer 3 is to be formed by using a positive type photosensitive resin composition, pattern exposure may be performed while the ink-repellent portion is masked by using a photomask having a reverse pattern to the photomask 4.

As shown in FIG. 5C, the ink-repellent portion 5 is overlaid on the black matrix 2. The ink-repellent portion 5 is preferably formed to have a width smaller than that of the black matrix. When the color filter is used for a liquid crystal element, the width of the ink-repellent portion 5 is about 1.0 to 30.0 $\mu$m. With this structure, colored portions 9a to 9c (to be described later) extend to positions where they overlap the black matrix 2, thereby preventing white omissions.

R, G, and B inks 10 are discharged from the head unit 55 onto predetermined positions on non-exposed portions 6 of the ink-receiving layer 3 (steps (d) and (e)).

Each non-exposed portion is surrounded with the ink-repellent layer 5.

As an ink-jet system used in the present invention, a bubble-jet type using an electrothermal transducer as an energy generating element, a piezoelectric jet type using a piezoelectric element, or the like can be used. A coloring area and coloring pattern can be arbitrarily set.

In the present invention, as coloring inks, both dye-based ink and pigment-based ink can be used. Ink other than ink which stays in a liquid state at room temperature may be used. For example, ink which solidifies at room temperature or lower, ink which softens at room temperature, or ink which in a liquid state at room temperature may be used. Alternatively, ink which liquefies when a printing signal used is supplied may be used because in the above ink-jet system the temperature of ink itself is ordinarily controlled in the range from 30° C. (inclusive) to 70° C. (inclusive) so as to make the viscosity of the ink fall within a stable discharge range.

The inks are further dried, as needed, and a heat treatment is performed to completely cure the entire ink-receiving layer 3, thereby forming the colored portions 9a to 9c of the respective colors. With this process, the color filter 54 is formed. Thereafter, a protective layer 8 is generally formed on the color filter 54, as needed (step (f)).

As the protective layer 8, for example, a photosetting type film, thermosetting type film, photosetting/thermosetting type film, or inorganic film formed by deposition, sputtering, or the like can be used. Any of these films can be used as long as it has transparency upon formation of a color filter and is sufficiently resistant to subsequent processes such as an ITO formation process and an aligning film formation process.

(Second Method)

FIGS. 25A to 25D are views showing the steps in the second method, in which the same reference numerals denote the same members in FIGS. 5A to 5F. FIGS. 25A to 25D are schematic views respectively corresponding to steps (a) to (d) described below.

Step (a)

First of all, a partition wall portion (partition member) is formed on the substrate 1. The partition wall portion is a member for preventing color mixing between adjacent different inks when inks (to be described later) are supplied. In this case, as the partition wall portion, a black matrix 342 also serving as a light-shielding layer is used. As the black matrix 342, a resist containing a black pigment is preferably used, and patterning is performed by general photolithography. The black matrix 342 is designed to prevent color mixing between adjacent different inks when inks (to be described later) are supplied, and hence preferably has ink repellency. In the present invention, the black matrix 342 preferably has a thickness of 0.5 $\mu$m or more in consideration of the above partitioning effect and light-shielding effect. The opening portions of the black matrix 342 correspond to non-colored portions according to the present invention.

Step (b)

R, G, and B inks 343 are supplied from ink-jet heads 37 to fill the opening portions of the black matrix 342 in accordance with a predetermined coloring pattern. In the present invention, in this step, inks are supplied from a plurality of nozzles to the respective non-colored portions, as described in the above embodiment.

Each ink used in the present invention is made of a resin composition that cures upon application of energy and generally contains a coloring agent. As the coloring agent, a general dye or pigment can be used. For example, as the dye, anthraquinone dye, azo dye, triphenylmethane dye, polymethine dye, or the like can be used.

As the resin used for each ink, a resin that cures upon a heat treatment or application of energy, e.g., irradiation of light is used. More specifically, as the thermosetting resin, a compound of a known resin and crosslinking agent can be used. For example, this combination includes a combination of acrylic resin, melamine resin, or a polymer containing a hydroxyl group or carboxyl group and melamine, a combination of a polymer containing a hydroxyl group or carboxyl group and a multifunctional epoxy resin compound, a combination of polymer containing a hydroxyl group or carboxyl group and a cellulose reactive compound, a combination of epoxy resin, and resole resin, a combination of epoxy resin and amines, a combination of epoxy resin and carboxylic acid or acid anhydride, and a combination of an epoxy compound and the like. As the photosetting type resin, a know resin, e.g., a commercially available negative resist, can be suitably used.

Various kinds of solvents can be added to the above inks. From the viewpoint of the discharge characteristics of the ink-jet system, a mixed solvent of water and water-soluble organic solvent is preferably used.

To impart desired characteristics to ink as needed, a surfactant, antifoaming agent, preservative, and the like can be added to the ink, in addition to the above components. Furthermore, a commercially available water-soluble dye or the like can be added to the ink.

Of the photosetting and thermosetting type resins, a solvent other than water and a water-soluble organic solvent can be used even if it does not dissolve in water or a water-soluble organic solvent as long as is can be stably discharged. In addition, when a photopolymerizable monomer is to be used, in particular, a solventless type material obtained by dissolving a dye in a monomer can be used.

Step (c)

The ink 343 applied to the opening portions of the resin black matrix 342 is cured by either a heat treatment or irradiation of light or both, thereby forming colored portions 344.

Step (d)

A protective layer 8 is formed, as needed.

Figure 6:
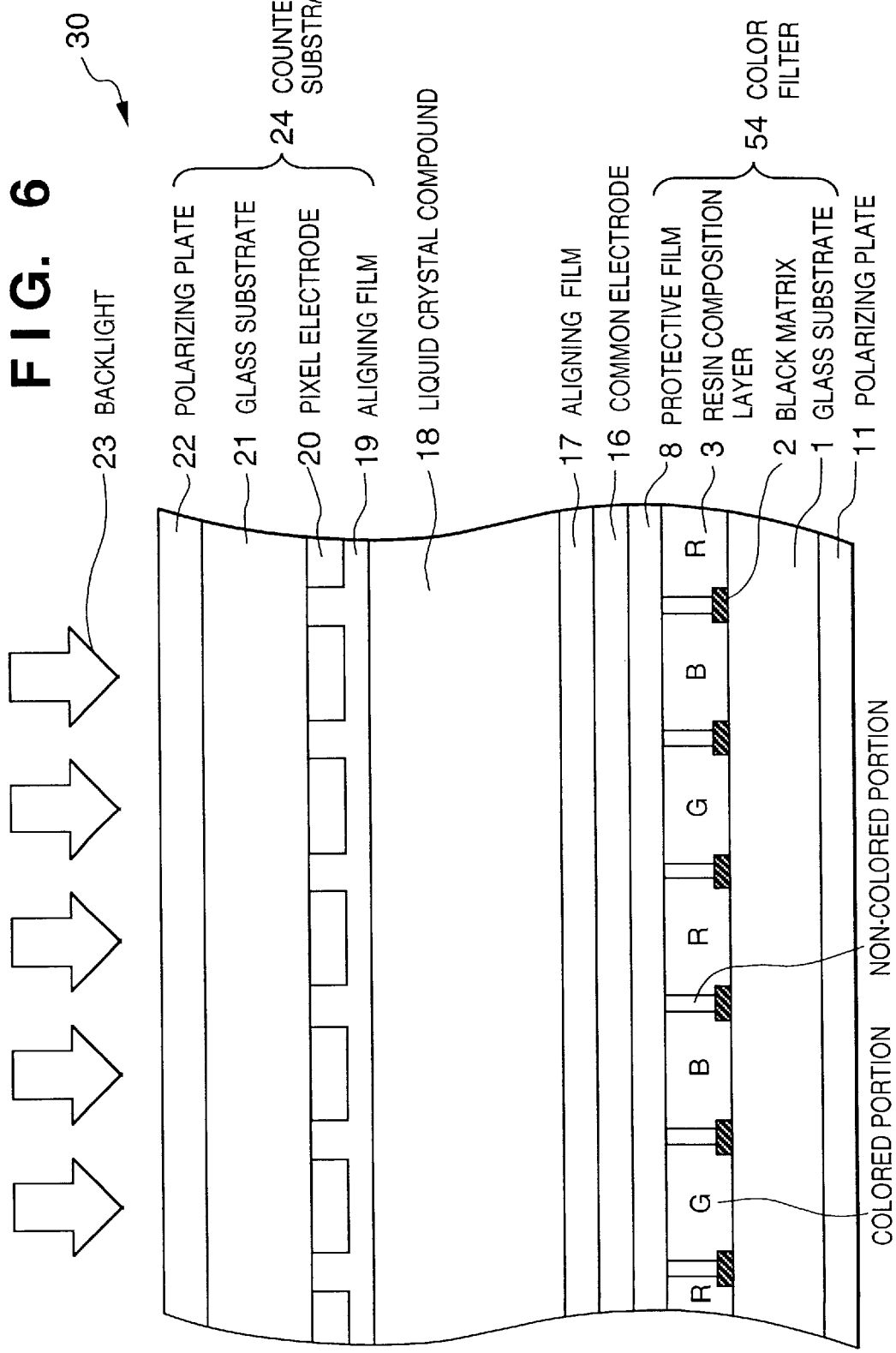
FIG. 6 is a sectional view showing an example of the basic structure of a color liquid crystal display device incorporating the color filter according to the embodiment.
Figure 7:
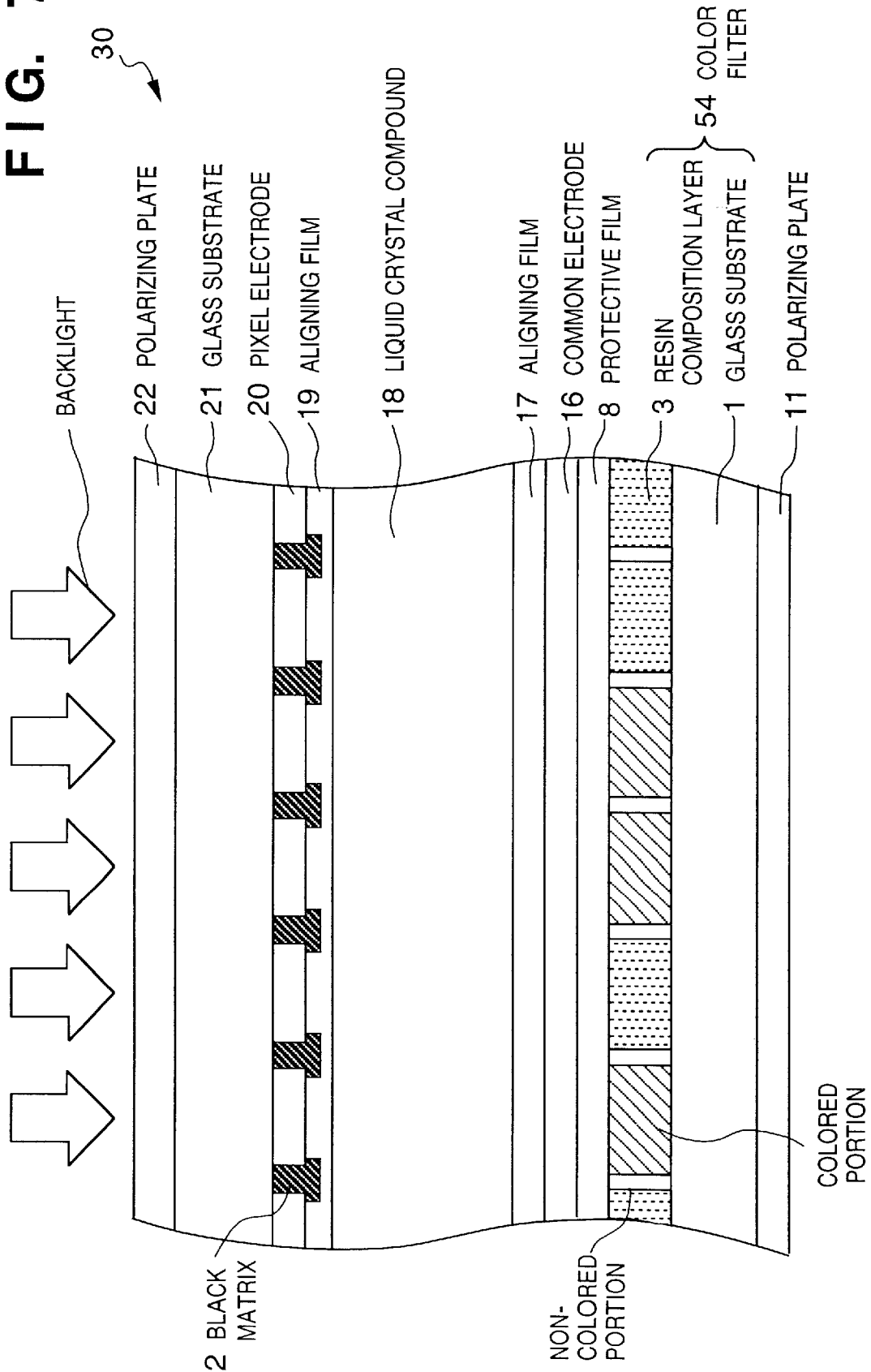
FIG. 7 is a sectional view showing another example of the basic structure of a color liquid crystal display device incorporating the color filter according to the embodiment.
Figure 8:
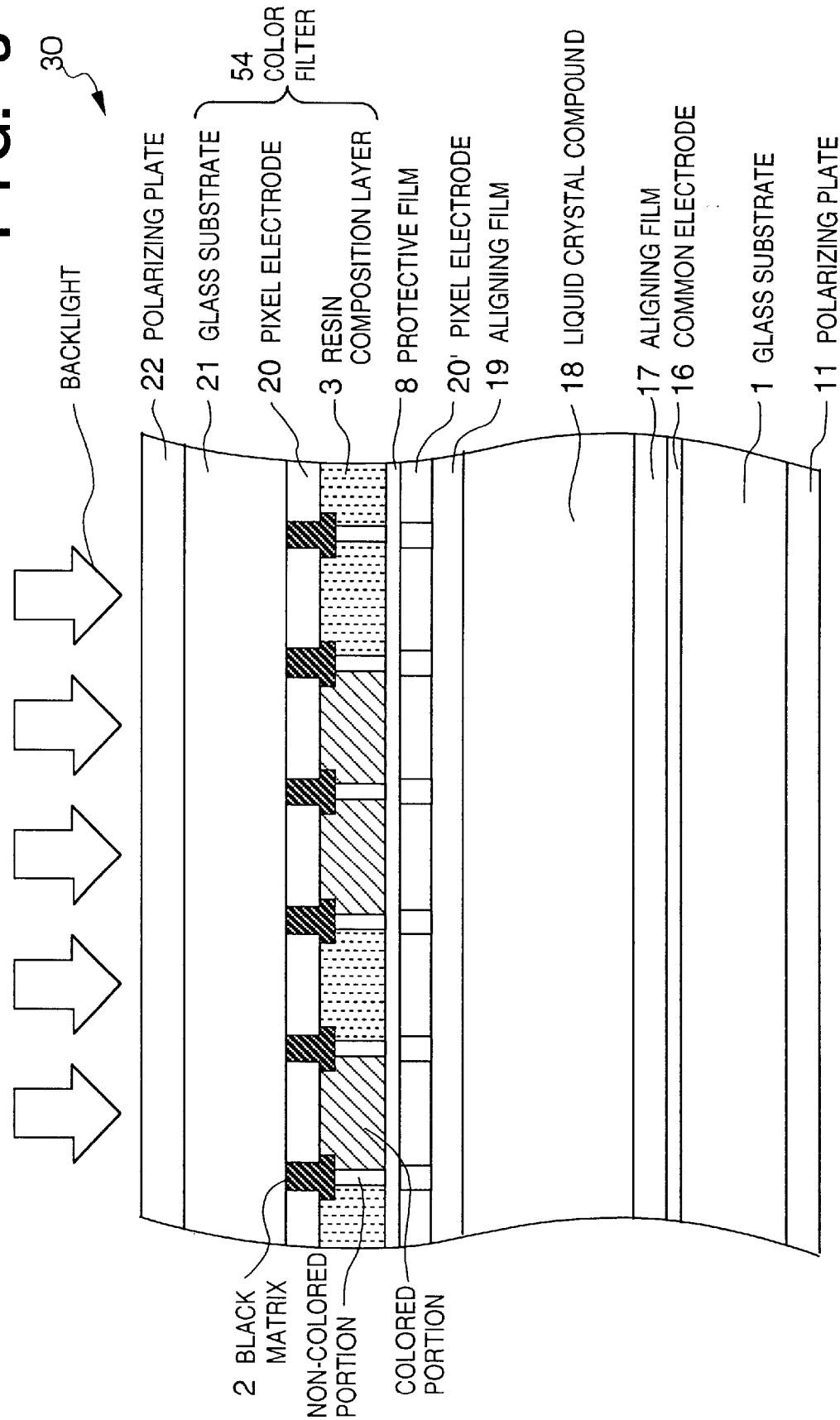
FIG. 8 is sectional view showing still another example of the basic structure of a color liquid crystal display device incorporating the color filter according to the embodiment.

FIGS. 6 to 8 are sectional views showing the basic structure of a color liquid crystal display device 30 incorporating the color filter manufactured by the present invention.

A color liquid crystal display device (color liquid crystal display) of the present invention is formed by joining the color filter substrate 1, manufactured by the color filter manufacturing method according to the present invention, and a counter substrate 21 together, and sealing a liquid crystal compound 18 therebetween. TFTs (Thin Film Transistors) and transparent pixel electrodes 20 are formed on the inner surface of one substrate 21 of the liquid crystal display device in the form of a matrix. The color filter substrate 54 is placed on the inner surface of the other substrate 1 such that R, G, and B coloring materials are positioned to oppose the pixel electrodes. A transparent counter electrode (common electrode) 16 is formed on the entire surface of the color filter. The black matrix 2 is generally formed on the color filter substrate 1 side (see FIG. 6). However, in a BM (Black Matrix) on-array type liquid crystal panel, such a black matrix is formed on the TFT substrate side opposing the color filter substrate (see FIG. 7). Aligning films 19 are formed within the planes of the two substrates. By performing a rubbing process for the aligning films, the liquid crystal molecules can be aligned in a predetermined direction. Polarizing plates 11 and 22 are bonded to the outer surfaces of the respective glass substrates. The liquid crystal compound 18 is filled in the gap (about 2 to 5 $\mu$m) between these glass substrates. As a backlight, a combination of a fluorescent lamp (not shown) and a scattering plate (not shown) is generally used. Display operation is performed by causing the liquid crystal compound to serve as an optical shutter for changing the transmittance for light emitted from the backlight. Note that the liquid crystal compound has the function of changing the amount of light applied on the color filter, and hence can also be called a light amount changing means.

As shown in FIG. 8, colored portions may be formed on the pixel electrodes 20 to implement the function of a color filter. That is, the place where colored portions constituting a color filter are formed is not limited to the surface of a glass substrate.

A case wherein such a liquid crystal display device is applied to an information processing apparatus will be described below with reference to FIGS. 9 to 11. Note that this information processing apparatus is manufactured by connecting an image signal supply means for supplying an image signal to a liquid crystal display device having a color filter manufactured by using the manufacturing method according to the present invention.

Figure 9:
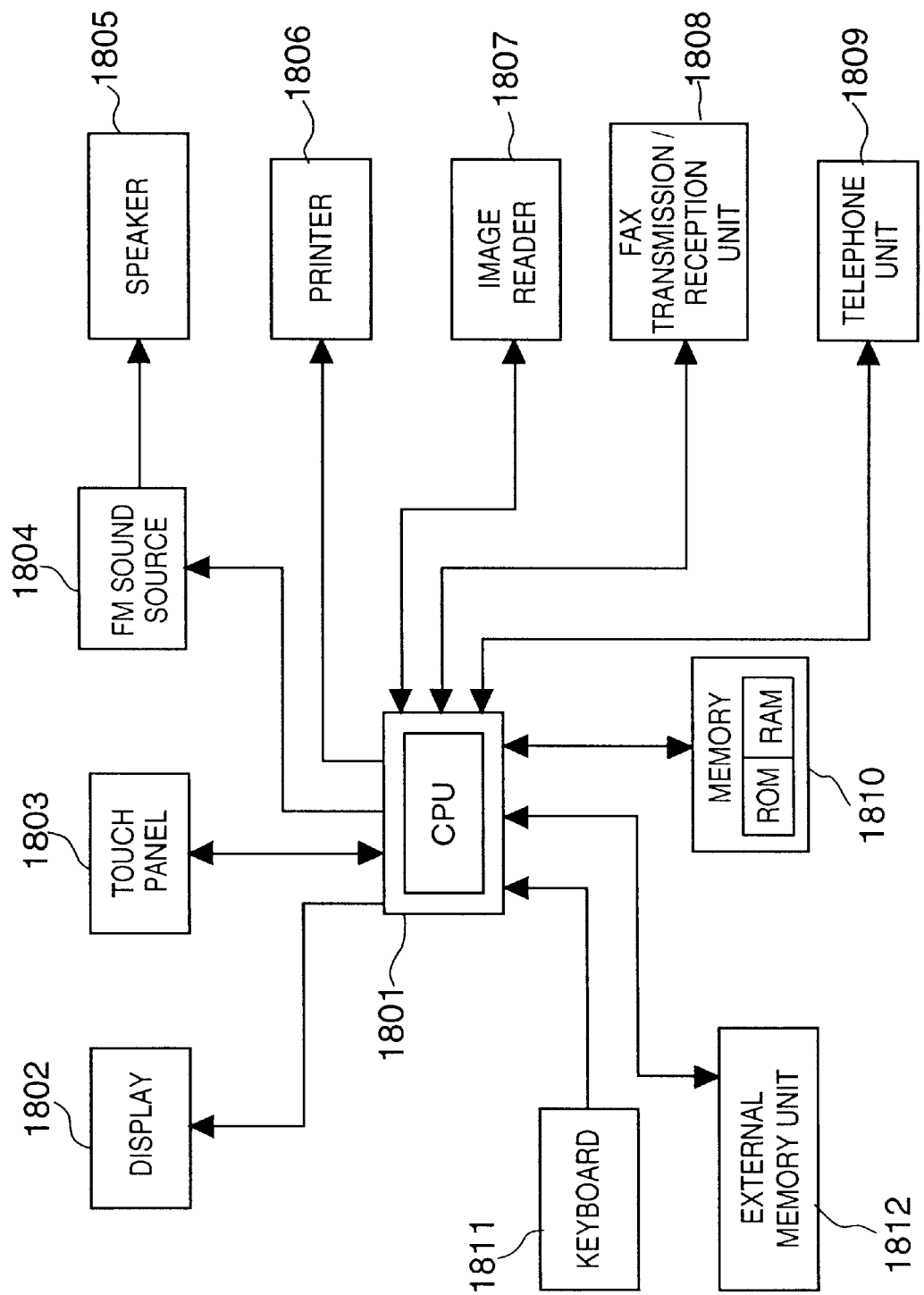
FIG. 9 is a block diagram showing an information processing apparatus using the liquid crystal display device.

FIG. 9 is a block diagram showing the schematic arrangement of an information processing apparatus serving as a wordprocessor, a personal computer, a facsimile apparatus, and a copying machine, to which the above liquid crystal display device is applied.

Referring to FIG. 9, reference numeral 1801 denotes a control unit (image signal supply means) for controlling the overall apparatus. The control unit 1801 includes a CPU such as a microprocessor and various I/O ports, and performs control by outputting/inputting control signals, data signals, and the like to/from the respective units. Reference numeral 1802 denotes a display unit for displaying various menus, document information, and image data read by an image reader 1807, and the like on the display screen; 1803, a transparent, pressure-sensitive touch panel mounted on the display unit 1802. By pressing the surface of the touch panel 1803 with a finger of the user or the like, item input operation, coordinate position input operation, or the like can be performed on the display unit 1802.

Reference numeral 1804 denotes an FM (Frequency Modulation) sound source unit for storing music information, created by a music editor or the like, in a memory unit 1810 or external memory unit 1812 as digital data, and reading out the information from such a memory, thereby performing FM modulation of the information. An electrical signal from the FM sound source unit 1804 is converted into an audible sound by a speaker unit 1805. A printer unit 1806 is used as an output terminal for a wordprocessor, a personal computer, a facsimile apparatus, and a copying machine.

Reference numeral 1807 denotes an image reader unit for photoelectrically reading original data. The image reader unit 1807 is placed midway along the original convey passage and designed to read originals for facsimile and copy operations and other various originals.

Reference numeral 1808 denotes a transmission/reception unit for the facsimile (FAX) apparatus. The transmission/reception unit 1808 transmits original data read by the image reader unit 1807 by facsimile, and receives and decodes a sent facsimile signal. The transmission/reception unit 1808 has an interface function for external units. Reference numeral 1809 denotes a telephone unit having a general telephone function and various telephone functions such as an automatic telephone answering function.

Reference numeral 1810 denotes a memory unit including a ROM for storing system programs, manager programs, application programs, fonts, and dictionaries, a RAM for storing an application program loaded from the external memory unit 1812 and document information, a video RAM, and the like.

Reference numeral 1811 denotes a keyboard unit for inputting document information and various commands.

Reference numeral 1812 denotes an external memory unit using a floppy disk, a hard disk, and the like. The external memory unit 1812 serves to store document information, music and speech information, application programs of the user, and the like.

Figure 10:
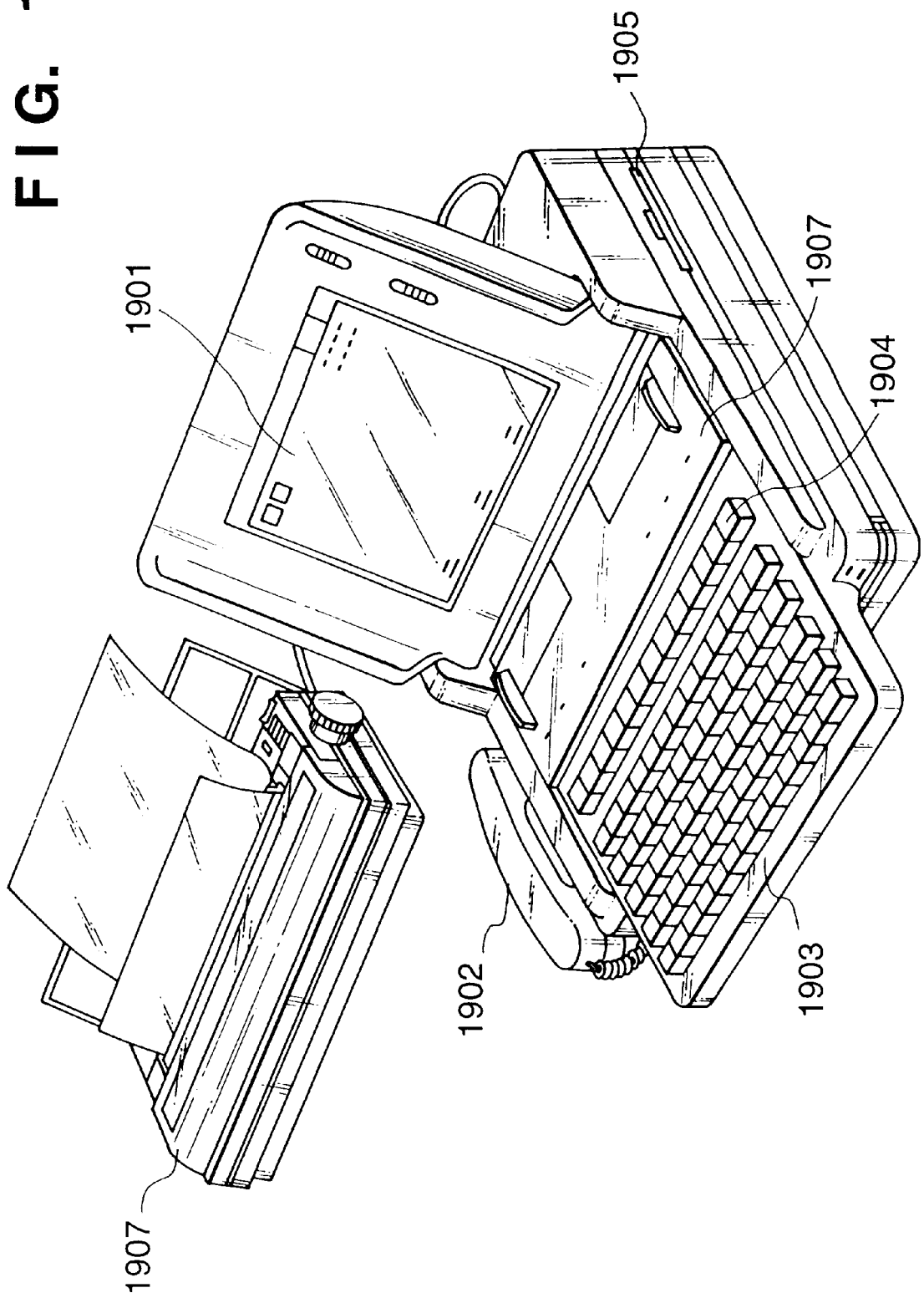
FIG. 10 is a perspective view showing the information processing apparatus using the liquid crystal display device.

FIG. 10 is a schematic perspective view of the information processing apparatus in FIG. 9.

Referring to FIG. 10, reference numeral 1901 denotes a flat panel display using the above liquid crystal display device, which displays various menus, graphic pattern information, document information, and the like. Coordinate input or item designation input operation can be performed on the flat panel display 1901 by pressing the surface of the touch panel 1803 with a finger of the user or the like. Reference numeral 1902 denotes a handset used when the apparatus is used as a telephone set. A keyboard 1903 is detachably connected to the main body via a cord and is used to perform various document functions and input various data. This keyboard 1903 has various function keys 1904. Reference numeral 1905 denotes an insertion port through which a floppy disk is inserted into the external memory unit 1812.

Reference numeral 1906 denotes an original table on which an original to be read by the image reader unit 1807 is placed. The read original is discharged from the rear portion of the apparatus. In a facsimile receiving operation or the like, received data is printed out by an ink-jet printer 1907.

When the above information processing apparatus is to serve as a personal computer or a wordprocessor, various kinds of information input through the keyboard unit 1811 are processed by the control unit 1801 in accordance with a predetermined program, and the resultant information is output, as an image, to the printer unit 1806.

When the information processing apparatus is to serve as a receiver of a facsimile apparatus, facsimile information input through the transmission/reception unit 1808 via a communication line is subjected to reception processing in the control unit 1801 in accordance with a predetermined program, and the resultant information is output, as a received image, to the printer unit 1806.

When the information processing apparatus is to serve as a copying machine, an original is read by the image reader unit 1807, and the read original data is output, as an image to be copied, to the printer unit 1806 via the control unit 1801. Note that when the information processing apparatus is to serve as a receiver of a facsimile apparatus, original data read by the image reader unit 1807 is subjected to transmission processing in the control unit 1801 in accordance with a predetermined program, and the resultant data is transmitted to a communication line via the transmission/reception unit 1808.

Figure 11:
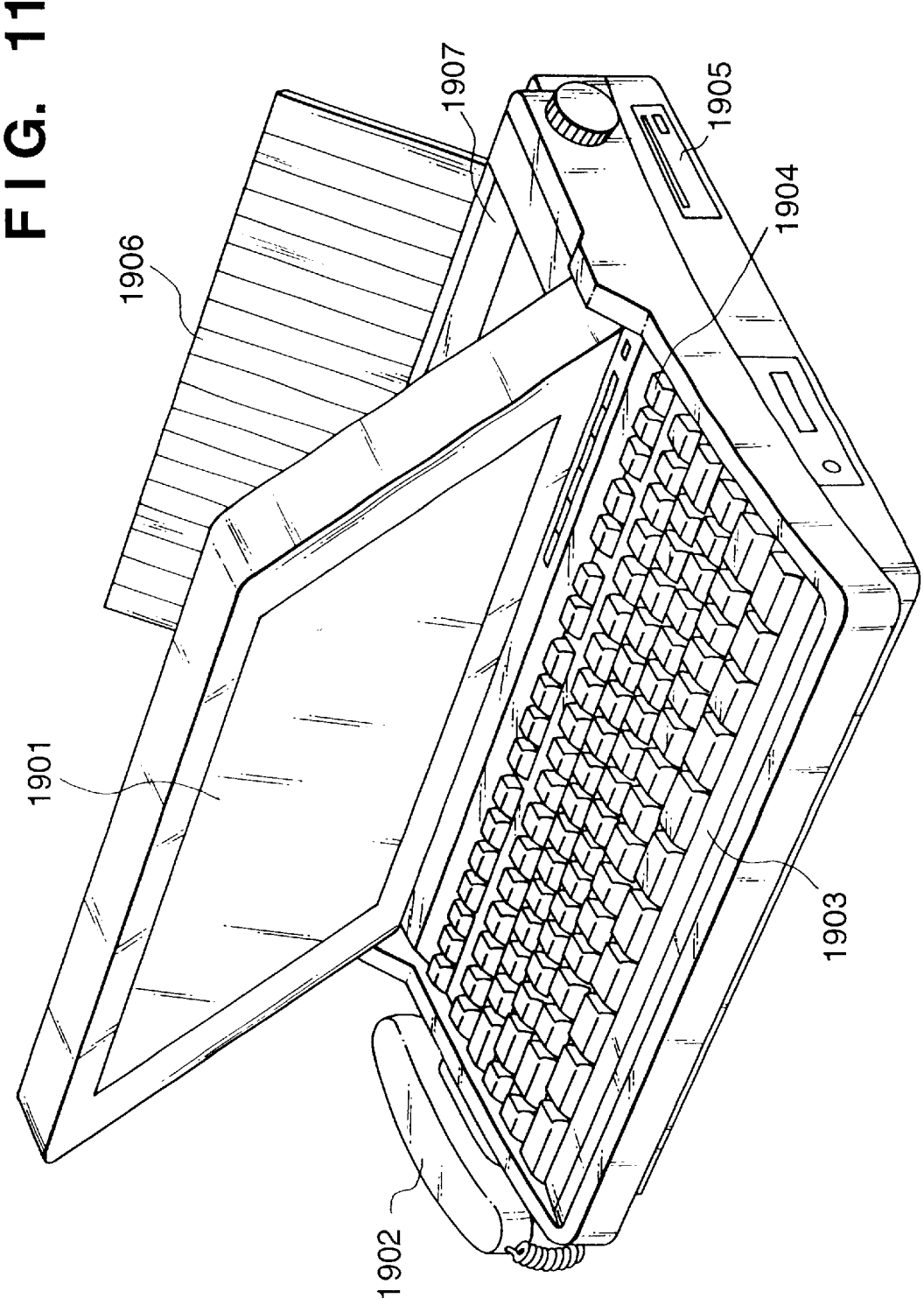
FIG. 11 is a perspective view showing the information processing apparatus using the liquid crystal display device.

Note that the above information processing apparatus may be designed as an integrated apparatus incorporating an ink-jet printer in the main body, as shown in FIG. 11. In this case, the portability of the apparatus can be improved. The same reference numerals in FIG. 11 denote parts having the same functions as those in FIG. 10. Such an apparatus having a display device is manufactured by ① manufacturing a color filter by the manufacturing method according to the present invention, ② manufacturing a display device by filling the space between the color filter and a counter substrate with a liquid crystal compound, and ③ connecting an image signal supply means to the display device.

Figure 12:
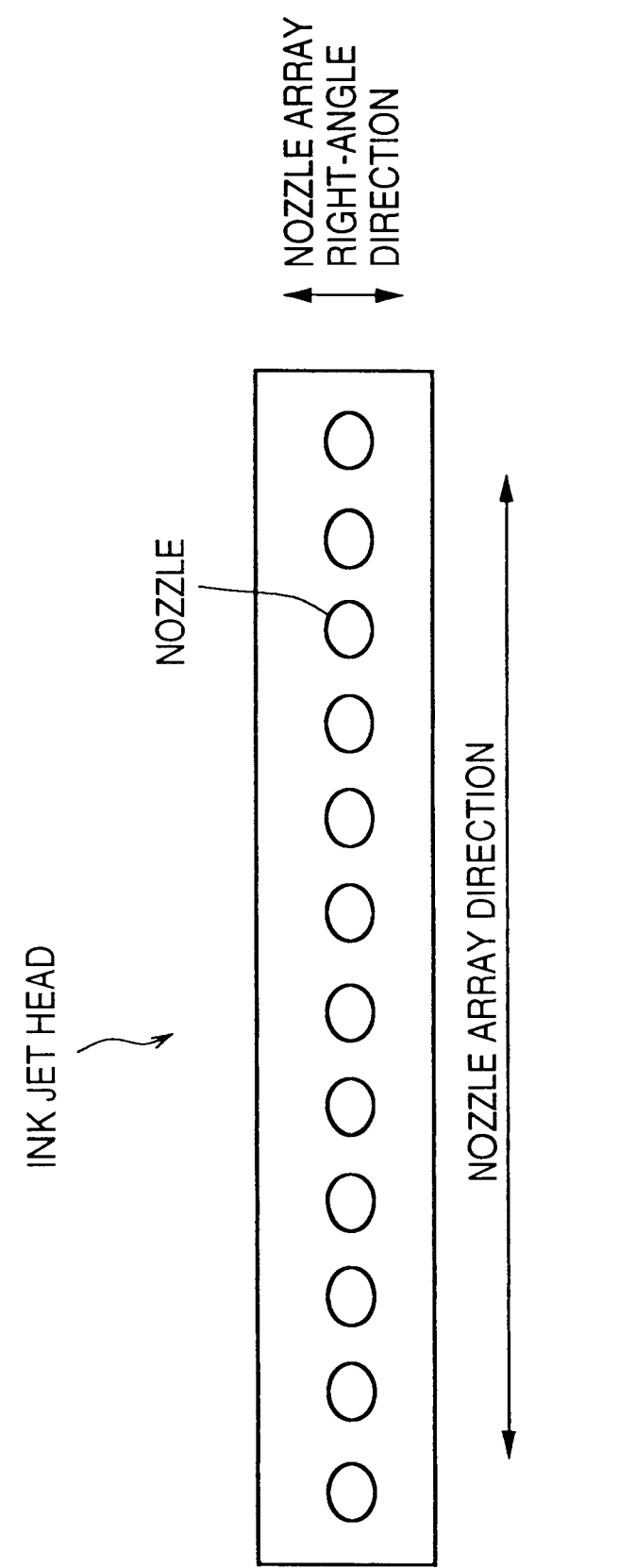
FIG. 12 is a schematic view showing the nozzle surface of an ink-jet head.

FIG. 12 is a view showing the nozzle surface of an ink-jet head having a plurality of nozzles.

In this embodiment, a nozzle array direction and nozzle array right-angle direction are defined as shown in FIG. 12.

Figure 13:
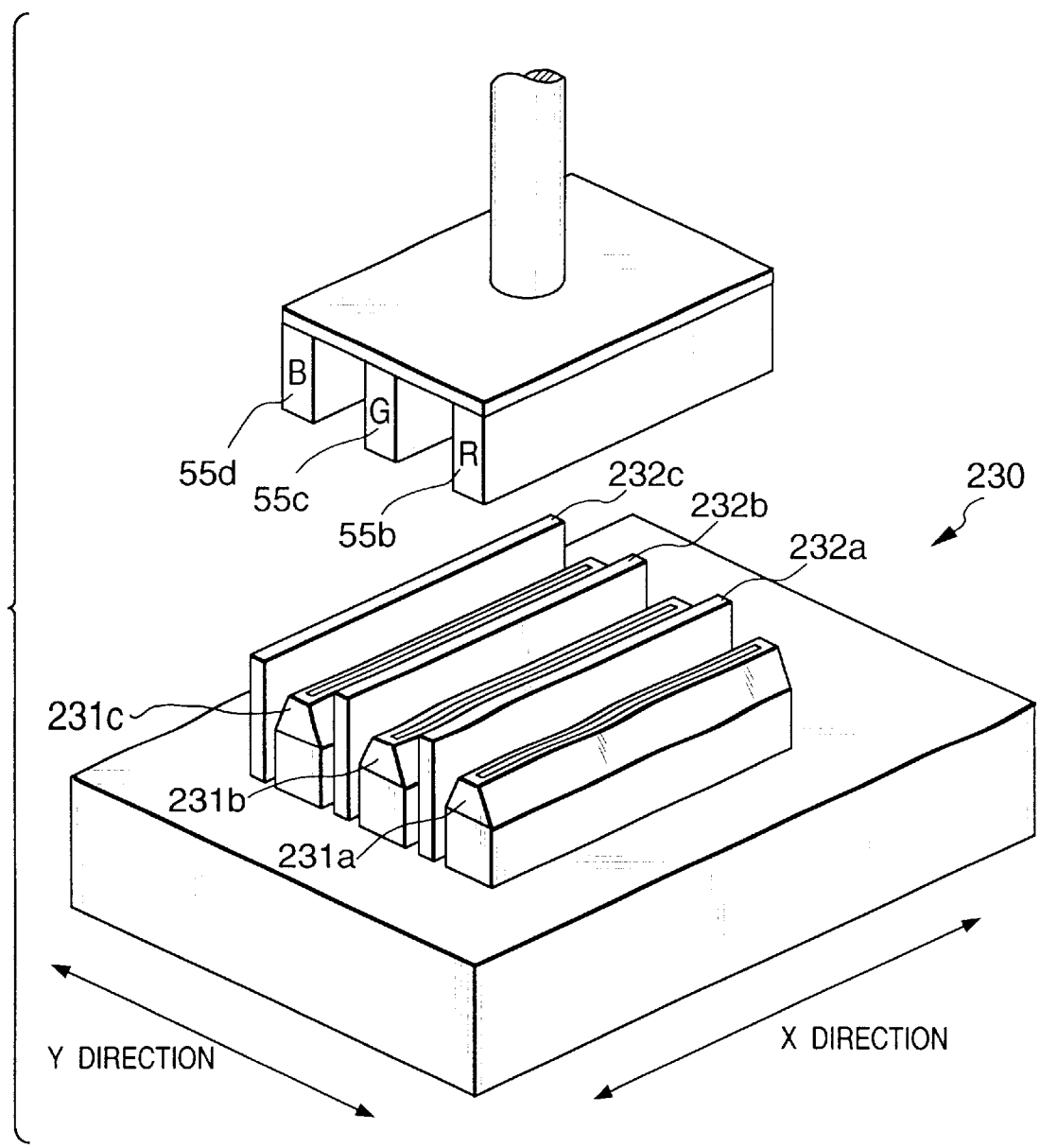
FIG. 13 is a perspective view showing the structure of a recovery unit for ink-jet heads.

FIG. 13 is a view showing the structure of a recovery unit 230.

Referring to FIG. 13, reference numerals 231*a*, 231*b*, and 231*c* denote caps respectively corresponding to the red, green, and blue ink-jet heads 55*b*, 55*c*, and 55*d*. While the ink-jet heads 55*b*, 55*c*, and 55*d* perform no coloring operation for a color filter on the glass substrate 1, the caps 231*a*, 231*b*, and 231*c* respectively cover the corresponding nozzle surfaces of the ink-jet heads 55*b*, 55*c*, and 55*d* to prevent ink discharge failures.

Reference numerals 232*a*, 232*b*, and 232*c* denote blades (wiping members) for wiping the nozzle surfaces. For these members, a material having water absorption properties, e.g., a sponge, is preferably used.

As shown in FIG. 13, the blades 232*a*, 232*b*, and 232*c* respectively wipe out ink droplets adhering to the nozzle surfaces of the ink-jet heads 55*b*, 55*c*, and 55*d* or ink mist adhering to the nozzle surfaces, which is produced upon discharging of ink, as the recovery unit 230 operates in the X and Y directions.

In this embodiment, the X and Y directions in which the recovery unit 230 operates are defined such that the X direction coincides with the nozzle array direction in FIG. 12, and the Y direction coincides with the nozzle array right-angle direction in FIG. 12.

Figure 14:
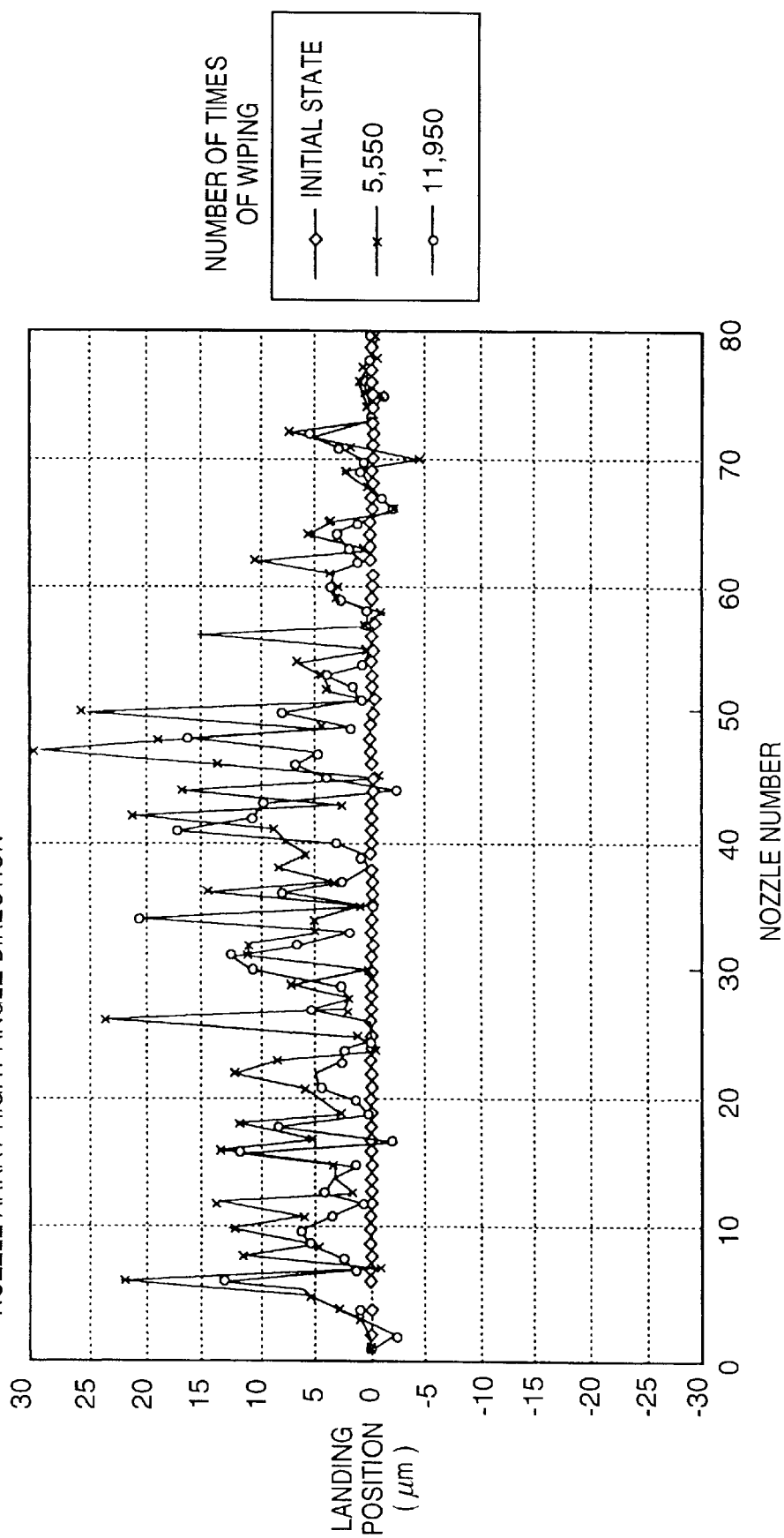
FIG. 14 is a graph showing landing position offsets of ink discharged from the ink-jet head.
Figure 15:
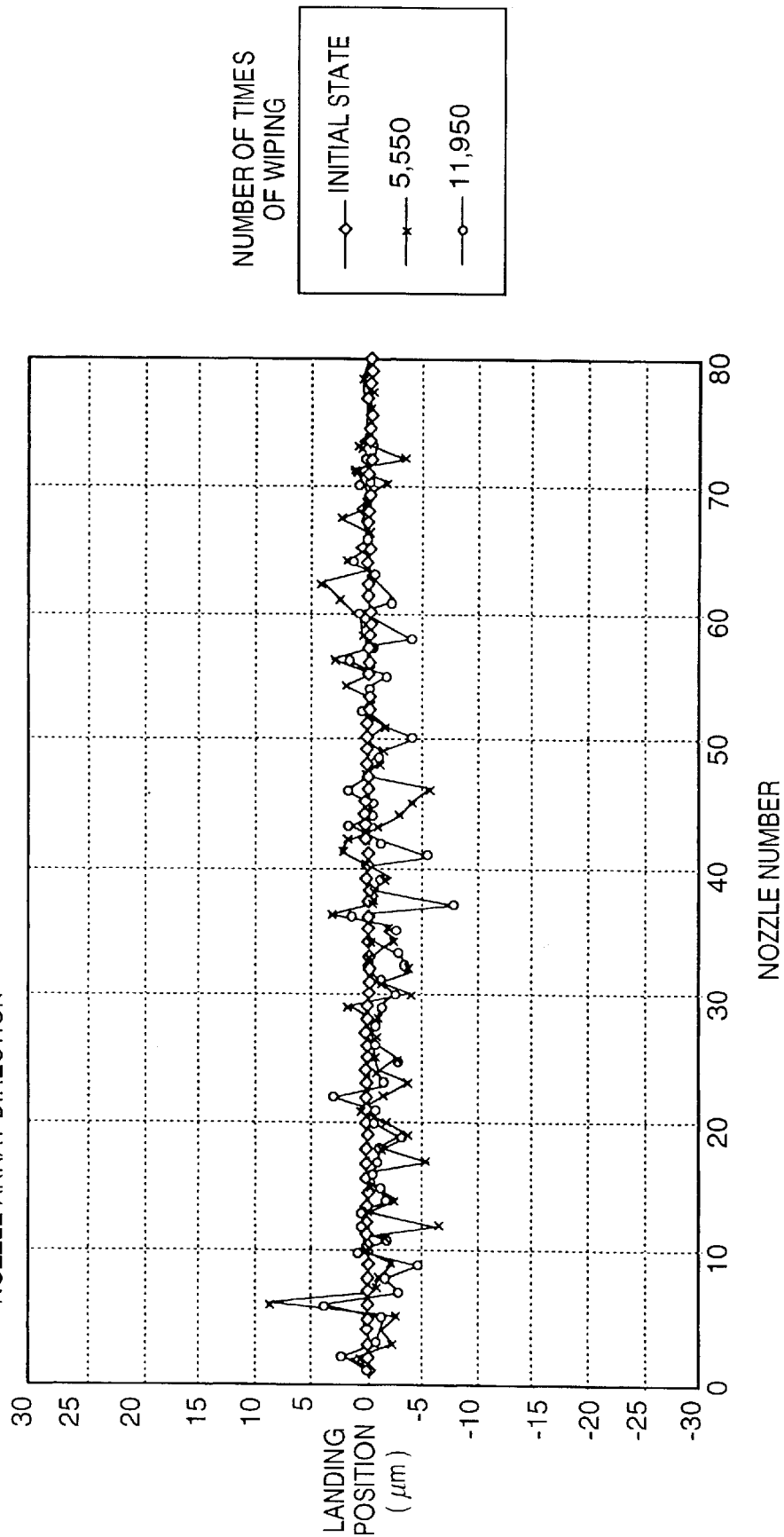
FIG. 15 is a graph showing landing position offsets of ink discharged from the ink-jet head.

FIGS. 14 and 15 are graphs showing the results obtained by measuring landing position offsets when wiping operation is repeatedly performed by operating the recovery unit 230 in FIG. 13 in the Y direction (nozzle array right-angle direction).

FIG. 14 is a graph showing the result obtained by measuring landing position offsets in the nozzle array right-angle direction (wiping direction). FIG. 15 is a graph showing the result obtained by measuring landing position offsets in the nozzle array direction.

As is obvious from FIGS. 14 and 15, in the nozzle array right-angle direction as the wiping direction, landing position offsets gradually increase with an increase in the number of times wiping is performed. In the nozzle array direction, landing position offsets hardly change even with an increase in the number of times wiping is performed.

As is obvious, therefore, the wiping direction is related to the landing position offset direction, and the direction in which landing position offsets occur can be controlled by controlling the wiping direction.

Figure 16:
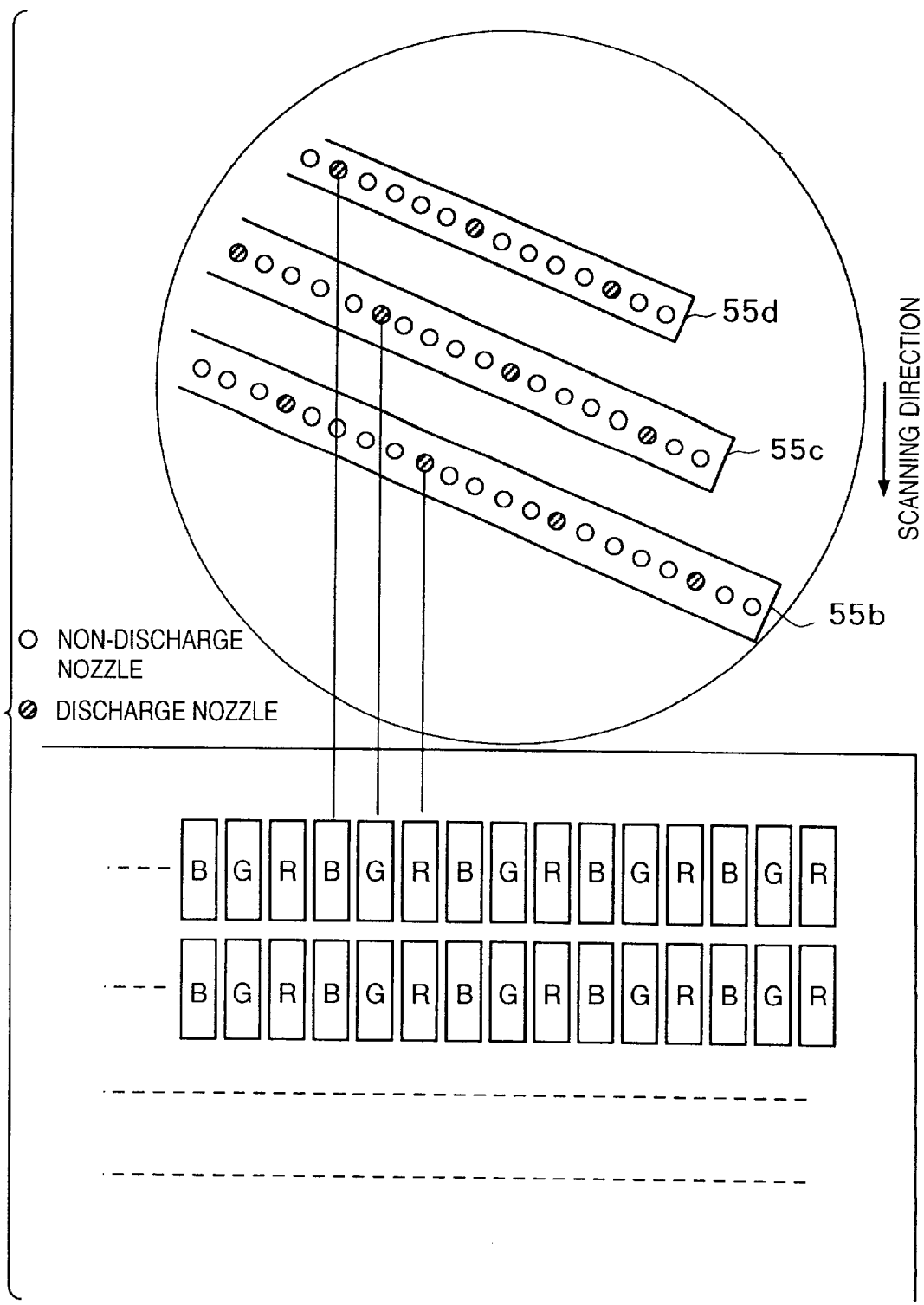
FIG. 16 is a view showing the relationship between the coloring pixels of a color filter and the nozzles of ink-jet heads.

FIG. 16 is a schematic view showing part of the coloring area of a color filter and the states of the corresponding ink-jet heads in a case wherein a color filter having an RGB stripe pattern is colored by using a plurality of nozzles of the ink-jet heads.

In general, the pitch of pixels of the same color of a color filter differs from the nozzle pitch of an ink-jet head used in a general printer or the like. Therefore, the pixel pitch and nozzle pitch must be matched to each other.

In the case of the ink-jet heads in this embodiment, since the nozzle pitch is smaller than the pitch of pixels of the same color, coloring is performed by discharging ink from every several nozzles.

It is generally known that if the pixel pitch does not agree with a multiple of the nozzle pitch, a method of tilting the heads is used.

As shown in FIG. 16, the ink-jet heads 55*b*, 55*c*, and 55*d* are tilted with respect to the coloring area of the color filter, and ink is discharged every four nozzles.

In this case, the ink-jet heads 55*b*, 55*c*, and 55*d* respectively color the color filter in R, G, and B, and are relatively positioned to color pixels of the respective colors.

FIGS. 17 to 21 are schematic views showing landing position offsets, in comparison with each other, when these ink-jet heads are repeatedly wiped while the wiping direction is changed by the recovery unit 230.

For the sake of descriptive convenience, each schematic view showing landing positions exemplifies the case wherein coloring is performed by using the red ink-jet head 55*b*. However, the same applies to the remaining colors.

Figure 17:
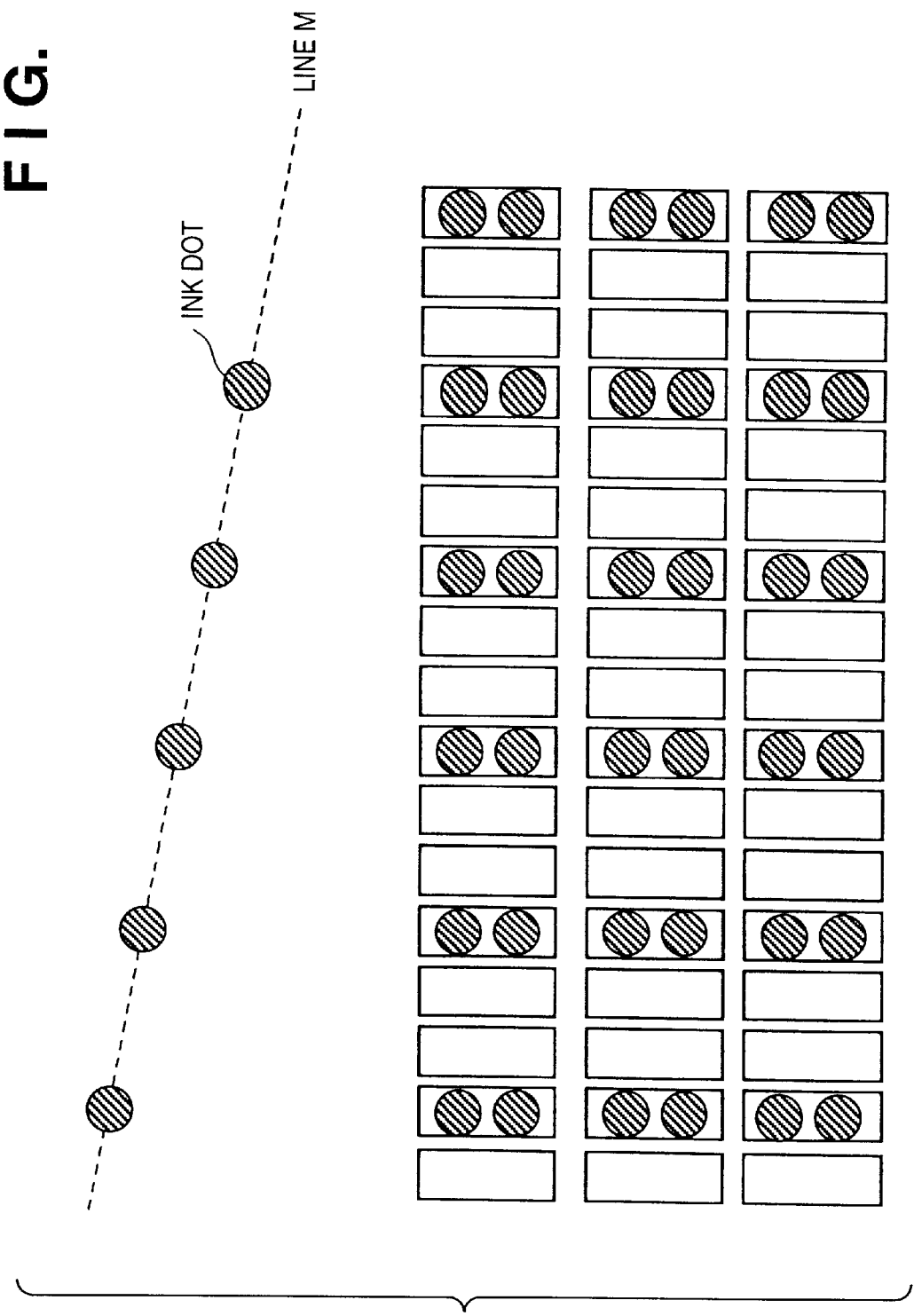
FIG. 17 is a view showing the landing positions of ink discharged from the ink-jet head in an initial state.

FIG. 17 is a schematic view showing the initial landing positions (landing points). A line M in FIG. 17 is a target landing line for ink. In this case, since ink lands on the target landing line (target positions), no landing position offset occurs.

In the case shown in FIG. 17, ink discharged from the ink-jet head 55*b* lands at predetermined positions within coloring pixels, and hence the resultant color filter does not become defective.

Figure 18:
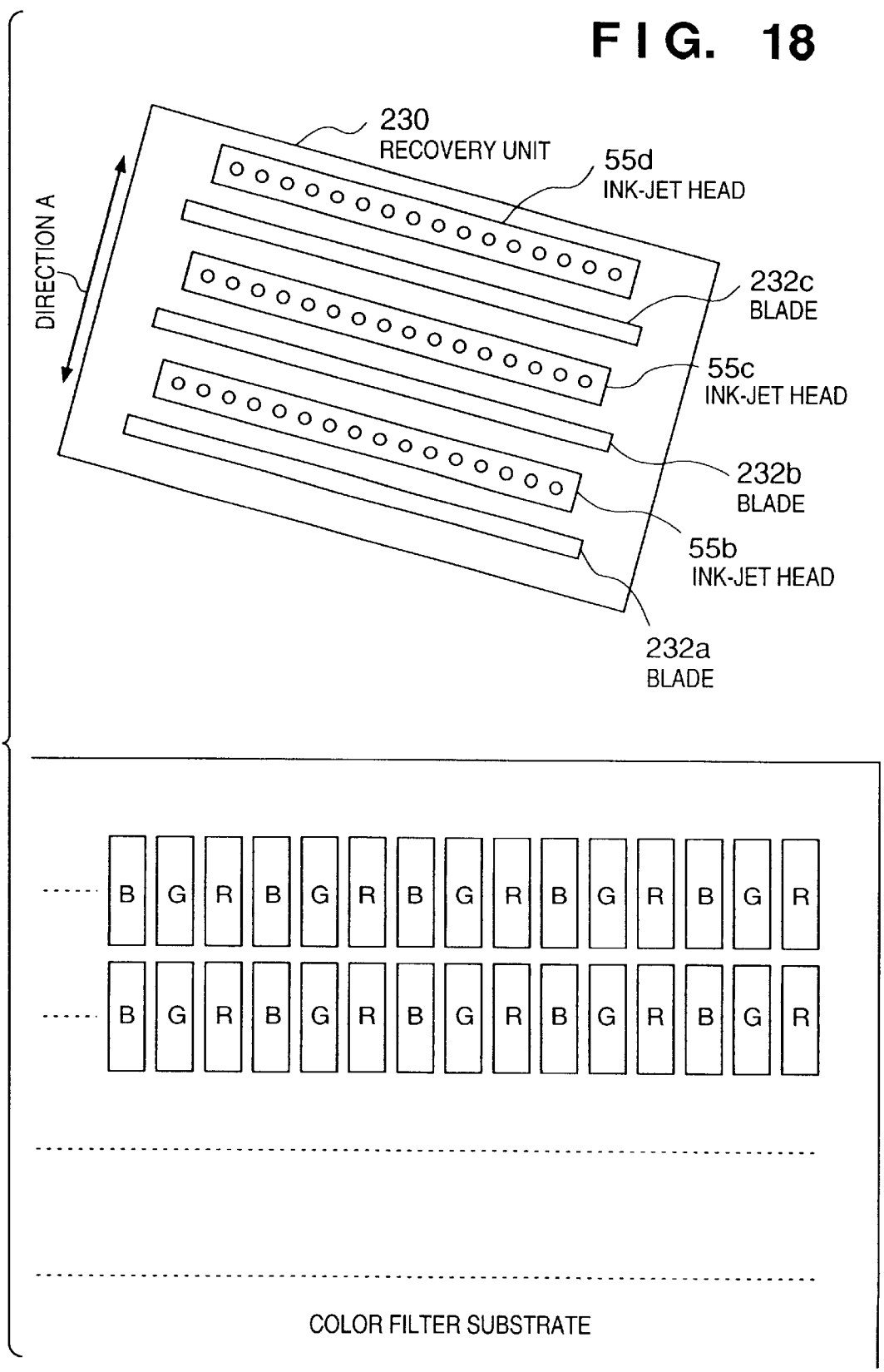
FIG. 18 is a view showing the relationship between the coloring pixels of a color filter, the ink-jet heads, and the recovery unit in the operating direction.
Figure 19:
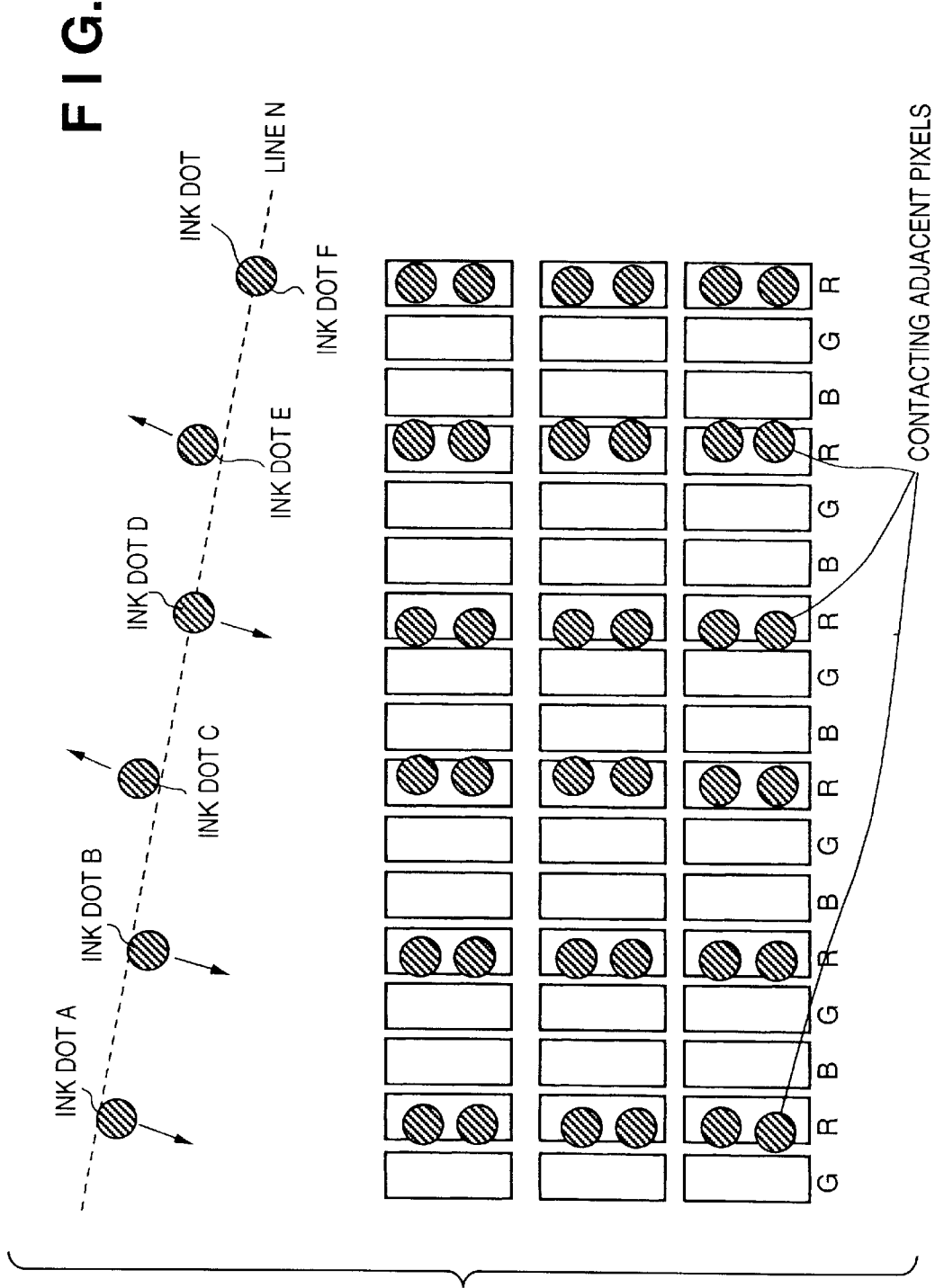
FIG. 19 is a view showing the landing positions of ink discharged from the ink-jet head when wiping is repeated with the arrangement shown in FIG. 18.

When the head unit 55 is repeatedly wiped while the blades of the recovery unit 230 are moved in the A direction with respect to the head unit 55 as shown in FIG. 18, landing position offsets occur as shown in FIG. 19. That is, ink landing point offsets occur in the same direction as the wiping direction. In this case, ink discharged from the ink-jet head 55b lands outside pixels. For this reason, ink contacts adjacent pixels of other colors to cause color mixing, resulting in a defective color filter. Note that a line N in FIG. 19 is a target landing line. In this case, of ink dots A, B, C, D, E, and F, the ink dots other than the ink dot F land outside the target landing line, causing landing position offsets. Since the offset directions differ from the direction in which pixels of the same color are arrayed, ink enters adjacent pixels of other colors, resulting in color mixing.

Figure 20:
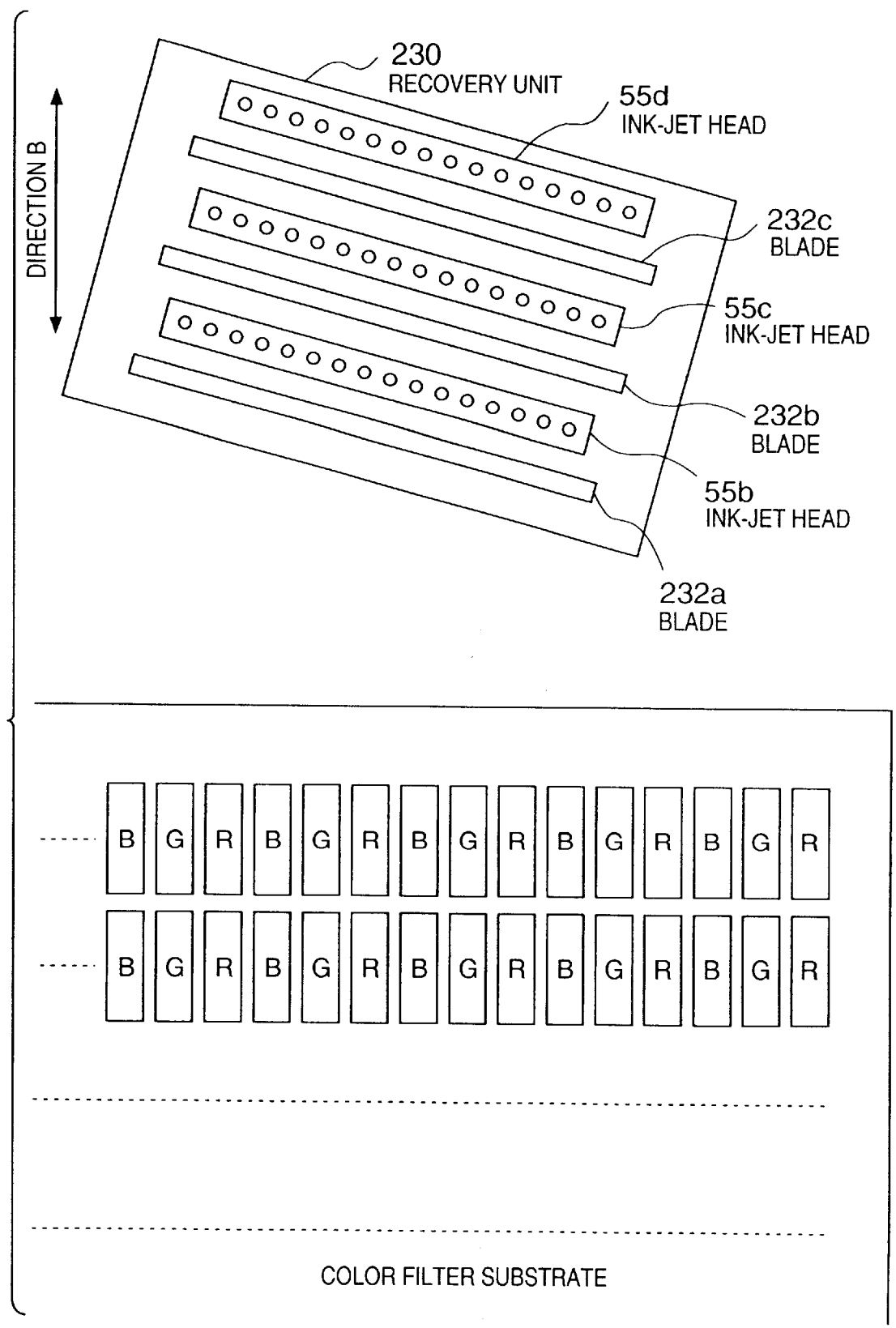
FIG. 20 is a view showing the relationship between the coloring pixels of a color filter, the ink-jet heads, and the recovery unit in the operating direction.
Figure 21:
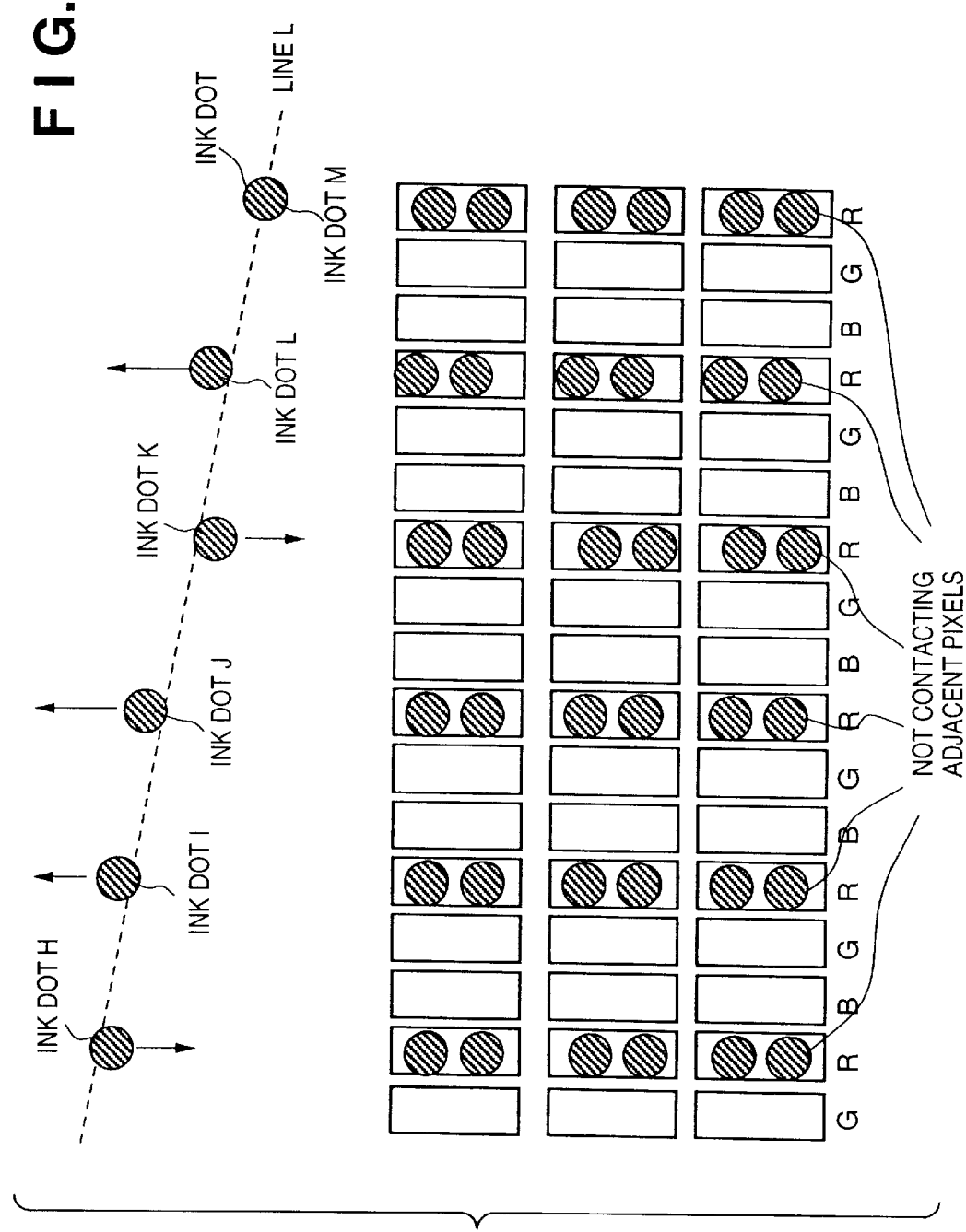
FIG. 21 is a view showing the landing positions of ink discharged from the ink-jet head when wiping is repeated with the arrangement shown in FIG. 20.

When the recovery unit 230 is moved in the B direction with respect to the ink-jet heads, i.e., the blades are moved in the direction in which pixels of the same color are arrayed, as shown in FIG. 20, landing position offsets occur as shown in FIG. 21. That is, ink landing point offsets occur in the same direction as the wiping direction. In this case, since the direction in which pixels of the same color are arrayed coincides with the wiping direction, even if ink landing point offsets occur in the wiping direction, the offset ink does not contact adjacent pixels. This makes it possible to suppress the occurrence of color mixing with different colors. Note the a line L in FIG. 21 is a target landing line. In this case, of ink dots H, I, J, K, L, and M, the ink dots other than the ink dot K land outside the target landing line, causing landing position offsets. However, since the offset direction coincides with the direction in which pixels of the same color are arrayed, even if offsets occur, the offset ink enters pixels of the same color. This prevents color mixing.

Figure 26:
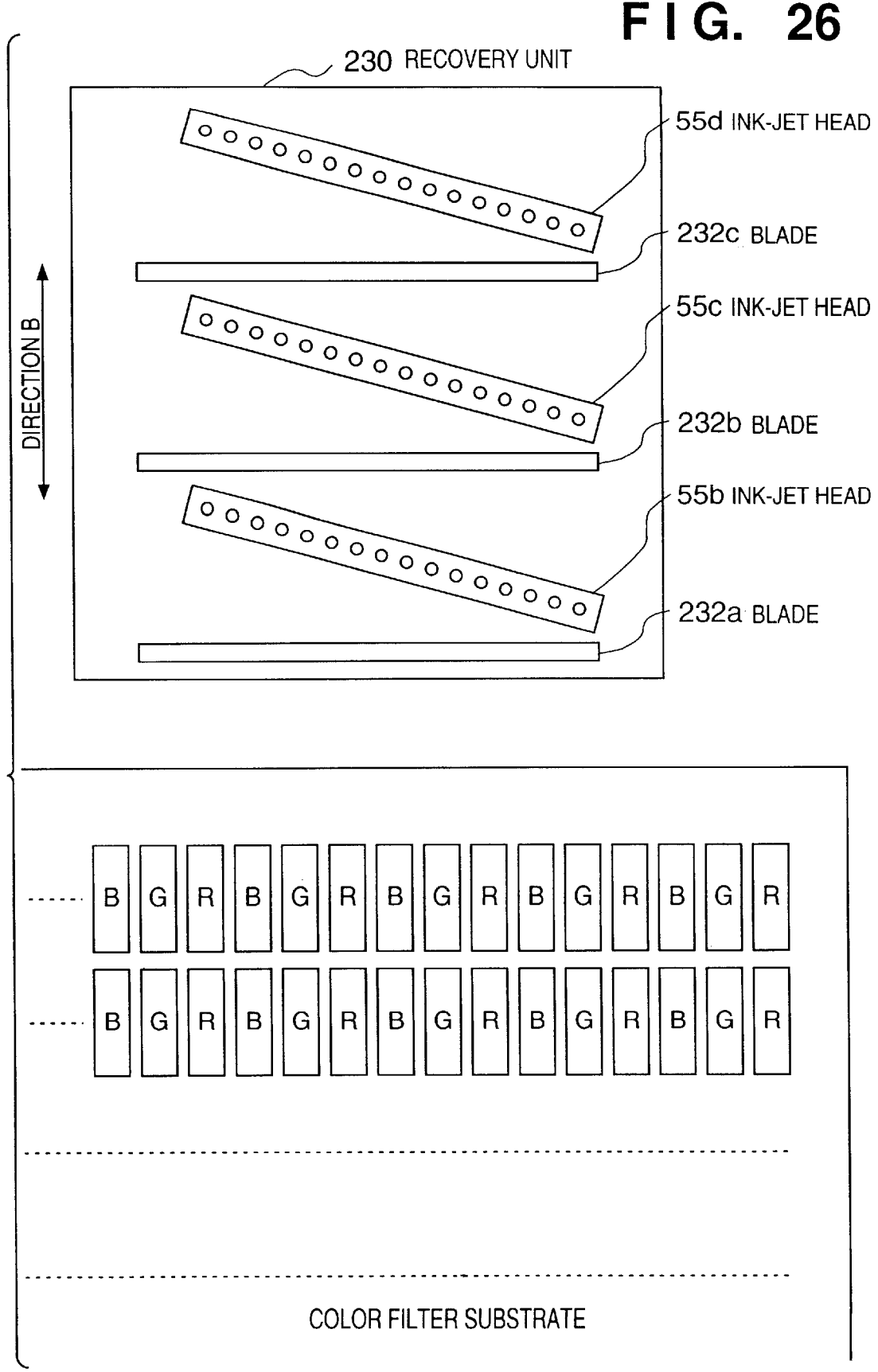
FIG. 26 is a view showing the positional relationship between ink-jet heads and blades.

When the recovery unit 230 is placed (blades 232 are tilted with respect to the head unit 55) as shown in FIG. 26, and the blades are operated in the B direction, i.e., the direction in which pixels of the same color are arrayed, ink landing position offsets also occur as shown in FIG. 21.

As described above, the positional relationship between the blades 232 in the recovery unit 230 and the head unit 55 is not specifically limited. No problem arises if the operating direction (wiping direction) of the blades coincides with the direction in which pixels of the same color are arrayed, and the nozzle surfaces of the ink-jet heads can be wiped.

Figure 27:
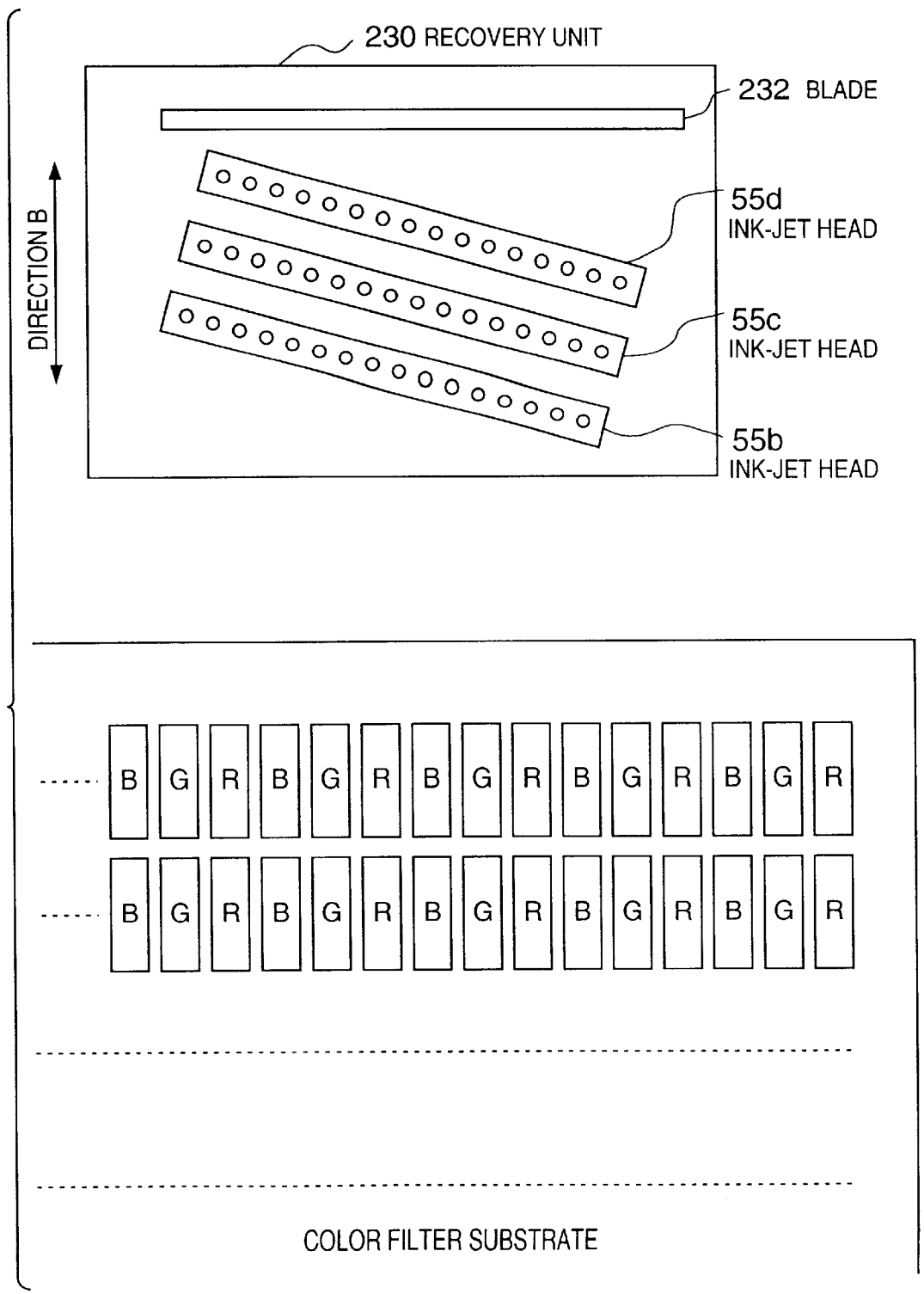
FIG. 27 is a view showing the positional relationship between ink-jet heads and blades.

If the nozzle surfaces of the ink-jet heads can be cleanly wiped, and ink of a color different from that of each ink-jet head does not adhere to its nozzle surface, a recovery unit 230 having only one blade, as shown in FIG. 27, may be used.

Figure 28A:
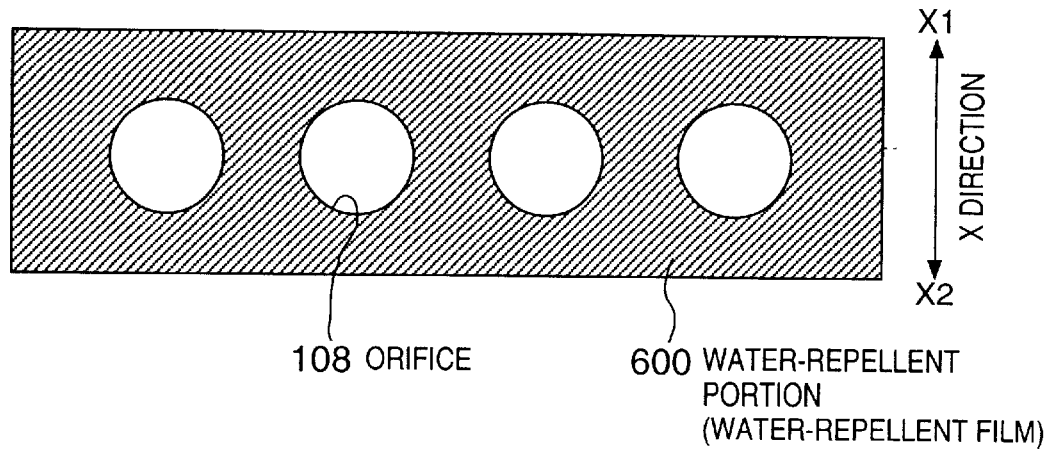
FIGS. 28A to 28C are schematic views showing changes in the state of the orifice surface of the ink-jet head.
Figure 28B:
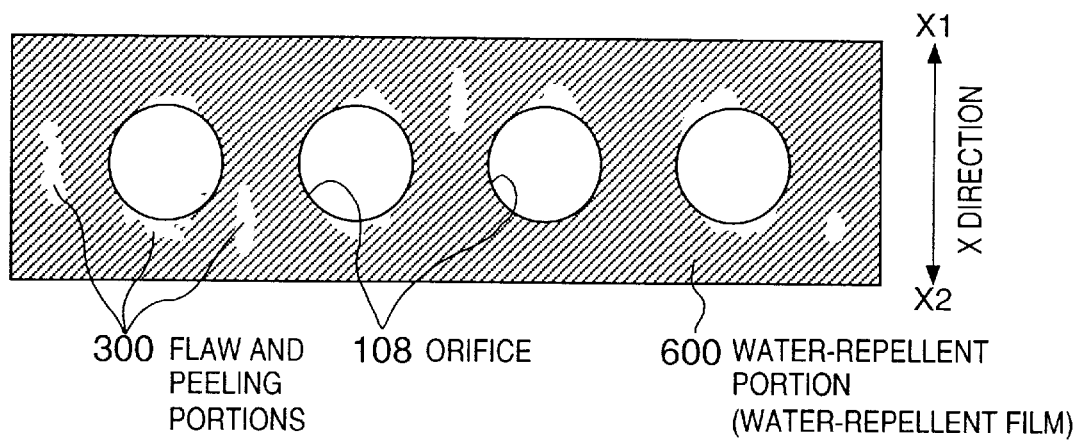
Figure 28C:
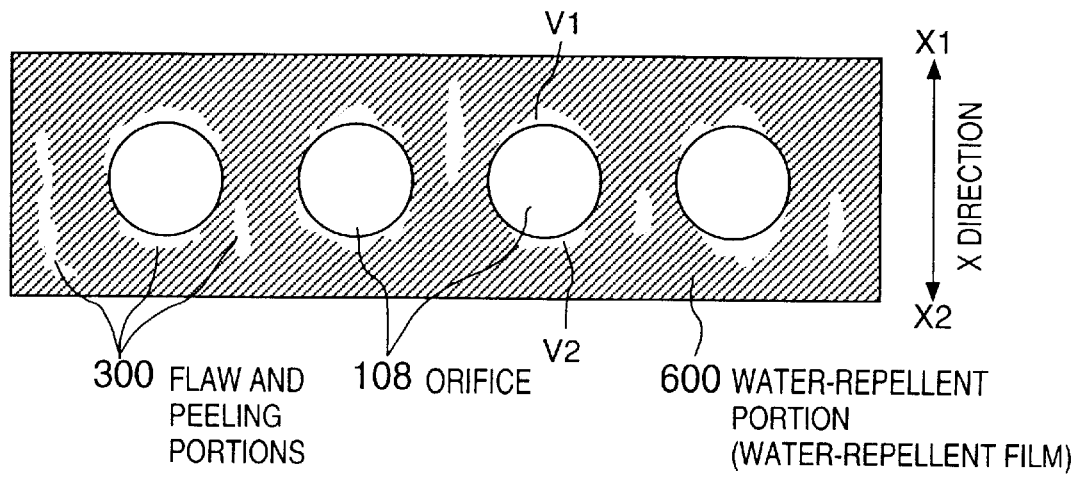

Changes in the state of the orifice surface of the ink-jet head will be described in detail next with reference to the accompanying schematic views. FIGS. 28A to 28C are enlarged schematic views of a portion near orifices of the ink-jet head.

FIG. 28A is a view showing the initial state of the portion near the orifices. As is obvious from FIG. 28A, in the initial state, the orifice surface including peripheral portions of orifices is entirely covered with a protective film (protective member), and no flaw, peeling, and the like 300 have occurred.

Note that the protective film covering the orifice surface of each head preferably has water repellency. That is, the orifice surface is preferably covered with a water-repellent film (water-repellent member) 600. This embodiment therefore uses heads whose orifice surfaces are covered with water-repellent films. Note that the initial state indicates a state wherein no wiping operation has been performed or wiping has been performed a number of times that is not enough to cause flaw, peeling, and the like.

Note that a flow or peeling portion is a portion of the water-repellent member which has deteriorated in water-repellent function (water-repellent effect), and hence can be called a water repellency deterioration portion. In addition, this portion is a portion of the protective member which has deteriorated in protective function, and hence can be called a protective function deterioration portion. Furthermore, a flaw or peeling portion is a portion of the water-repellent member or protective member in which a defect is caused, and hence can be called a defective portion. Moreover, this portion is a portion of the water-repellent member or protective member which is worn, and hence can be called a worn portion. This water-repellent member or protective member may cover at least peripheral (surrounding) portions of the orifices, and need not always cover the entire orifice surface. However, this member preferably covers the entire orifice surface.

FIG. 28B is a view showing the state of the orifice surface including the peripheral portions of orifices after wiping operation is repeated in the x direction. When wiping operation is repeated, flaw and peeling portions 300 are produced in the water-repellent film 600 of the peripheral portions of the orifices.

FIG. 28C shows the state of the orifice surface including the peripheral portions of the orifices after wiping operation is further repeated in the x direction. After wiping operation is further repeated, the flow and peeling portions in the water-repellent film 600 have increased in size as compared with the state shown in FIG. 28B. In addition, the flaw and peeling portions do not simply increase in size but increase under a certain rule. More specifically, the flaw and peeling portions in the water-repellent film increase in size in the same direction as the wiping direction (x direction).

As described above, flaw and peeling portions produced in a water-repellent film increase in size in the wiping direction as the number of times of wiping increases. That is, as wiping operation is repeated, the flaw and peeling portions in the water-repellent film extend in the same direction as the wiping direction. Flaw and peeling portions do not uniformly distribute in the entire orifice surface of a water-repellent film but tend to distribute in the peripheral portions of orifices, in particular.

If flaw and peeling portions like those described above are produced, ink tends to remain on the peripheral portions of the orifices during or after wiping operation. As a consequence, ink droplets discharged from orifices are influenced by the residual ink and drawn thereto. The fact that ink droplets are drawn to the residual ink indicates that they are drawn to the portions where ink remains, i.e., the flaw and peeling portions. Since the flaw and peeling portions exist in the same direction as the wiping direction, the discharged ink is also drawn in this direction (wiping direction), and the flying direction of ink droplets changes to the same direction as the wiping direction. As a consequence, the landing positions of ink droplets are offset in the same direction as the wiping direction. In addition, as the flaw and peeling portions in the peripheral portions of orifices increase, the amount of residual ink increases. Accordingly, the offset amounts of ink landing positions increase. That is, as wiping operation is repeated, flaw and peeling portions are gradually produced in the same direction as the wiping direction. As the flaw and peeling portions increase in size, the ink landing positions are offset in the same direction as the wiping direction.

A mechanism in which ink landing positions are offset as wiping operation is repeated will be described in detail next with reference to FIGS. 29A to 34.

Figure 29A:
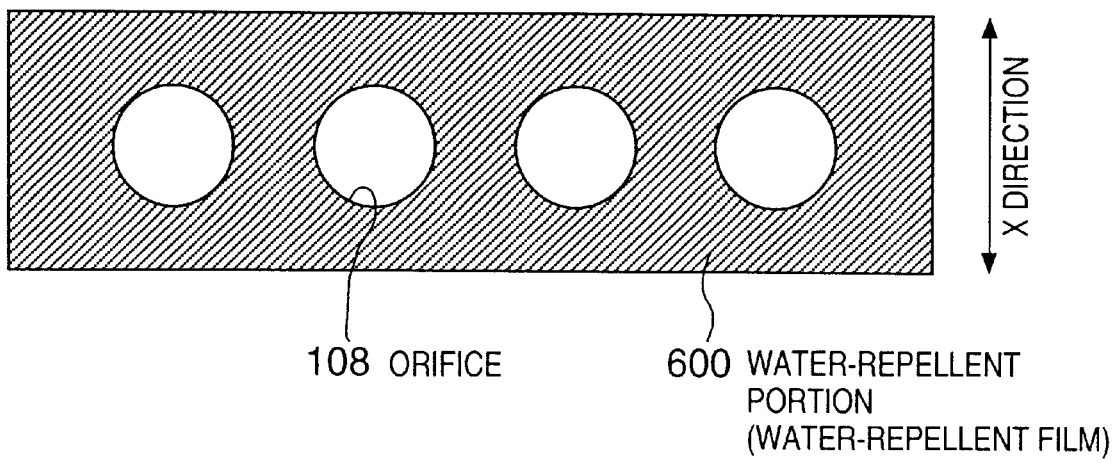
FIGS. 29A and 29B are schematic views showing the initial state of the orifice surface of the ink-jet head.
Figure 29B:
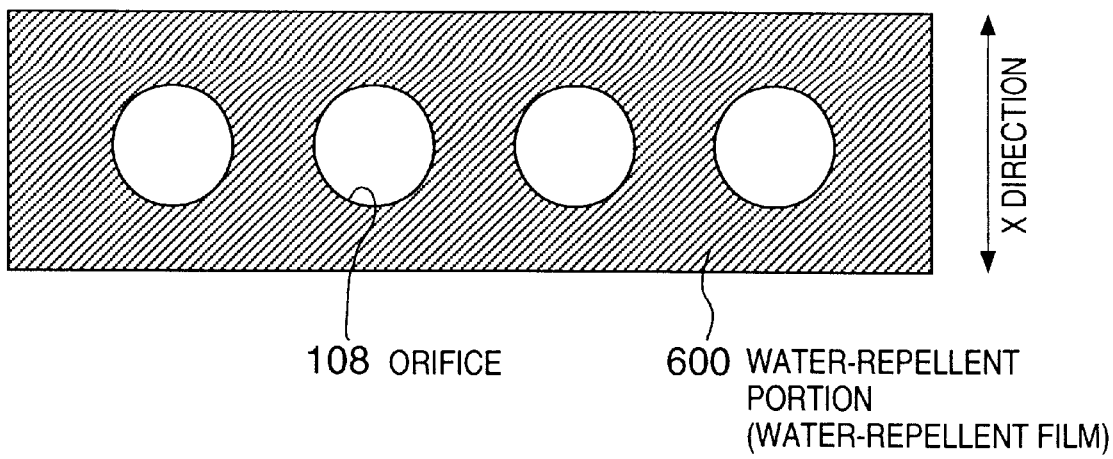
Figure 30:
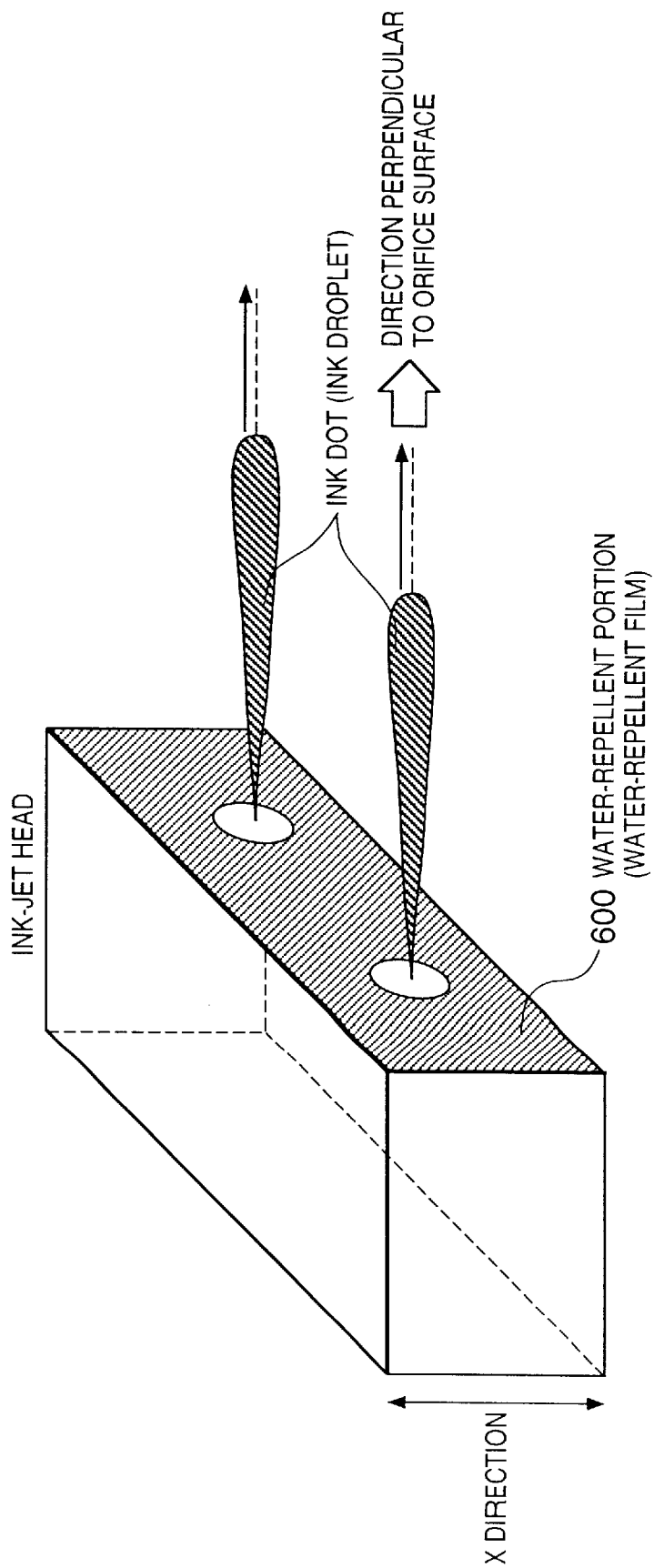
FIG. 30 is a perspective view showing how ink is discharged from the ink-jet head in the initial state.
Figure 31:
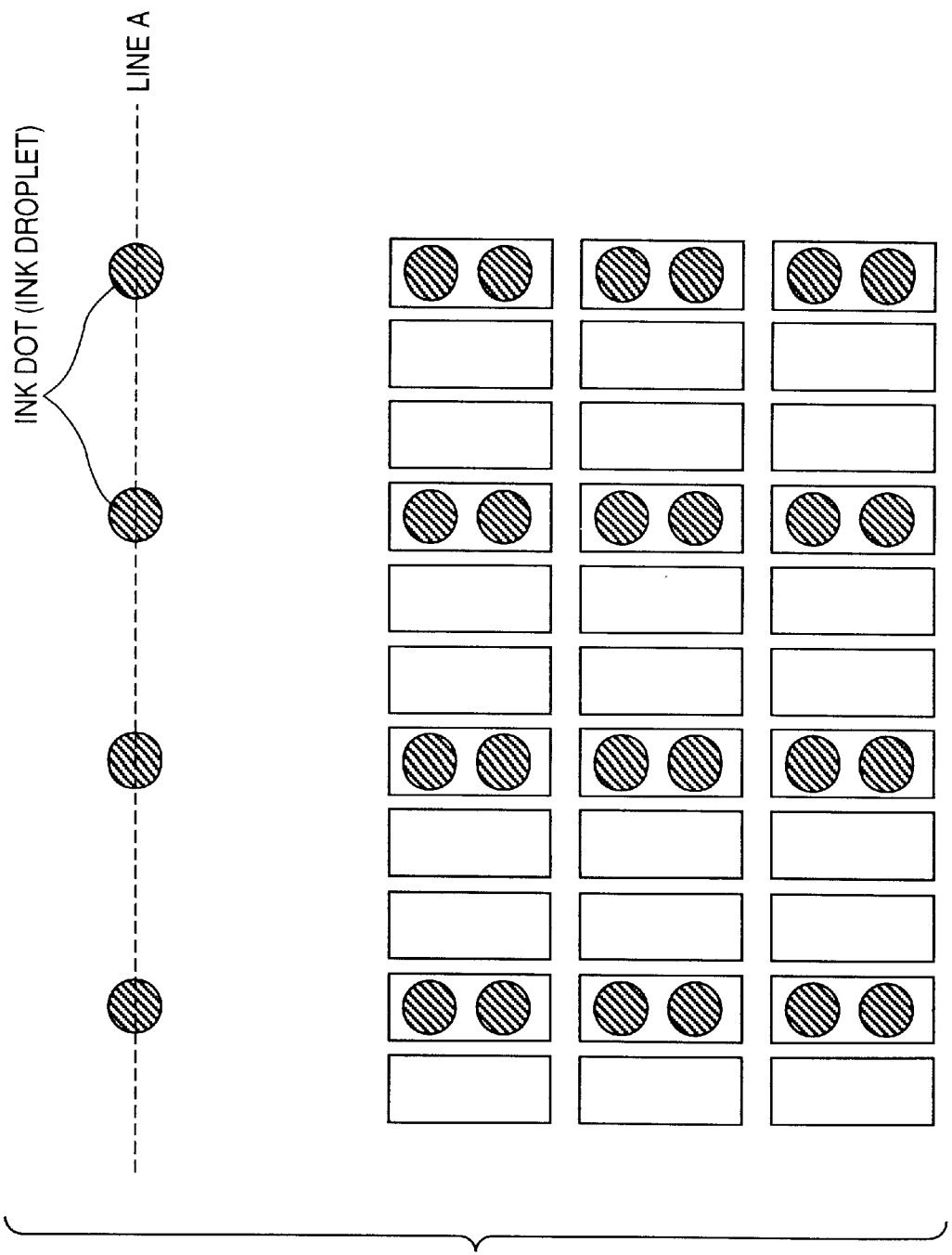
FIG. 31 is a schematic view showing the landing positions of ink discharged from the ink-jet head in the initial state.

FIGS. 29A and 29B are views showing the initial state of the orifice surface of an ink-jet head. FIG. 30 is a perspective view schematically showing a state wherein ink is discharged from orifices in the initial state. FIG. 31 is a view schematically showing the landing positions of ink droplets in the discharge state shown in FIG. 30.

As shown in FIG. 29A, in the initial state, the orifice surface, including the peripheral portions of the orifices, is entirely covered with the water-repellent film (water-repellent member) 600. When or after the orifice surface is wiped in the X direction, no or almost no residual ink remains on the peripheral portions of the orifices, as shown in FIG. 29B.

An ink droplet which is discharged from an arbitrary orifice while the peripheral portions of the orifices is in the state shown in FIG. 29B is separated at the center of the orifice and stably discharged without any change in discharging direction, as shown in FIG. 30. That is, the ink is discharged in a direction perpendicular to the orifice surface. In this case, the respective ink droplets land at the landing positions shown in FIG. 31. That is, the ink droplets accurately land at predetermined positions in pixels. Note that a line A in FIG. 31 is a target landing line for ink. In this case, since ink lands on the target landing line (target positions), no landing position offset occurs.

Figure 32A:
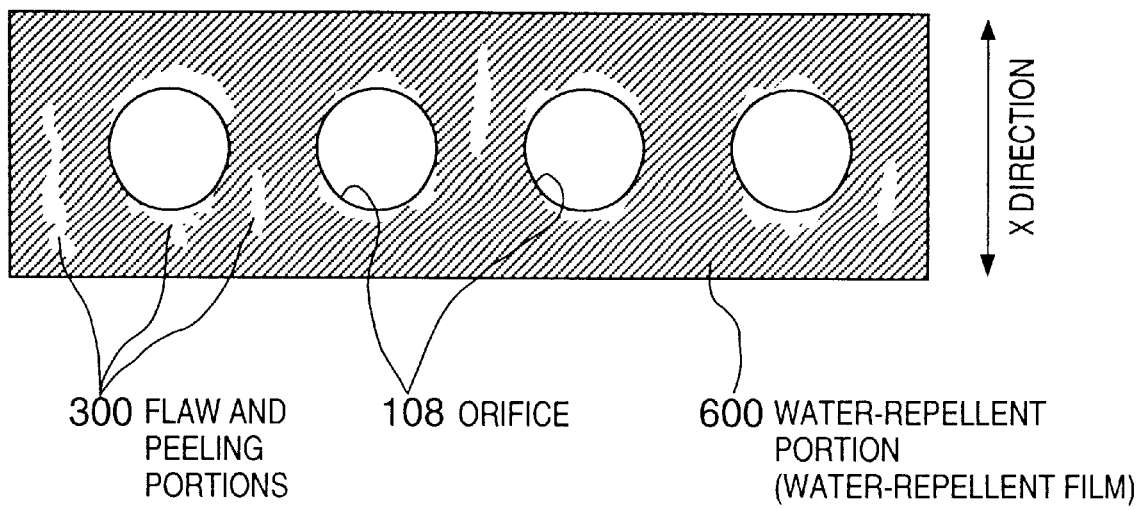
FIGS. 32A and 32B are schematic views showing the state of the orifice surface of the ink-jet head after repeated wiping.
Figure 32B:
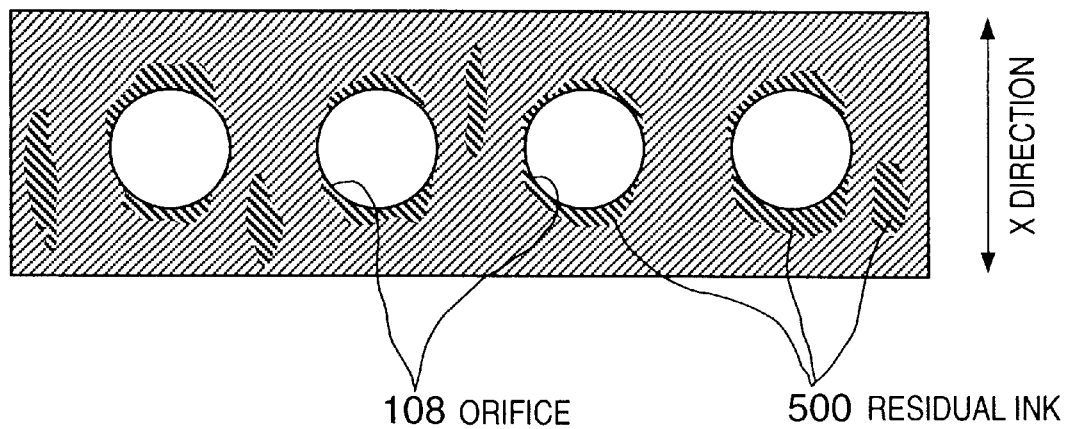
Figure 33:
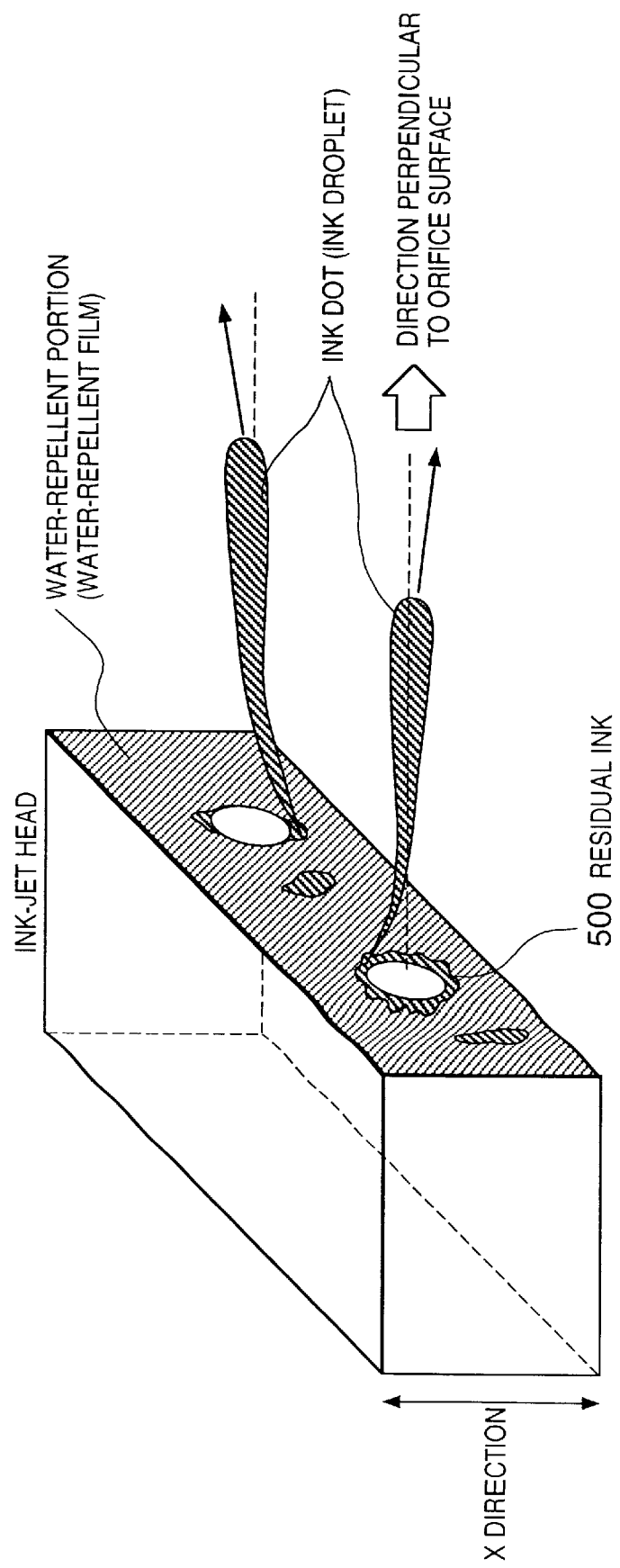
FIG. 33 is a perspective view showing how ink is discharged from the ink-jet head after repeated wiping.
Figure 34:
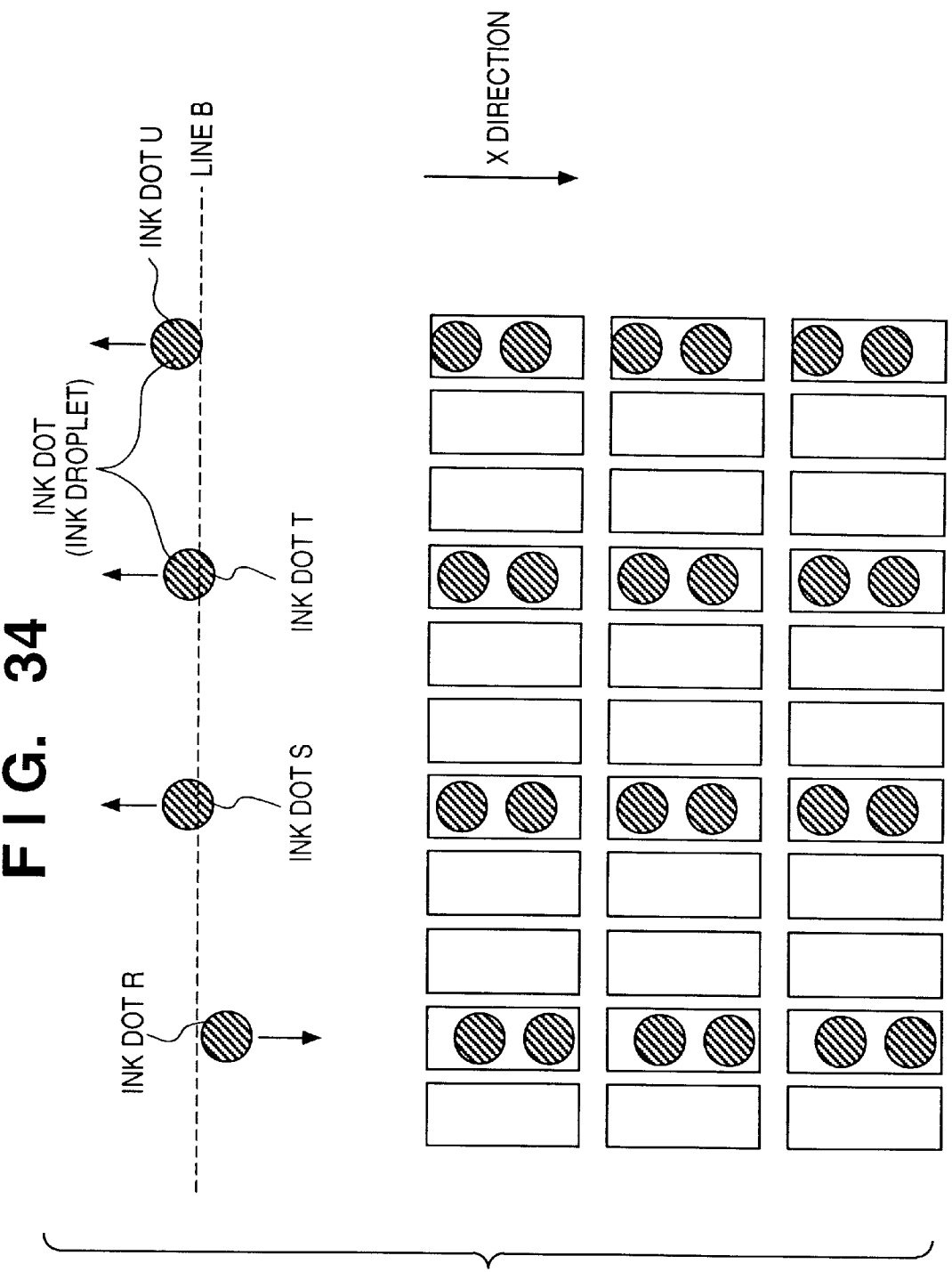
FIG. 34 is a schematic view showing the landing positions of ink discharged from the ink-jet head after repeated wiping.

Each of FIGS. 32A and 32B is a view showing the state of the orifice surface of the head when the orifice surface is repeatedly wiped in the x direction. As shown in FIG. 32A, when wiping operation is repeated, flaw and peeling portions 300 are produced in the water-repellent film (water-repellent member) 600 covering the orifice surface. After wiping operation is actually performed, residual ink often remains on the flaw and peeling portions produced in the peripheral portions of the orifices, as shown in FIG. 32B. An ink droplet which is discharged from an arbitrary orifice while the peripheral portions of the orifices are in the state shown in FIG. 32B is drawn to residual ink (ink residues) 500 immediately before it is separated from the orifice, as shown in FIG. 33, resulting in a change in discharging direction. That is, the ink is discharged in a direction different from a direction perpendicular to the orifice surface. In this case, the ink droplets land at the landing positions shown in FIG. 34, and landing position offsets occur in the same direction as the wiping direction, i.e., the same direction as that of the flaw and peeling portions produced in the orifice surface. Note that a line B in FIG. 34 is a target landing line for ink. In this case, of ink dots R, S, T, and U, the ink dots R and U do not land on the target landing line, causing landing position offsets. However, the landing positions are offset in the x direction, and hence no ink protrudes from pixels and causes color mixing.

According to the above description, wiping operation is performed by reciprocating the wiping members in the X1 direction (forward direction) and X2 direction (reverse direction) in FIGS. 28A to 28C. When wiping is done in the two directions, i.e., the X1 and X2 directions, in this manner, the peeling portions 300 are produced on the two sides of an orifice (in the X1 and X2 directions), as shown in FIG. 28C. If wiping operation is performed by moving each wiping member in only one direction, peeling portions are likely to occur on only one side of the orifice. More specifically, when wiping operation is performed by moving the wiping member from X2 to X1, i.e., the wiping direction is set to the X1 direction, peeling portions are likely to occur at a portion V1 (portion on the X1 side) in FIG. 28C. When wiping operation is performed by moving the wiping member from X1 to X2, i.e., the wiping direction is set to the X2 direction, peeling portions are likely to occur at a portion V2 (portion on the X2 side) in FIG. 28C. As described above, when wiping operation is performed in only one direction, peeling portions are likely to occur on only one side. This will shorten the service life of the head. In this embodiment, therefore, to prolong the service life of each head, wiping operation is performed in the two directions.

The wiping operation in this embodiment will be described in more detail below. In this embodiment, wiping operation is performed for every 20 color filters. After the 20th color filter is manufactured, the wiping member is moved in the X1 direction to perform wiping operation (first wiping operation). After the 40th color filter is manufactured, the wiping member is moved in the X2 direction to perform wiping operation (second wiping operation). Subsequently, the above operation is repeated. After the 60th color filter, 100th color filter, 140th color filter, . . . are manufactured, wiping is done in the X1 direction (first wiping operation). After the 80th color filter, 120th color filter, 160th color filter, . . . , wiping is done in the X2 direction (second wiping operation). According to the above description, wiping operation is performed for every 20 color filters. However, the frequency of wiping operation is not limited to this. For example, wiping operation may be performed every time one color filter is manufactured or every time 100 color filters are manufactured. As described above, in this embodiment, wiping operation may be performed every time N color filters are manufactured. Every time N color filters are manufactured, the wiping direction may be alternately switched to the forward direction and reverse direction. In addition, this embodiment is not limited to the scheme of alternately switching the wiping directions. For example, the following scheme may be adopted. After the 20th and 40th color filters are manufactured, wiping is done in the X1 direction. After the 60th and 80th color filters are manufactured, wiping is done in the X2 direction. After the 100th and 120th color filters are manufactured, wiping is done in the X1 direction. After the 140th and 160th color filters are manufactured, wiping is done in the X2 direction. That is, according to this embodiment, it suffices if the number of times of wiping in the forward direction is almost equal to that in the reverse direction, and the wiping direction may be switched every time a plurality of number of times of wiping are done.

As described above, according to this embodiment, the wiping direction is switched every time N color filters are manufactured so as to make the number of times of wiping in the forward direction almost equal to that in the reverse direction, thereby prolonging the service life of each head. Although wiping operation is preferably performed in two directions from the viewpoint of the longer service life of each head, wiping operation may be performed in only one direction in this embodiment.

In this embodiment, as shown in FIGS. 16 and 20, the ink-jet heads are tilted at a certain angle to match the pitch of pixels (image intervals) of the same color to the pitch of nozzles used (intervals of nozzles used) in a direction almost perpendicular to the scanning direction. In this state, color printing is performed. While the heads are tilted at the certain angle, wiping operation is performed in a direction (B direction in FIG. 20) along the direction in which pixels of the same color are arranged. Assume that wiping operation is performed after the tilted heads are restored to the initial state. In this case, the direction in which peeling portions are produced when the heads are tilted again differs from the direction in which pixels of the same color are arranged, resulting in color mixing. In contrast to this, according to this embodiment, since wiping is done while the heads are tilted, the direction in which peeling portions are produced coincides with the direction in which pixel of the same color are arranged. Therefore, the direction in which the landing positions of ink droplets deviate can be matched to the B direction. This makes it possible to reduce color mixing.

As described above, when color filters are formed by discharging ink from the ink-jet heads onto color filter substrates and forming color areas in a predetermined direction, the wiping direction of each wiping member is matched to a direction along with the predetermined direction, thereby matching the direction in which peeling portions are produced to the predetermined direction. This makes it possible to reduce color mixing.

As described above, after wiping operation, flaw and peeling portions are produced in the water-repellent film on the orifice surface, and the landing positions of ink are offset in the same direction as the wiping direction due to the flaw and peeling portions. However, since the direction in which pixels of the same color are arrayed coincides with the wiping direction, even landing position offsets do not cause color mixing.

Examples of this embodiment will be described below.

EXAMPLE 1

Figure 22:
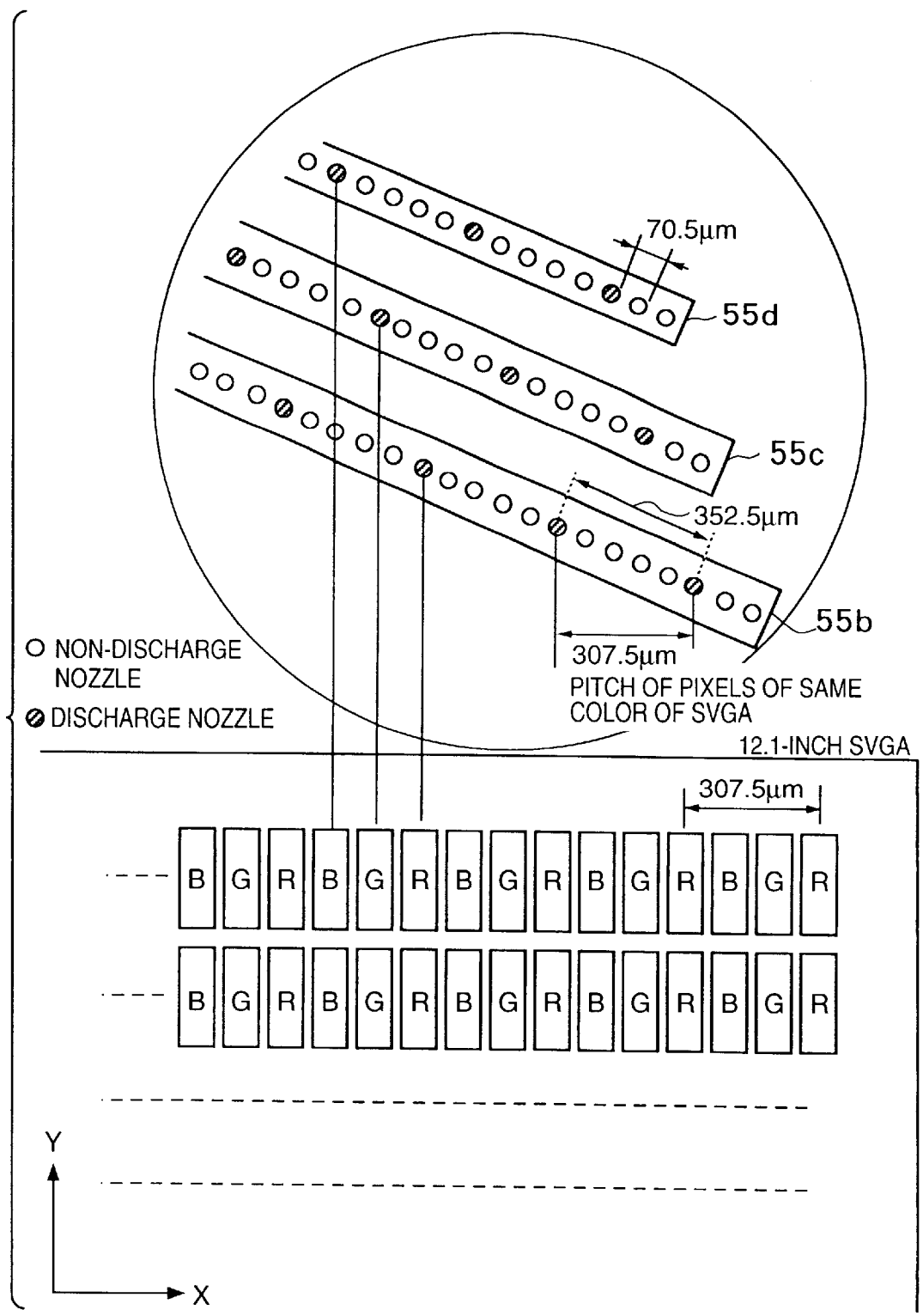
FIG. 22 is a view showing the relationship between the coloring pixels of a color filter and the nozzles of the ink-jet heads.

The ink-jet heads used in Example 1 are heads for a general printer, and the interval between adjacent nozzles is 70.5 μm (360 dpi), as shown in FIG. 22.

A case wherein a 12.1-inch SVGA color filter (RGB stripe pattern of 800 pixels wide by 600 pixels high) is colored by these ink-jet heads will be described below.

First of all, the heads are tilted and every four nozzles (see FIG. 22) are used to match the pitch of pixels of the same color to the nozzle pitch in the x direction. In this case, the direction in which the nozzles of each ink-jet head are arrayed is slightly offset from a direction (X direction) almost perpendicular to the direction (Y direction) in which pixels of the same color on the color filter are arrayed, and coloring is performed while each ink-jet head is scanned in the Y direction. That is, in Example 1, the heads each having orifices arrayed in a direction slightly oblique to the X direction are used, and ink is discharged to form a plurality of pixels of the same color (a pixel array of the same color) while each head is scanned relative to the substrate in the Y direction.

Wiping blades were disposed to be parallel to these heads.

Subsequently, a color filter is formed.

First of all, a glass substrate, on which a 12.1-inch SVGA type black matrix consisting of chromium (Cr) and having predetermined opening portions was formed, was coated with a composition (consisting of 10 parts by weight of a terpolymer of N-methylolacrylamide, methyl methacrylate, and hydroxyethylmetacrylate and 0.4 parts by weight of triphenylsulfonium trifurato) to a film thickness of 1.0 μm by spin coating. The composition has a water ink absorption property and exhibits deterioration in ink absorption property upon irradiation with light and repellency to ink upon irradiation with light and a heat treatment. The resultant structure was pre-baked at 60° C. for 10 min to form a resin composition layer.

Exposure was performed by a UV (UltraViolet) lamp via a photomask having a pattern finer than that of the black matrix. After the exposure, the resultant structure was heated by a hot plate at 110° C. for 90 sec to form prospective coloring portions and ink-repellent portions serving as color mixing prevention areas (portions with ink repellency).

Figure 23:
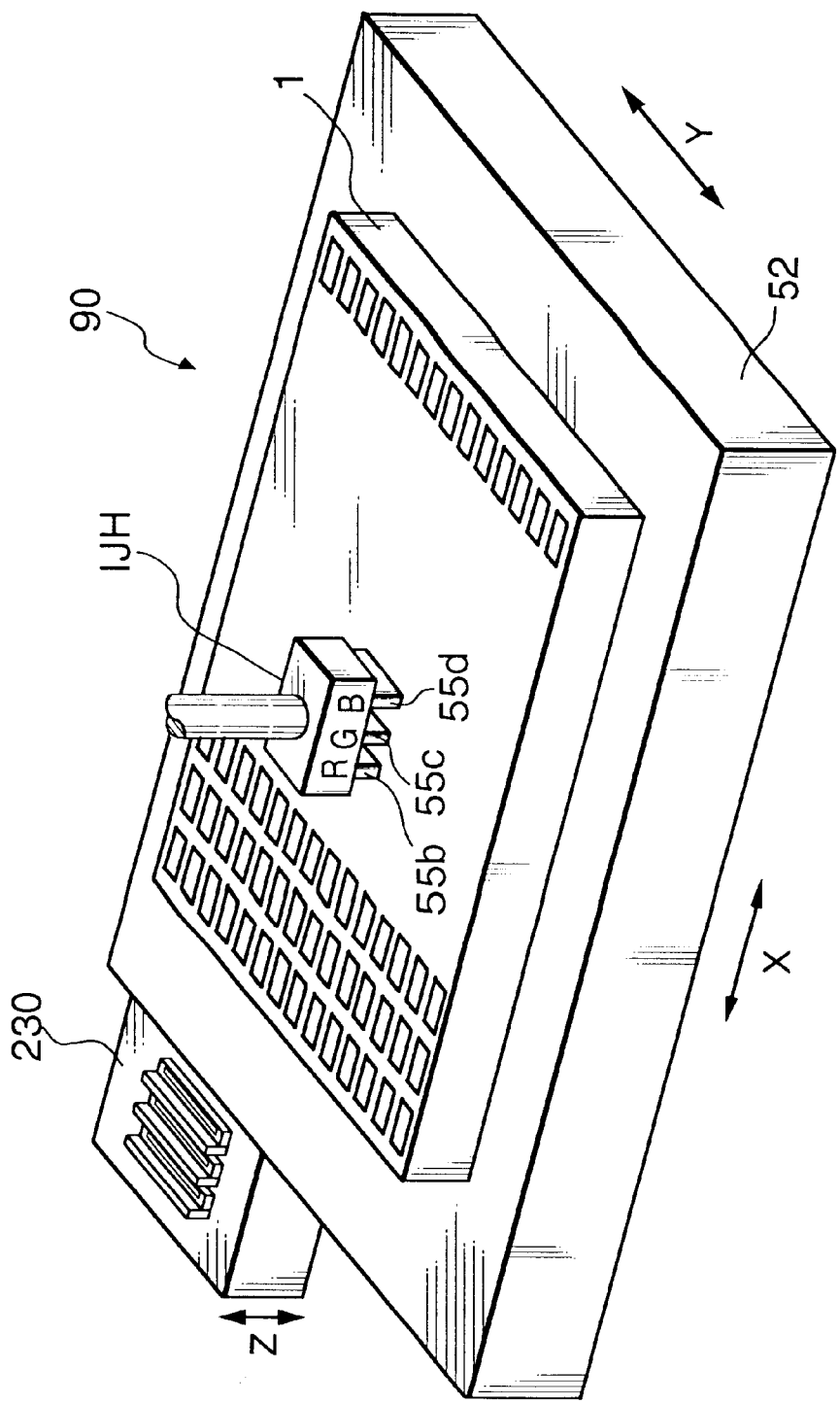
FIG. 23 is a perspective view showing part of a color filter manufacturing apparatus.

The glass substrate formed in this manner is set on the X-Y-Z-θ stage 52 of the color filter manufacturing apparatus 90 shown in FIG. 23.

Coloring is performed by scanning the X-Y-Z-θ stage and using the ink-jet heads 55b, 55c, and 55d.

When ink mist and the like adhere to the nozzle surfaces of the ink-jet heads, the nozzle surfaces are wiped by operating a recovery unit 230. At this time, each blade is operated in the same direction as the direction in which pixels of the same color are arrayed (i.e., the X direction in FIG. 23).

The ink on the substrate colored by the above method was dried at 90° C. for 10 min. In addition, a heat treatment was performed for the substrate at 230° C. for 30 min to completely cure the resin composition layer, thereby forming a color filter.

In this manner, a color filter was repeatedly manufactured. When the landing position offsets of ink discharged from the ink-jet heads were measured, those in the direction in which pixels of different colors were arranged (the Y direction in FIG. 23) fell within 5 μm with respect to the initial state. The ink landing point offsets in the direction in which pixels of the same color were arrayed on the color filter (the X direction in FIG. 23) fell within 10 to 30 μm.

However, color filters could be stably manufactured without causing any color mixing.

EXAMPLE 2

Figure 24:
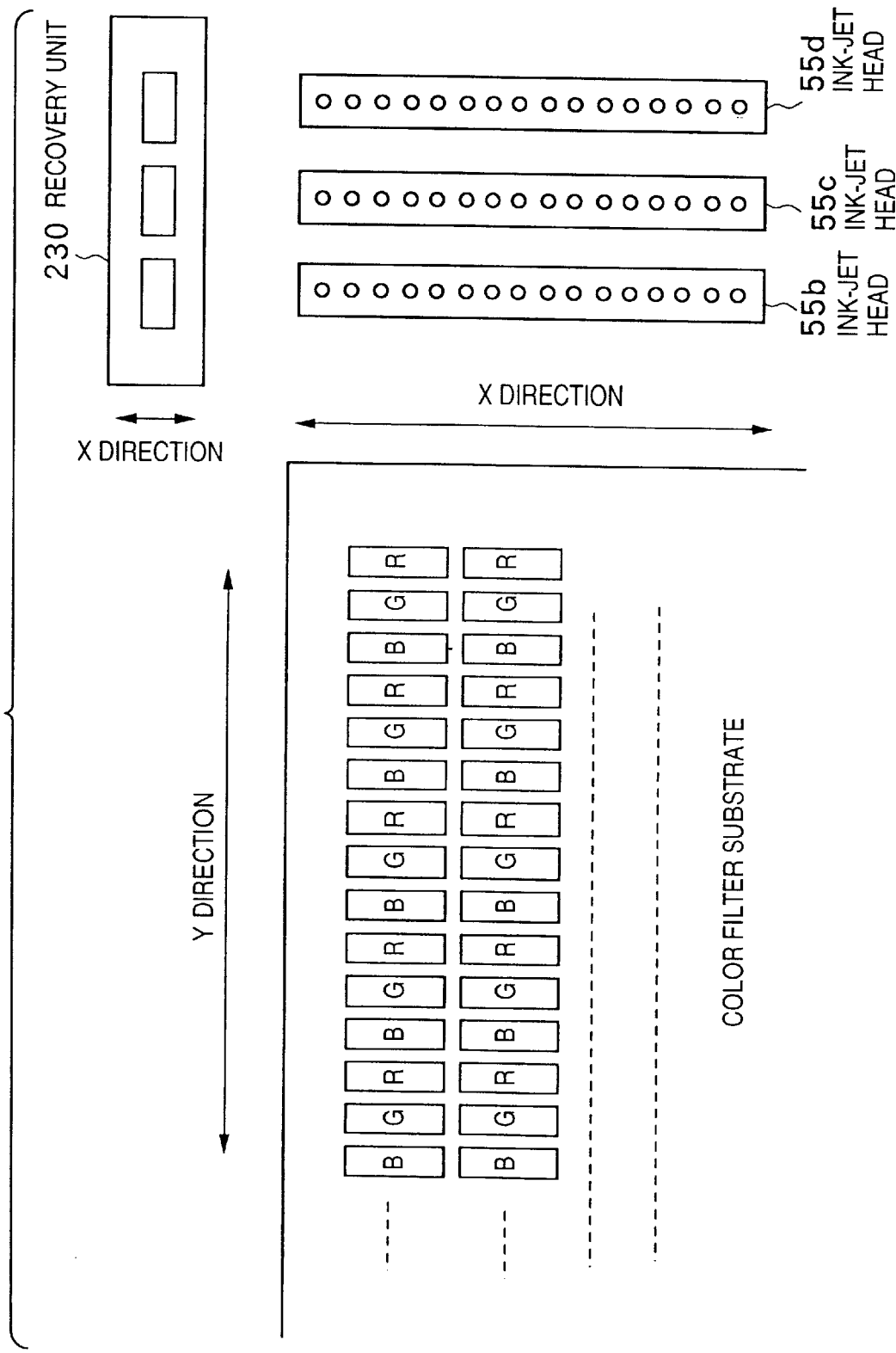
FIG. 24 is a view showing the relationship between the coloring pixels of a color filter, ink-jet heads, and a recovery unit.
Figure 25A:
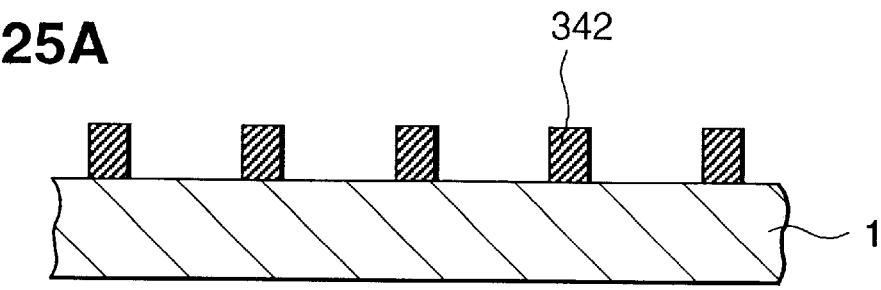
FIGS. 25A to 25D are sectional views showing another example of the steps in manufacturing a color filter.
Figure 25B:
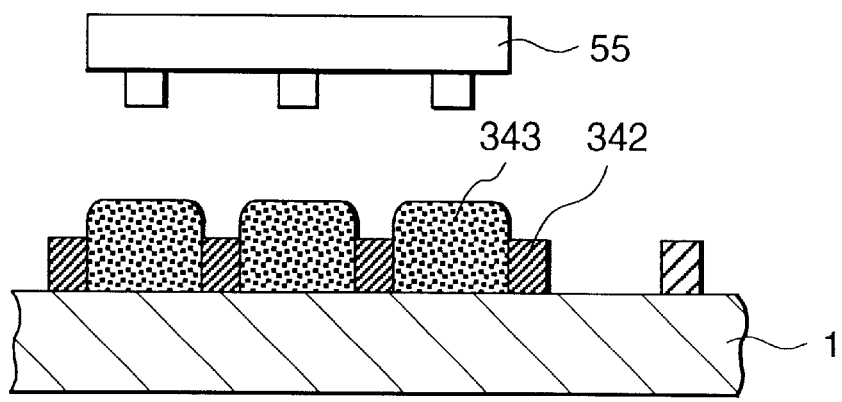
Figure 25C:
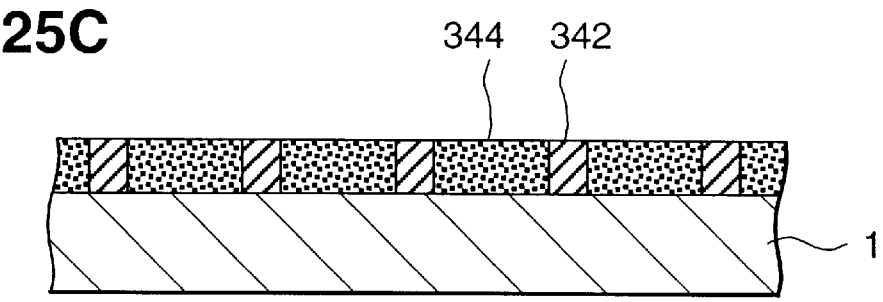
Figure 25D:
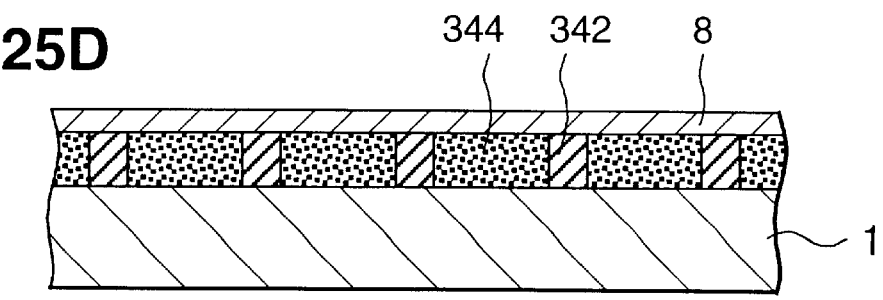

As in Example 1, the ink-jet heads used in Example 2 are heads for a general printer, and the interval between adjacent nozzles is 70.5 μm (360 dpi), as shown in FIG. 24.

A case wherein a 12.1-inch SVGA color filter (RGB stripe pattern of 800 pixels wide by 600 pixels high) is colored by these ink-jet heads will be described below.

FIG. 24 is a view schematically showing part of the coloring area of a color filter according to this Example and how the corresponding ink-jet heads are positioned. In this case, the direction in which the nozzles of each ink-jet head are arrayed is made to coincide with the direction in which pixels of the same color are arrayed on the color filter. Coloring is performed by scanning ink-jet heads in the y direction in FIG. 24. In Example 2, the heads each having orifices arrayed in the x direction are used, and ink is discharged to form a plurality of pixels of the same color (a pixel array of the same color) in the x direction while each head is scanned relative to the substrate in the Y direction.

Wiping blades were disposed to be perpendicular to these heads.

Subsequently, a color filter is formed.

First of all, the ink-jet heads 55b, 55c, and 55d are scanned in the y direction in FIG. 24 to color a glass substrate on which coloring portions are formed.

When coloring is repeated and ink mist and the like adhere to the nozzle surfaces of the ink-jet heads, wiping is performed by operating a recovery unit 230. At this time, the blades are operated in the same direction as the direction in which pixels of the same color are arrayed (the x direction in FIG. 24).

The resin composition layer on the substrate colored by the above method was completely cured following the same procedure as that in Example 1, thereby forming a color filter.

In this manner, a color filter was repeatedly manufactured. When the landing position offsets of ink discharged from the ink-jet heads were measured, those in the direction in which pixels of different colors were arranged (the y direction in FIG. 24) fell within 5 µm with respect to the initial state. The ink landing point offsets in the direction in which pixels of the same color were arrayed on the color filter (the x direction in FIG. 24) fell within 10 to 30 µm.

However, color filters could be stably manufactured without causing any color mixing.

EXAMPLE 3

Figure 35:
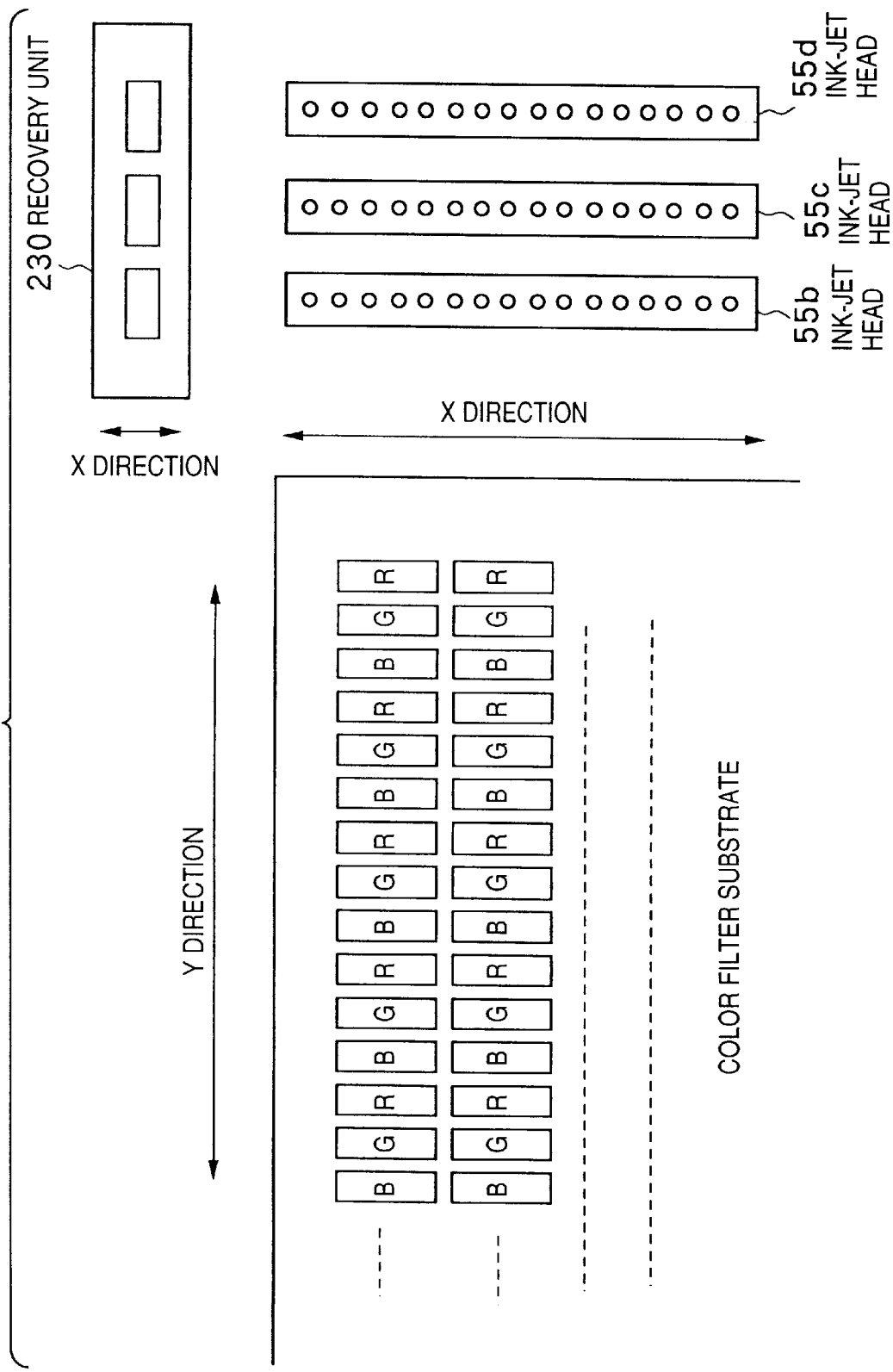
FIG. 35 is a schematic view showing an example of the relationship between the coloring pixels of a color filter, the ink-jet heads, and the recovery unit in the operating direction.

As in Examples 1 and 2, the ink-jet heads used in Example 3 are heads for a general printer, and the interval between adjacent nozzles is 70.5 µm (360 dpi), as shown in FIG. 35.

A case wherein a 12.1-inch SVGA color filter (RGB stripe pattern of 800 pixels wide by 600 pixels high) is colored by a manufacturing method different from that in Examples 1 and 2 using these ink-jet heads will be described below.

FIG. 35 is a view schematically showing part of the coloring area of a color filter according to this Example and how the corresponding ink-jet heads are positioned. In this Example, the direction in which the nozzles of each ink-jet head are arrayed is made to coincide with the direction in which pixels of the same color are arrayed on the color filter. Coloring is performed by scanning the ink-jet heads relative to the substrate in the y direction in FIG. 35. In Example 3, the heads each having orifices arrayed in the x direction are used, and ink is discharged to form a plurality of pixels of the same color (a pixel array of the same color) in the x direction while each head is scanned relative to the substrate in the Y direction.

Wiping blades were disposed to be perpendicular to these heads.

A case wherein color filters are actually formed will be described next.

First of all, a glass substrate was coated with a black pigment resist (BK-739P available from Shin Nittetsu Kagaku (Inc.)) by spin coating. Pattern exposure was then performed via a photomask for shielding portions to be colored with ink from light. Part of the resist was removed by etching to form coloring portions. The resultant structure was pre-baked at 90° C. for 10 min to form a black matrix substrate (MB substrate) having a thickness of 1.0 µm. Note that the size of each recess formed in the black matrix was 290 µm×90 µm.

Thermosetting type pigment inks, each containing water, an organic solvent, melamine resin, and pigment, were discharged from ink-jet heads 55b, 55c, and 55d onto the BM substrate (glass substrate) formed in this manner to color an RGB pattern on the substrate.

When ink mist and the like adhered to the ink-jet heads as coloring operation was repeated, a recovery unit 230 was operated to wipe the orifice surfaces. In this case, the blades were operated in the same direction as the direction in which pixels of the same color were arrayed (i.e., the x direction in FIG. 35).

The substrate colored by the above method was heated at 90° C. for 10 min. In addition, a heat treatment was performed for the substrate at 230° C. for 30 min to completely cure the ink, and a protective layer was further formed, thereby forming a color filter.

In this manner, a color filter was repeatedly manufactured. When the landing position offsets of ink discharged from the ink-jet heads were measured, those in the direction in which pixels of different colors were arranged (the y direction) fell within 5 µm with respect to the initial state. The ink landing point offsets in the direction in which pixels of the same color were arrayed on the color filter (the X direction) fell within 10 to 30 µm.

However, color filters could be stably manufactured without causing any color mixing.

Comparative Example 1

Figure 36:
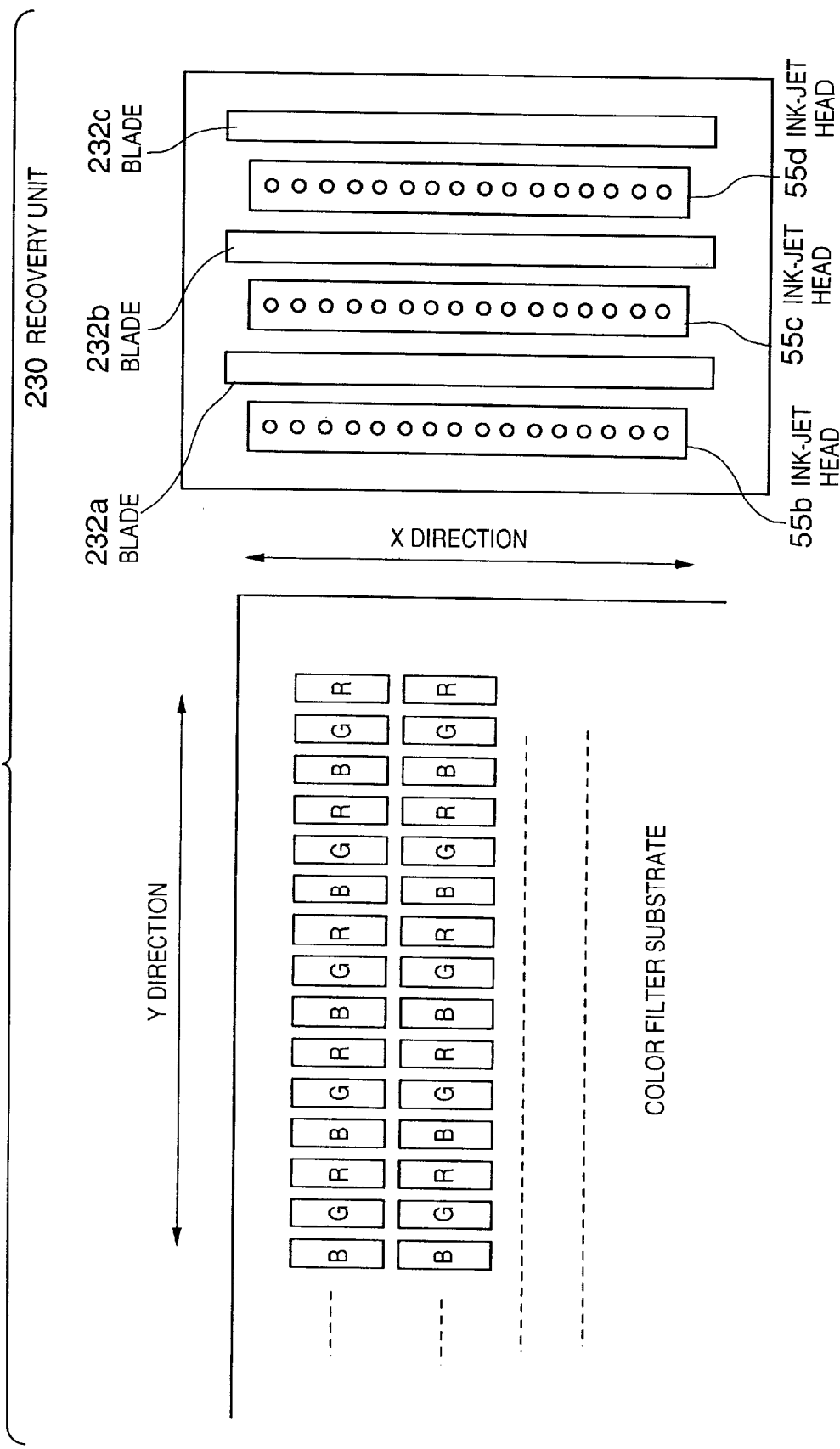
FIG. 36 is a schematic view showing an example of the relationship between the coloring pixels of a color filter, the ink-jet heads, and the recovery unit in the operating direction.

As in Examples 1 to 3, the ink-jet heads used in Comparative Example 1 are heads for a general printer, and the interval between adjacent nozzles is 70.5 µm (360 dpi), as shown in FIG. 36. A case wherein a 12.1-inch SVGA color filter (RGB stripe pattern of 800 pixels wide by 600 pixels high) is colored by using these ink-jet heads will be described below.

FIG. 36 is a view schematically showing part of the coloring area of a color filter in this Comparative Example and how the corresponding ink-jet heads are positioned.

In this Comparative Example, the direction in which the nozzles of each ink-jet head are arrayed is made to coincide with the direction in which pixels of the same color are arrayed on the color filter. Coloring is performed by scanning the ink-jet heads relative to the substrate in the y direction in FIG. 36. In Comparative Example 1, the heads each having orifices arrayed in the x direction are used, and ink is discharged to form a plurality of pixels of the same color (a pixel array of the same color) in the x direction while each head is scanned relative to the substrate in the y direction.

Wiping blades were disposed to be parallel to these heads.

A case wherein color filters are actually formed will be described next. Thermosetting type pigment inks, each containing water, an organic solvent, melamine resin, and pigment, were discharged from ink-jet heads 55b, 55c, and 55d onto the BM substrate (glass substrate) on which a black matrix was formed by the same method as that in Example 3 to color an RGB pattern on the substrate.

When ink mist and the like adhered to the ink-jet heads as this coloring operation was repeated, a recovery unit 230 was operated to wipe the orifice surfaces. In this case, the blades were operated in a direction perpendicular to the direction in which pixels of the same color are arrayed (i.e., the y direction in FIG. 36).

The ink on the substrate colored by the above method was completely cured following the same procedure as in Example 3 to form a color filter.

In this manner, a color filter was repeatedly manufactured. When the landing position offsets of ink discharged from the ink-jet heads were measured, those in the direction in which pixels of the same color were arrayed (the x direction in FIG. 36) fell within 5 µm with respect to the initial state. The ink landing point offsets in the direction in which pixels of different colors were arrayed (the y direction in FIG. 36) fell within 10 to 30 µm.

Since the distance between adjacent pixels of different colors was about 15 µm, color mixing occurred at each portion where the landing position offset was 15 µm or more, resulting in a defective color filter.

As described above, according to the above embodiments matching the direction in which the recovery unit wipes the heads to the direction in which pixels of the same color are arrayed suppresses the occurrence of color mixing between pixels of different colors even after repetitions of wiping operation.

Various changes and modifications of the above embodiments can be made without departing the scope and spirit of the invention.

For example, a panel having a color filter on the TFT array side has recently become available. The color filter defined in this specification is a member colored by coloring materials and includes both a color filter placed on the TFT array side and a color filter placed on the other side.

The present invention is not limited to the above embodiments and various changes and modifications can be made within the spirit and scope of the invention.

The present invention can be applied to, for example, an EL (electroluminescence) display element manufacturing method and apparatus. An EL display element has a structure in which a thin film containing inorganic and organic fluorescent compounds is sandwiched between a cathode and an anode. In this element, electrons and holes are injected into the thin film to be recombined to generate excitons, and light is emitted by using fluorescence or phosphorescence that occurs when the excitons are deactivated. Of the fluorescent materials used for such EL display elements, materials that emit red, green, and blue light are used in the manufacturing apparatus of the present invention to form a pattern on an element substrate such as a TFT substrate by the ink-jet method, thereby manufacturing a spontaneous emission type full-color EL display element. The present invention incorporates such an EL display element and an EL display element manufacturing method and apparatus.

The manufacturing apparatus of the present invention may include a means for executing surface treatments such as a plasma process, UV process, and coupling process for a resin resist, pixel electrodes, and the surface of a lower layer to help adhesion of an EL material.

The EL display element manufactured by the manufacturing method of the present invention can be applied to the field of low information, such as segment display and still image display based on full-frame emission, and can also be used as a light source having a point/line/plane shape. In addition, a full-color display element with high luminance and excellent responsibility can be obtained by using passive display elements and active elements such as TFTs.

Figure 37:
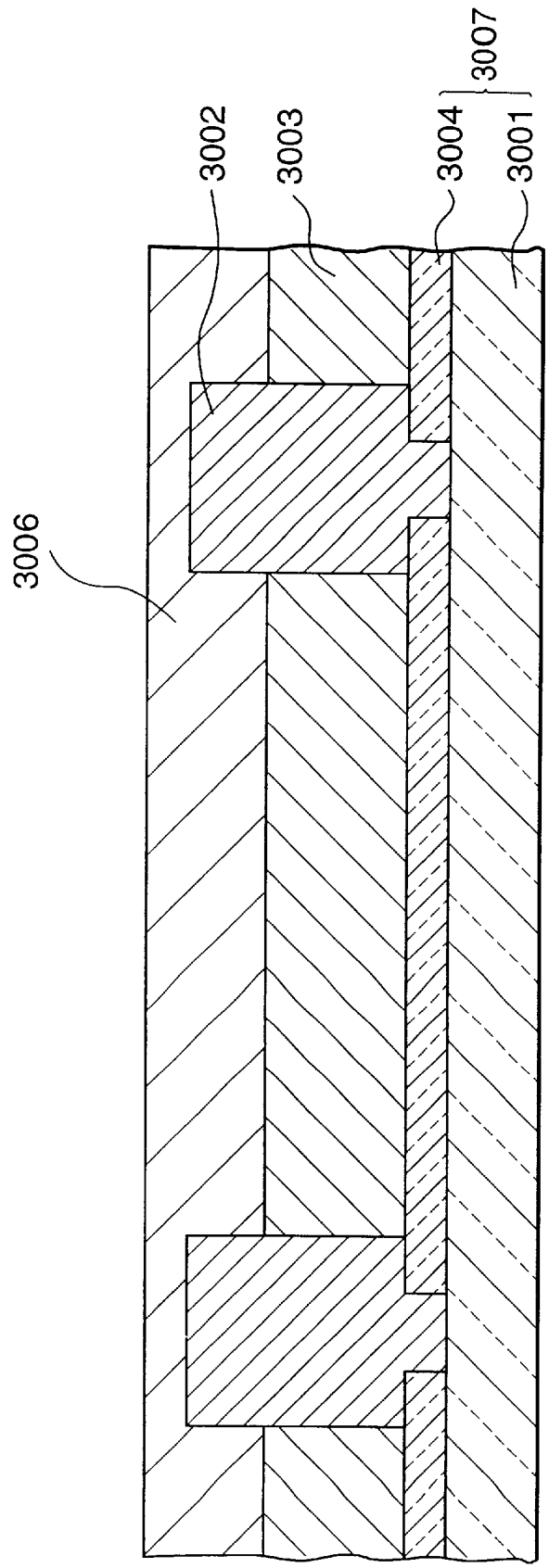
FIG. 37 is a sectional view showing the structure of an EL element.

An example of the organic EL element manufactured by the present invention will be described below. FIG. 37 is a sectional view showing the multilayer structure of the organic EL element. The organic EL element shown in FIG. 37 is comprised of a transparent substrate 3001, luminescent layer 3003, transparent electrodes 3004, and metal layer 3006. Reference numeral 3007 denotes a portion constituted by the transparent substrate 3001, partition wall 3002, and transparent electrode 3004. This portion will be referred to as a driving substrate.

The transparent substrate 3001 is not limited to any specific substrate as long as it has characteristics required of an EL display element, e.g., transparency and mechanical strength. For example, a light-transmitting substrate such as a glass substrate or plastic substrate can be used.

The partition wall 3002 has the function of isolating pixels from each other to prevent mixing of a material for the luminescent layer 3003 between adjacent pixels when the material is supplied from a liquid supply head. That is, the partition wall 3002 serves as a color mixing prevention wall. When this partition wall 3002 is formed on the transparent substrate 3001, a plurality of recesses (pixel areas) are formed on the substrate. Note that no problem arises if a member having a multilayer structure exhibiting affinity different from that of the material is used as the partition wall 3002.

The luminescent layer 3003 is formed by stacking a material that emits light when a current flows therein, e.g., a known organic semiconductor material such as polyphenylene vinylene (PPV), to a thickness enough to obtain a sufficient light amount, e.g., 0.05 $\mu$m to 0.2 $\mu$m. The luminescent layer 3003 is formed by filling recesses surrounded by the partition wall 3002 with a thin-film material liquid (spontaneous emission material) by the ink-jet method or the like and heating the resultant structure. When a color organic EL element is to be formed, luminescent layers that emit light of different colors, e.g., red, green, and blue, must be formed. Therefore, different luminescent layers are preferably formed in adjacent areas. A method of forming luminescent layers by an ink-jet system capable of discharging different thin-film material liquids to arbitrary positions is very effective.

The transparent electrodes 3004 are made of a material having conductivity and transparency, e.g., ITO. The transparent electrodes 3004 are independently formed in the respective pixel areas to emit light in units of pixels.

The metal layer 3006 is formed by stacking a conductive metal material, e.g., aluminum lithium (Al—Li), to a thickness of about 0.1 $\mu$m to 1.0 $\mu$m. The metal layer 3006 is formed to serve as a common electrode opposing the transparent electrodes 3004.

The driving substrate 3007 is formed by stacking a plurality of layers, e.g., a thin-film transistor (TFT), wiring film, and insulating film (neither is shown), and designed to allow voltages to be applied between the metal layer 3006 and the transparent electrodes 3004 in units of pixels. The driving substrate 3007 is manufactured by a known thin-film process.

According to the organic EL element having the above layer structure, in the pixel area between the transparent electrode 3004 and the metal layer 3006 between which a voltage is applied, a current flows in the luminescent layer 3003 to electroluminescence. As a consequence, light emerges through the transparent electrode 3004 and transparent substrate 3001.

According to this method, a full-color EL element can be formed by a simple process.

In the present invention, display portions are formed by supplying a material used for display to the pixel areas. The colored portions of a color filter correspond to these display portions, whereas the luminescent portions of an EL element correspond to the display portions. The display portions including the above colored portions or luminescent portions are portions used to display information and also portions for visual recognition of colors.

The colored portions of a color filter and the luminescent portions of an EL element are portions for producing colors (generating colors), and hence can be called color producing portions. In the case of a color filter, for example, light from a backlight passes through the colored portions to produce R, G, and B light. In the case of an EL element, R, G, and B light is reproduced when the luminescent portions spontaneously emit light.

Ink and spontaneous emission materials are materials for forming the luminescent portions, and hence can be called materials for producing colors. In addition, ink and spontaneous emission materials are liquids, and hence can be generically called a liquid material. Furthermore, ink and spontaneous emission materials are materials for forming display portions used for display.

According to the above description, in manufacturing a color filter, the occurrence of color mixing can be suppressed in the pixel areas. In manufacturing an EL element, the occurrence of mixing of a plurality of spontaneous emission materials can be suppressed in the pixel areas.

As described above, the present invention can be applied to the manufacture of a panel having a plurality of display portions formed by supplying materials to pixel areas, e.g., a panel (display element) used for a color display device including a color filter, EL element, and the like. Note that this display device panel is not limited to the above color filter and EL display element, and includes panels in general, which are formed by filling recessed in a substrate with a liquid material and can be used for display devices.

The present invention described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printing head having a length corresponding to the width of a maximum printing medium which can be printed by the printer, either the arrangement which satisfies the full-line length by combining a plurality of printing heads as disclosed in the above specification or the arrangement as a signal printing head obtained by forming printing heads integrally can be used.

In addition, not only an exchangeable chip type printing head, as described in the above embodiments which can be electrically connected to the apparatus main unit and can receive an ink from the apparatus main unit upon being mounted on the apparatus main unit but also a cartridge type printing head in which an ink tank is integrally arranged on the printing head itself can be applicable to the present invention.

It is preferable to add recovery means for the printing head, preliminary auxiliary means, and the like provided as an arrangement of the printer of the present invention since the printing operation can be further stabilized. Examples of such means include, for printing head, pressurization or suction means, and preliminary heating means using electrothermal transducers, another heating element, or a combination thereof. It is also effective for stable printing to provide a preliminary discharge mode which performs discharge independently of printing.

Although a fluid ink is employed in the above embodiments of the present invention, an ink which solidifies at the room temperature or lower, or an ink which softens or liquifies at the room temperature may be used. That is, any ink which liquifies when a recording signal is supplied may be used.

In addition, in order to prevent a temperature rise caused by hat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers which are being held in a liquid or solid state in recess portions of a porous sheet or through holes, as described in Japanese Paten Laid-Open No. 54-56847 or 60-71260. In the present invention, the above-mentioned film boiling system is most effective for the above-mentioned inks.

As has been described above, according to the present invention, even if the nozzle surfaces (orifice surfaces) of ink-jet heads are repeatedly wiped, the occurrence of mixing of a plurality of kinds of materials in pixel regions can be suppressed.

The present invention is not limited to the above embodiments and various changes and modifications can be made within the spirit and scope of the present invention. Therefore, to apprise the public of the scope of the present invention the following claims are made.

What is claimed is:

1. A color filter manufacturing method of manufacturing a color filter by discharging ink from an ink-jet head onto a color filter substrate to form colored areas in units of colors, which extend in a predetermined direction, the ink-jet head having an orifice surface in which orifices for discharging ink are formed and a water-repellent member covering at least peripheral portions of the orifices, comprising the steps of:

preparing a wiping member for wiping the orifice surface; and wiping the orifice surface with the wiping member, wherein a defective portion is produced in the water-repellent member as the orifice surface is wiped, and the defective portion is produced in the wiping direction, and wherein a wiping direction of the wiping member coincides with a direction along with the predetermined direction.

2. The method according to claim 1, wherein the defective portion has a shape elongated in the wiping direction.

3. The method according to claim 1, wherein the defective portion is a flaw portion produced in the water-repellent member or a peeling portion of the water-repellent member.

4. The method according to claim 1, wherein when ink is discharged from the ink-jet head, a landing position of the ink is offset in the predetermined direction.

5. The method according to claim 1, comprising covering the entire orifice surface with the water-repellent member.

6. The method according to claim 1, wherein
the method comprises discharging the ink while relatively scanning the ink-jet head and the substrate, and
the scanning direction coincides with the predetermined direction.

7. The method according to claim 1, wherein
the method comprises discharging the ink while relatively scanning the ink-jet head and the substrate, and
the scanning direction is perpendicular to the predetermined direction.

8. The method according to claim 1, wherein the colored areas are red, green, and blue.

9. The method according to claim 1, wherein the colored area includes a plurality of pixels in the predetermined direction.

10. The method according to claim 1, wherein the colored area includes one pixel in the predetermined direction.

11. The method according to claim 1, wherein the wiping member is an elastic member.

12. The method according to claim 1, wherein the ink-jet head is a head for discharging ink by using heat energy, the head having a heat energy generator for generating heat energy applied to the ink.

13. The method according to claim 1, wherein the ink-jet head comprises a piezoelectric element which undergoes displacement upon reception of electric energy and discharges ink with a pressure change accompanying the displacement.

14. A display device manufacturing method of manufacturing a display device using a color filter manufactured by discharging ink from an ink-jet head onto a color filter substrate to form colored areas in units of colors, which extend in a predetermined direction, the ink-jet head having an orifice surface in which orifices for discharging ink are formed and a water-repellent member covering at least peripheral portions of the orifices, comprising the steps of:
manufacturing a color filter by the manufacturing method defined in claim 1; and
integrating the color filter with light amount changing means for changing a light amount.

15. A manufacturing method of manufacturing an apparatus having a display device using a color filter manufactured by discharging ink from an ink-jet head onto a color filter substrate to form colored areas in units of colors, which extend in a predetermined direction, the ink-jet head having an orifice surface in which orifices for discharging ink are formed and a water-repellent member covering at least peripheral portions of the orifices, comprising the steps of:
manufacturing a color filter by the manufacturing method defined in claim 1;
integrating the color filter with light amount changing means for changing a light amount; and
providing image signal supply means for supplying an image signal to the display device.

16. The method according to claim 1, wherein wiping with the wiping member is performed every time N (N is an integer not less than 1) color filters are manufactured.

17. The method according to claim 16, further comprising the step of switching first wiping operation for performing wiping by moving the wiping member in the predetermined direction and second wiping operation for performing wiping by moving the wiping member in a direction opposite to the predetermined direction every time the N color filters are manufactured.

18. The method according to claim 17, further comprising the step of switching the wiping operations to alternately perform the first and second wiping operations.

19. The method according to claim 1, wherein wiping with the wiping member is performed by moving the wiping member in the predetermined direction and in a direction opposite to the predetermined direction.

20. The method according to claim 1, wherein wiping with the wiping member is performed by moving the wiping member in the predetermined direction.

21. The method according to claim 1, further comprising the step of switching wiping directions of the wiping member such that the number of times of first wiping operation for performing wiping by moving the wiping member in the predetermined direction becomes substantially equal to the number of times of second wiping operation for performing wiping by moving the wiping member in a direction opposite to the predetermined direction.

22. A color filter manufacturing apparatus for manufacturing a color filter by discharging ink from an ink-jet head onto a color filter substrate to form colored areas in units of colors, which extend in a predetermined direction, the ink-jet head having an orifice surface in which orifices for discharging ink are formed and a water-repellent member covering at least peripheral portions of the orifices, comprising the steps of:
a wiping member for wiping the orifice surface; and
wiping means for controlling wiping operation of said wiping member,
wherein a defective portion is produced in the water-repellent member as the orifice surface is wiped, and the defective portion is produced in the wiping direction, and
wherein a wiping direction of said wiping member controlled by said wiping means coincides with a direction along with the predetermined direction.

23. The apparatus according to claim 22, whrein the defective portion has a shape elongated in the wiping direction.

24. The apparatus according to claim 22, wherein the defective portion is a flaw portion produced in the water-repellent member or a peeling portion of the water-repellent member.

25. The apparatus according to claim 22, wherein when ink is discharged from the ink-jet head, a landing position of the ink is offset in the predetermined direction.

26. The apparatus according to claim 22, wherein the water-repellent member covers the entire orifice surface.

27. The apparatus according to claim 22, wherein
the ink is discharged while the ink-jet head and the substrate are relatively scanned, and
the scanning direction coincides with the predetermined direction.

28. The apparatus according to claim 22, wherein
the ink is discharged while the ink-jet head and the substrate are relatively scanned, and the scanning direction is perpendicular to the predetermined direction.

29. The apparatus according to claim 22, wherein the colored areas are red, green, and blue.

30. The apparatus according to claim 22, wherein the colored area includes a plurality of pixels in the predetermined direction.

31. The apparatus according to claim 22, wherein the colored area includes one pixel in the predetermined direction.

32. The apparatus according to claim 22, wherein said wiping member is an elastic member.

33. The apparatus according to claim 22, wherein the ink-jet head is a head for discharging ink by using heat energy, the head having a heat energy generator for generating heat energy applied to the ink.

34. The apparatus according to claim 22, wherein the ink-jet head comprises a piezoelectric element which undergoes displacement upon reception of electric energy and discharges ink with a pressure change accompanying the displacement.

35. A display device panel manufacturing method of manufacturing a display device panel by discharging a liquid from a liquid supply head onto a substrate to form display portions which extend in a predetermined direction and are used for display, the liquid supply head having an orifice surface in which orifices for discharging liquid are formed and a water-repellent member covering at least peripheral portions of the orifices, comprising the steps of:
  preparing a wiping member for wiping the orifice surface; and
  wiping the orifice surface with the wiping member,
    wherein a defective portion is produced in the water-repellent member as the orifice surface is wiped, and the defective portion is produced in the wiping direction, and
    wherein a wiping direction of the wiping member coincides with a direction along with the predetermined direction.

36. The method according to claim 35, wherein the defective portion has a shape elongated in the wiping direction.

37. The method according to claim 35, wherein the defective portion is a flaw portion produced in the water-repellent member or a peeling portion of the water-repellent member.

38. The method according to claim 35, wherein when liquid is discharged from the liquid supply head, a landing position of the liquid is offset in the predetermined direction.

39. The method according to claim 35, comprising covering the entire orifice surface with the water-repellent member.

40. The method according to claim 35, wherein the liquid is an EL material that spontaneously emits light, and the area is a luminescent layer.

41. The method according to claim 35, wherein the liquid is ink, and the area is a colored layer formed by the ink.

42. A display device panel manufacturing apparatus for manufacturing a display device panel by discharging a liquid from a liquid supply head onto a substrate to form display portions which extend in a predetermined direction and are used for display, the liquid supply head having an orifice surface in which orifices for discharging liquid are formed and a water-repellent member covering at least peripheral portions of the orifices, comprising:
  a wiping member for wiping the orifice surface; and
  wiping means for controlling wiping operation of said wiping member,
    wherein a defective portion is produced in the water-repellent member as the orifice surface is wiped, and the defective portion is produced in the wiping direction, and
    wherein a wiping direction of said wiping member controlled by said wiping means coincides with a direction along with the predetermined direction.

43. The apparatus according to claim 42, wherein the defective portion has a shape elongated in the wiping direction.

44. The apparatus according to claim 42, wherein the defective portion is a flaw portion produced in the water-repellent member or a peeling portion of the water-repellent member.

45. The apparatus according to claim 42, wherein when liquid is discharged from the liquid supply head, a landing position of the liquid is offset in the predetermined direction.

46. The apparatus according to claim 42, wherein the water-repellent member covers the entire orifice surface.

47. The apparatus according to claim 42, wherein the liquid is an EL material that spontaneously emits light, and the area is a luminescent layer.

48. The apparatus according to claim 42, wherein the liquid is ink, and the area is a colored layer formed by the ink.

49. A color filter manufacturing method of manufacturing a color filter by discharging ink from an ink-jet head onto a color filter substrate to form colored areas in units of colors, which extend in a predetermined direction, the ink-jet head having an orifice surface in which orifices for discharging ink are formed and a protective member covering at least peripheral portions of the orifices, comprising the steps of:
  preparing a wiping member for wiping the orifice surface; and
  wiping the orifice surface with the wiping member,
    wherein a defective portion is produced in the protective member as the orifice surface is wiped, and the defective portion is produced in the wiping direction, and
    wherein a wiping direction of the wiping member coincides with a direction along with the predetermined direction.

50. The method according to claim 49, wherein the defective portion has a shape elongated in the wiping direction.

51. The method according to claim 49, wherein the defective portion is a flaw portion produced in the protective member or a peeling portion of the protective member.

52. The method according to claim 49, wherein when ink is discharged from the ink-jet head, a landing position of the ink is offset in the predetermined direction.

53. The method according to claim 49, comprising covering the entire orifice surface with the protective member.

54. A color filter manufacturing apparatus for manufacturing a color filter by discharging ink from an ink-jet head onto a color filter substrate to form colored areas in units of colors, which extend in a predetermined direction, the ink-jet head having an orifice surface in which orifices for discharging ink are formed and a protective member covering at least peripheral portions of the orifices, comprising:
  a wiping member for wiping the orifice surface; and
  wiping means for controlling wiping operation of said wiping member,
    wherein a defective portion is produced in the protective member as the orifice surface is wiped, and the defective portion is produced in the wiping direction, and wherein a wiping direction of said wiping member controlled by said wiping means coincides with a direction along with the predetermined direction.

55. The apparatus according to claim 54, wherein the defective portion has a shape elongated in the wiping direction.

56. The apparatus according to claim 54, wherein the defective portion is a flaw portion produced in the protective member or a peeling portion of the protective member.

57. The apparatus according to claim 54, wherein when ink is discharged from the ink-jet head, a landing position of the ink is offset in the predetermined direction.

58. The apparatus according to claim 54, comprising covering the entire orifice surface with the protective member.

59. A display device panel manufacturing method of manufacturing a display device panel by discharging a liquid from a liquid supply head onto a substrate to form display portions which extend in a predetermined direction and are used for display, the liquid supply head having an orifice surface in which orifices for discharging liquid are formed and a predetermined material covering at least peripheral portions of the orifices, comprising the steps of:
preparing a wiping member for wiping the orifice surface; and
wiping the orifice surface with the wiping member,
wherein a wiping direction of the wiping member coincides with a direction along with the predetermined direction.

60. A display device panel manufacturing apparatus for manufacturing a display device panel by discharging a liquid from a liquid supply head onto a substrate to form display portions which extend in a predetermined direction and are used for display, the liquid supply head having an orifice surface in which orifices for discharging liquid are formed and a predetermined material covering at least peripheral portions of the orifices, comprising:
a wiping member for wiping the orifice surface; and
wiping means for controlling wiping operation of said wiping member,
wherein a wiping direction of said wiping member controlled by said wiping means coincides with a direction along with the predetermined direction.

61. A color filter manufacturing method of manufacturing a color filter by discharging ink from an ink-jet head onto a color filter substrate to form color areas in units of colors, which extend in a predetermined direction, the ink-jet head having an orifice surface in which orifices for discharging ink are formed and a water-repellent member covering at least peripheral portions of the orifices, comprising the steps of:
adjusting an angle of the ink-jet head with respect to the predetermined direction to match an interval between the two color areas colored in the same color to an interval between two orifices, of a plurality of orifices of the ink-jet head, which are used, in a direction perpendicular to the predetermined direction;
preparing a wiping member for wiping the orifice surfaces; and
wiping the orifice surfaces with the wiping member while the adjusted angle is maintained,
wherein peeling portions are produced in the water-repellent member as the orifice surface is wiped a plurality of number of times, and the peeling portions are produced in the wiping direction, and
the wiping direction of the wiping member coincides with a direction along with the predetermined direction.

62. The method according to claim 61, wherein wiping with the wiping member is performed every time N (N is an integer not less than 1) color filters are manufactured.

63. The method according to claim 62, further comprising the step of switching first wiping operation for performing wiping by moving the wiping member in the predetermined direction and second wiping operation for performing wiping by moving the wiping member in a direction opposite to the predetermined direction every time the N color filters are manufactured.

64. The method according to claim 63, further comprising the step of switching the wiping operations to alternately perform the first and second wiping operations.

65. The method according to claim 61, wherein wiping with the wiping member is performed by moving the wiping member in the predetermined direction and in a direction opposite to the predetermined direction.

66. The method according to claim 61, wherein wiping with the wiping member is performed by moving the wiping member in the predetermined direction.

67. The method according to claim 61, further comprising the step of switching wiping directions of the wiping member such that the number of times of first wiping operation for performing wiping by moving the wiping member in the predetermined direction becomes substantially equal to the number of times of second wiping operation for performing wiping by moving the wiping member in a direction opposite to the predetermined direction.

68. A color filter manufacturing apparatus for manufacturing a color filter by discharging ink from an ink-jet head onto a color filter substrate to form color areas in units of colors, which extend in a predetermined direction, the ink-jet head having an orifice surface in which orifices for discharging ink are formed and a water-repellent member covering at least peripheral portions of the orifices, comprising:
adjusting means for adjusting an angle of the ink-jet head with respect to the predetermined direction to match an interval between the two color areas colored in the same color to an interval between two orifices, of a plurality of orifices of the ink-jet head, which are used, in a direction perpendicular to the predetermined direction;
a wiping member for wiping the orifice surfaces; and
wiping means for performing control to wipe the orifice surfaces with said wiping member while the angle adjusted by said adjusting means is maintained,
wherein peeling portions are produced in the water-repellent member as the orifice surface is wiped a plurality of number of times, and the peeling portions are produced in the wiping direction, and
the wiping direction of said wiping member coincides with a direction along with the predetermined direction.

69. The apparatus according to claim 68, wherein wiping with said wiping member is performed every time N (N is an integer not less than 1) color filters are manufactured.

70. The apparatus according to claim 69, wherein first wiping operation for performing wiping by moving said wiping member in the predetermined direction and second wiping operation for performing wiping by moving said wiping member in a direction opposite to the predetermined direction are switched every time the N color filters are manufactured.

71. The apparatus according to claim 70, wherein the wiping operations are switched to alternately perform the first and second wiping operations.

72. The apparatus according to claim 68, wherein wiping with said wiping member is performed by moving said wiping member in the predetermined direction and in a direction opposite to the predetermined direction.

73. The apparatus according to claim 68, wherein wiping with said wiping member is performed by moving said wiping member in the predetermined direction.

74. The apparatus according to claim 68, wherein wiping directions of said wiping member are switched such that the number of times of first wiping operation for performing wiping by moving said wiping member in the predetermined direction becomes substantially equal to the number of times of second wiping operation for performing wiping by moving said wiping member in a direction opposite to the predetermined direction.

75. A method of manufacturing a display device panel by discharging a material used for display from a head onto a substrate to form display portions, which extend in a predetermined direction and are used for display, the head having an orifice surface in which orifices for discharging the material used for display are formed and a predetermined material covering at least peripheral portions of the orifices, comprising the steps of:

adjusting an angle of the head with respect to the predetermined direction to match an interval between the two display portions formed by the same material to an interval between two orifices, of a plurality of orifices of the head, which are used, in a direction perpendicular to the predetermined direction;

preparing a wiping member for wiping the orifice surfaces; and wiping the orifice surfaces with the wiping member while the adjusted angle is maintained, wherein peeling portions are produced in the predetermined material as the orifice surface is wiped a plurality of number of times, and the peeling portions are produced in the wiping direction, and the wiping direction of the wiping member coincides with a direction along with the predetermined direction.

76. An apparatus for manufacturing a display device panel by discharging a medium used for display from a head onto a substrate to form display portions, which extend in a predetermined direction and are used for display, the head having an orifice surface in which orifices for discharging the medium used for display are formed and a predetermined material covering at least peripheral portions of the orifices, comprising:

adjusting means for adjusting an angle of the head with respect to the predetermined direction to match an interval between the two display portions formed by the same material to an interval between two orifices, of a plurality of orifices of the head, which are used, in a direction perpendicular to the predetermined direction;

a wiping member for wiping the orifice surfaces; and wiping means for performing control to wipe the orifice surfaces with said wiping member while the angle adjusted by said adjusting means is maintained, wherein peeling portions are produced in the predetermined material as the orifice surface is wiped a plurality of number of times, and the peeling portions are produced in the wiping direction, and the wiping direction of said wiping member coincides with a direction along with the predetermined direction.

* * * * *

UNITED STATES PATENT AND TRADEMARK OFFICE
CERTIFICATE OF CORRECTION

PATENT NO. : 6,364,450 B1
DATED : April 2, 2002
INVENTOR(S) : Yamaguchi et al.

It is certified that error appears in the above-identified patent and that said Letters Patent is hereby corrected as shown below:

Column 22,
Line 66, "the" should read -- from the --.

Column 26,
Line 26, "hat" should read -- heat --.

Column 28,
Line 47, "whrein" should read -- wherein --.

Signed and Sealed this

Twenty-second Day of April, 2003

JAMES E. ROGAN
*Director of the United States Patent and Trademark Office*